US012666316B2

(12) United States Patent　　(10) Patent No.:　　US 12,666,316 B2
Kumar et al.　　　　　　　　　(45) Date of Patent:　　Jun. 23, 2026

(54) MOBILITY HANDLING OF CROSS-NODE MACHINE LEARNING SESSION IN A RADIO ACCESS NETWORK

(71) Applicant: QUALCOMM Incorporated, San Diego, CA (US)

(72) Inventors: Rajeev Kumar, San Diego, CA (US); Aziz Gholmieh, Del Mar, CA (US); Geetha Priya Rajendran, Bangalore (IN); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 18/379,474

(22) Filed: Oct. 12, 2023

(65) Prior Publication Data

US 2025/0126526 A1　　　Apr. 17, 2025

(51) Int. Cl.
*H04W 36/00*　　　　(2009.01)
*H04W 24/02*　　　　(2009.01)

(52) U.S. Cl.
CPC ....... *H04W 36/0055* (2013.01); *H04W 24/02* (2013.01)

(58) Field of Classification Search
CPC .......................... H04W 36/0055; H04W 24/02
See application file for complete search history.

(56) References Cited

U.S. PATENT DOCUMENTS 8,570,981 B2　　10/2013　Aziz et al.
11,388,054 B2　　7/2022　Guim Bernat et al.

2021/0184989 A1　　6/2021　Wu et al.
2021/0377804 A1　　12/2021　Sivaraj et al.
2022/0014942 A1　　1/2022　Ying et al.
2022/0124543 A1　　4/2022　Orhan et al.
(Continued)

FOREIGN PATENT DOCUMENTS

JP　　　2023042318　A　　3/2023
WO　　2022089725　A1　　5/2022
(Continued)

OTHER PUBLICATIONS

Mediatek Inc: "Discussion on General Aspects of AI/ML Framework", R1-2209505, 3GPP TSG RAN WG1 #110-bis- e, e-Meeting, Oct. 10-19, 2022, 10 Pages.
(Continued)

*Primary Examiner* — Erika A Washington
(74) *Attorney, Agent, or Firm* — Dinsmore & Shohl LLP

(57) ABSTRACT

Certain aspects of the present disclosure provide techniques for handling user equipment (UE) mobility for a cross-node artificial intelligence (AI) and/or machine learning (ML) session in a radio access network (RAN). A method of wireless communication by a first network entity includes obtaining, from a second network entity, an indication of a handover for a UE; obtaining, from a third network entity, an indication of first cross-node machine learning information associated with a cross-node machine learning session between the UE and the third network entity; providing, to the second network entity, an indication acknowledging the handover; and relaying communications between the UE and the third network entity for the cross-node machine learning session.

30 Claims, 39 Drawing Sheets

(56)  References Cited

U.S. PATENT DOCUMENTS

| | | | |
|---|---|---|---|
| 2022/0286927 A1 | 9/2022 | Madadi et al. | |
| 2023/0136354 A1 | 5/2023 | Namgoong et al. | |
| 2023/0224689 A1 | 7/2023 | Song et al. | |
| 2023/0232298 A1* | 7/2023 | Parichehrehteroujeni ............... | H04W 36/0058 |
| | | | 370/331 |

FOREIGN PATENT DOCUMENTS

| | | | |
|---|---|---|---|
| WO | 2022221260 A1 | 10/2022 |
| WO | 2022264150 A1 | 12/2022 |
| WO | 2023001652 A1 | 1/2023 |
| WO | 2023012074 A1 | 2/2023 |
| WO | 2023030365 A1 | 3/2023 |
| WO | 2023066287 A1 | 4/2023 |
| WO | 2023111158 A2 | 6/2023 |

OTHER PUBLICATIONS

International Search Report and Written Opinion—PCT/US2024/048674—ISA/EPO—Dec. 19, 2024.

* cited by examiner

500A

525

Near RT-RIC xApps

552

502

550

554

504

550

500B

Near-RT RIC 525

Cloud Computing Platform 562 xApp-A    • • •    xApp-N

560

API 566

Server-A    • • •    Server-N

564

572

CSI

E2 Node

CU

DU 510    568    530

CSF

570

PUCCH

CSF

570

540

504

1900

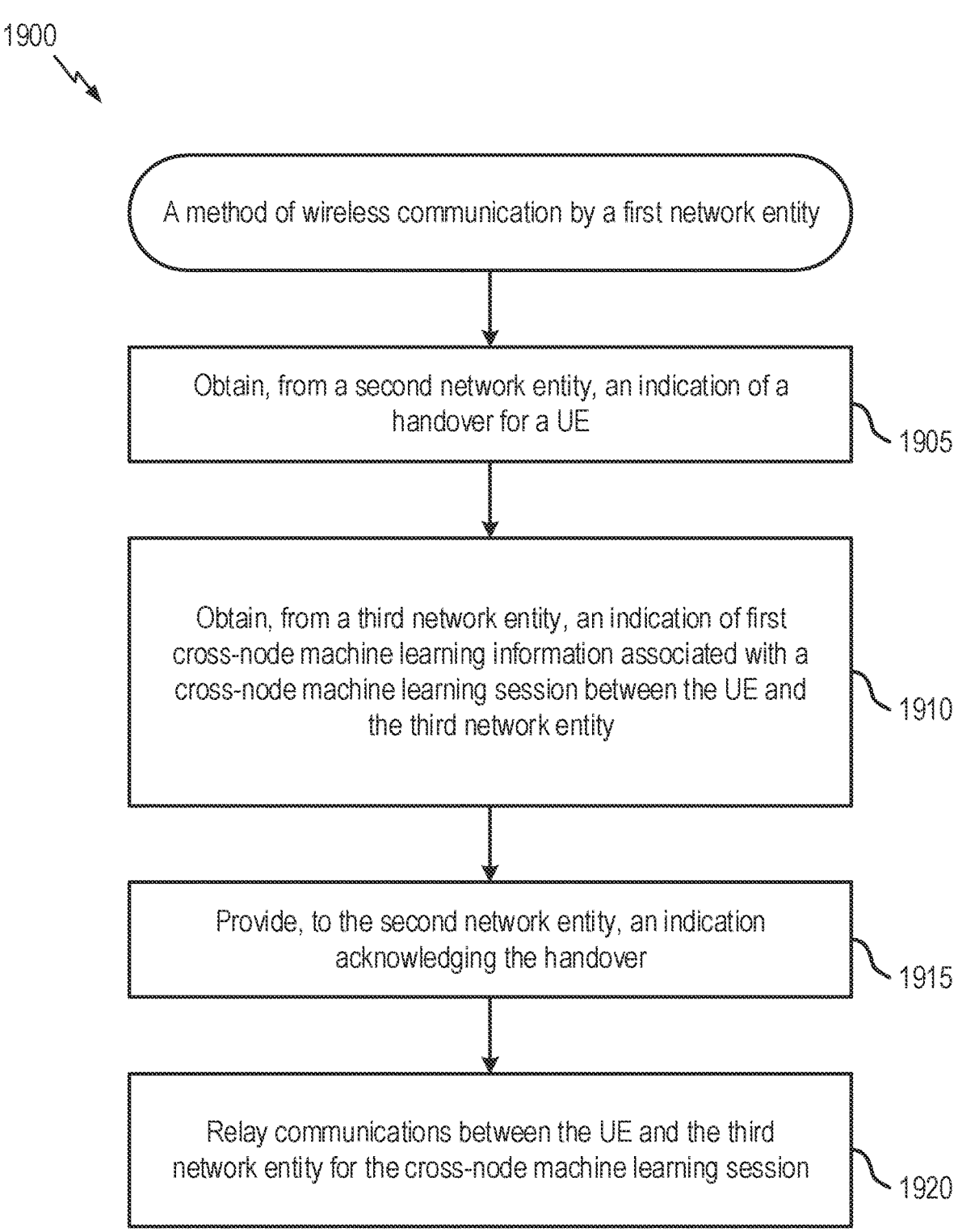

A method of wireless communication by a first network entity

Obtain, from a second network entity, an indication of a handover for a UE
1905

Obtain, from a third network entity, an indication of first cross-node machine learning information associated with a cross-node machine learning session between the UE and the third network entity
1910

Provide, to the second network entity, an indication acknowledging the handover
1915

Relay communications between the UE and the third network entity for the cross-node machine learning session
1920

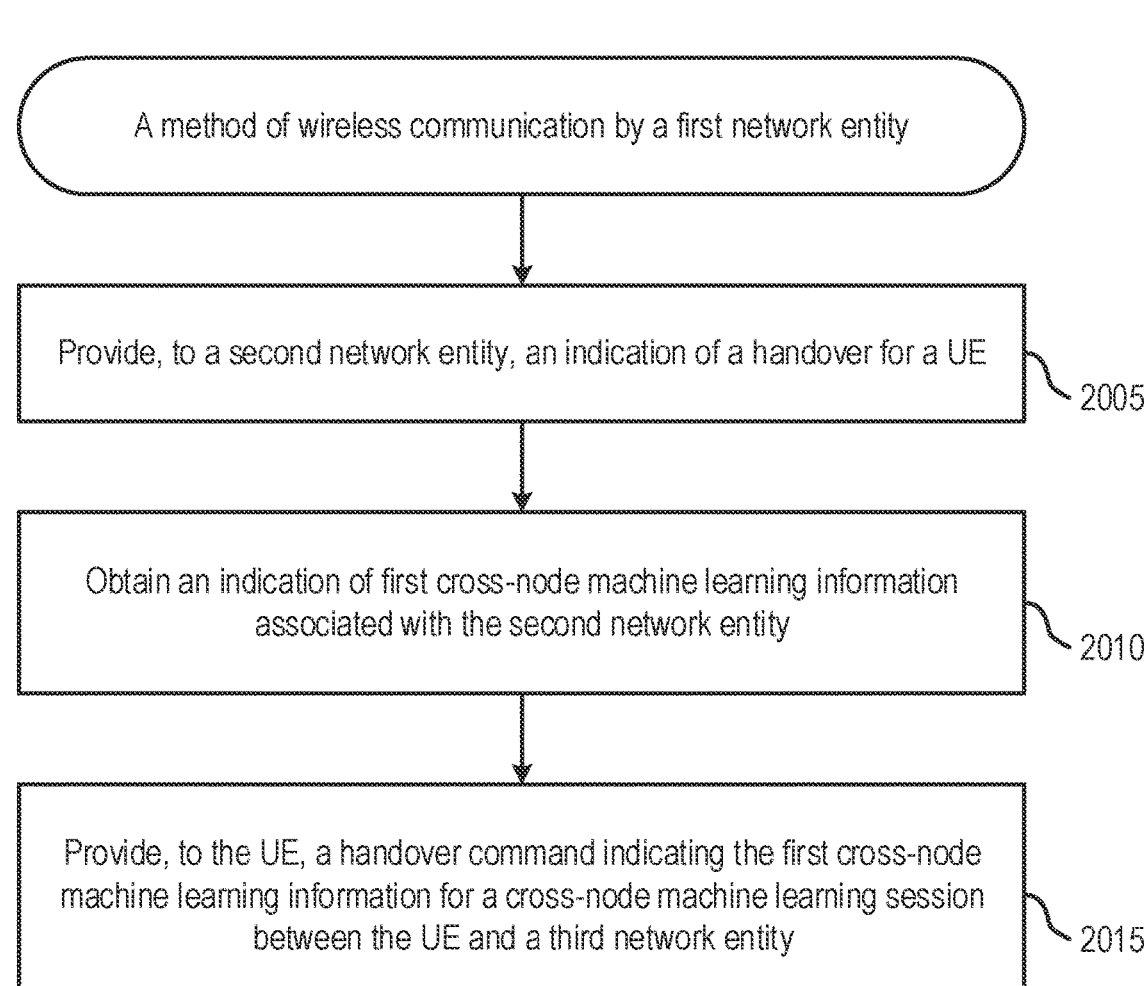

A method of wireless communication by a first network entity

Provide, to a second network entity, an indication of a handover for a UE — 2005

Obtain an indication of first cross-node machine learning information associated with the second network entity — 2010

Provide, to the UE, a handover command indicating the first cross-node machine learning information for a cross-node machine learning session between the UE and a third network entity — 2015

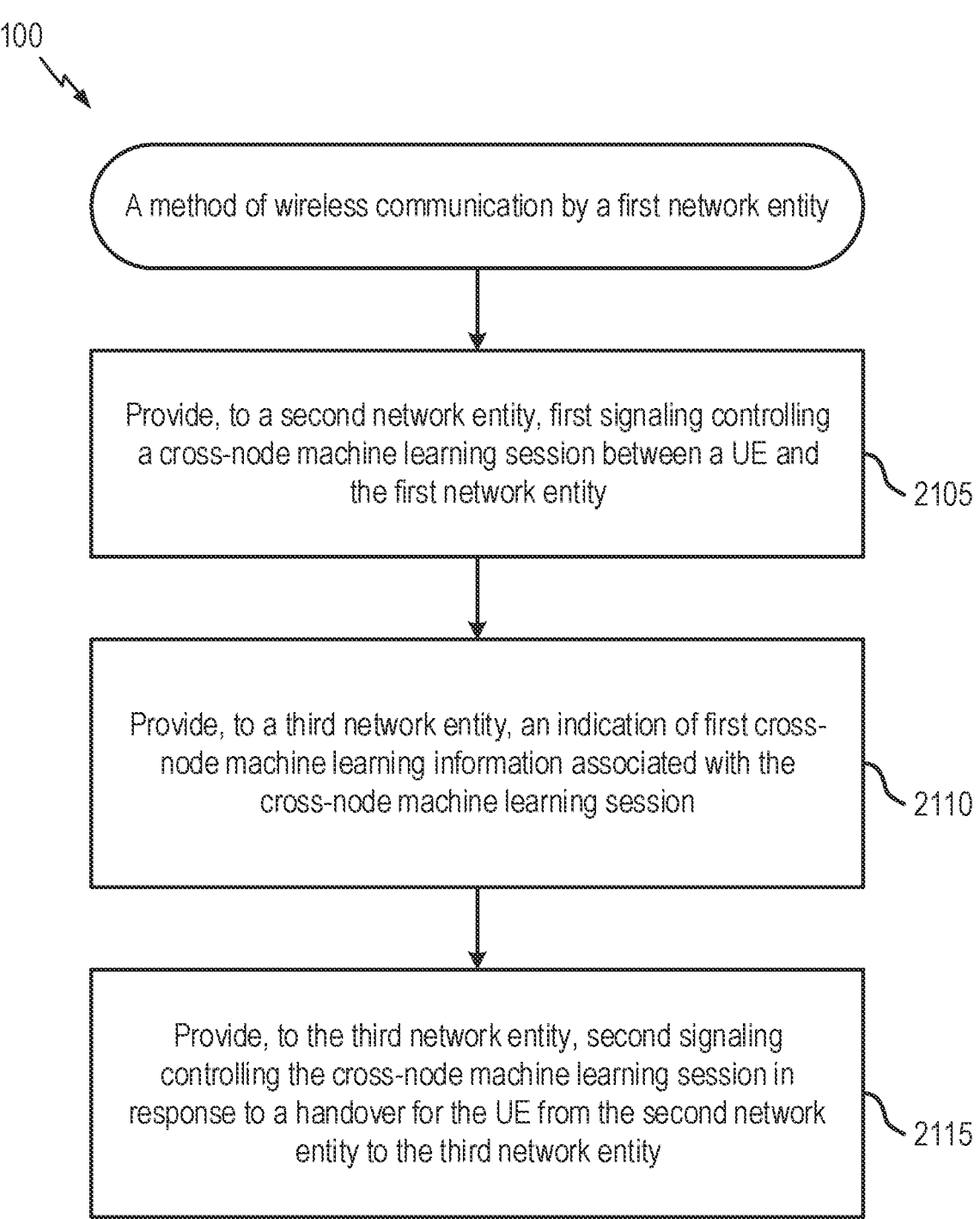

A method of wireless communication by a first network entity

Provide, to a second network entity, first signaling controlling a cross-node machine learning session between a UE and the first network entity — 2105

Provide, to a third network entity, an indication of first cross-node machine learning information associated with the cross-node machine learning session — 2110

Provide, to the third network entity, second signaling controlling the cross-node machine learning session in response to a handover for the UE from the second network entity to the third network entity — 2115

*FIG. 21*

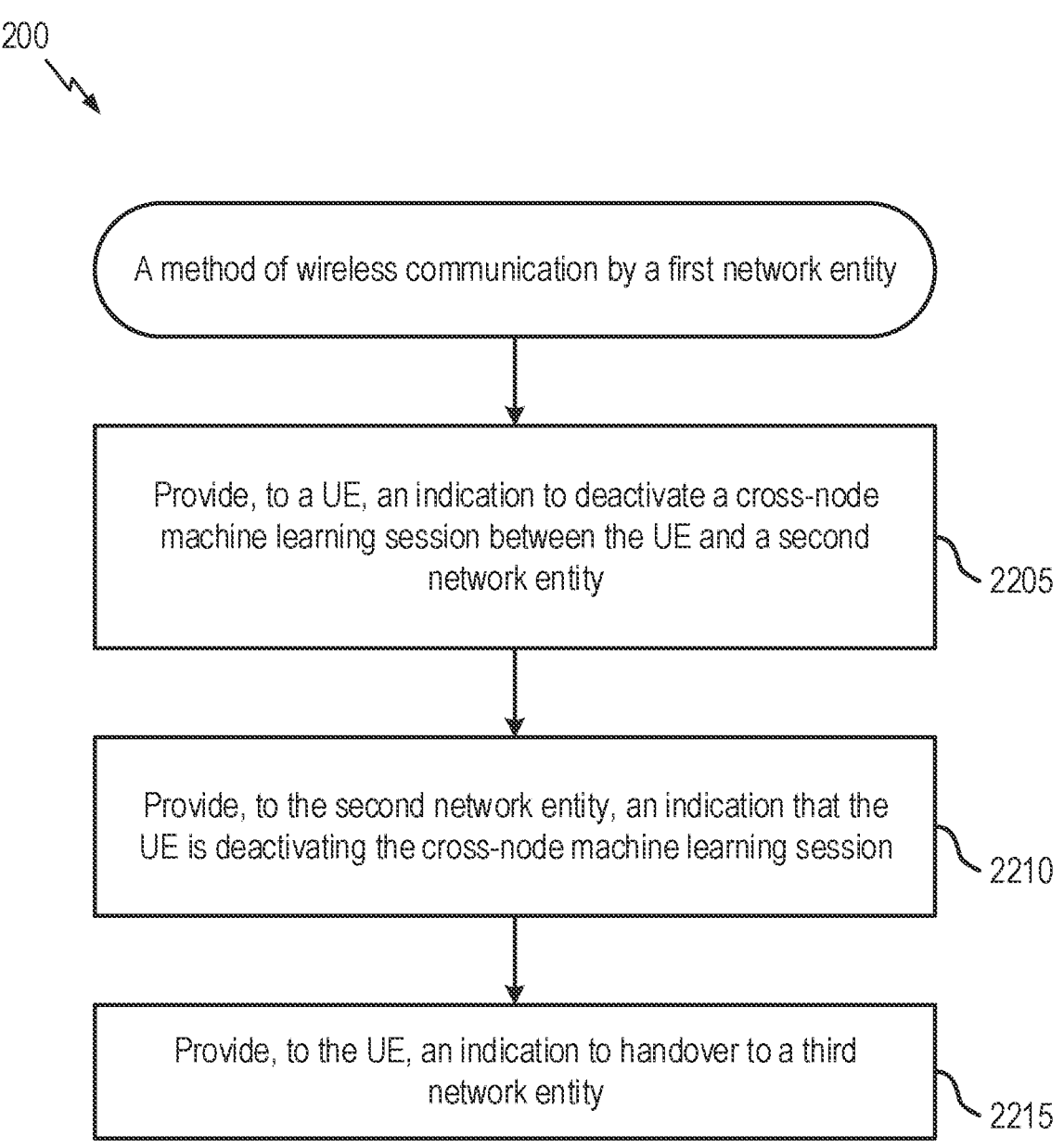

2200

A method of wireless communication by a first network entity

Provide, to a UE, an indication to deactivate a cross-node machine learning session between the UE and a second network entity

2205

Provide, to the second network entity, an indication that the UE is deactivating the cross-node machine learning session

2210

Provide, to the UE, an indication to handover to a third network entity

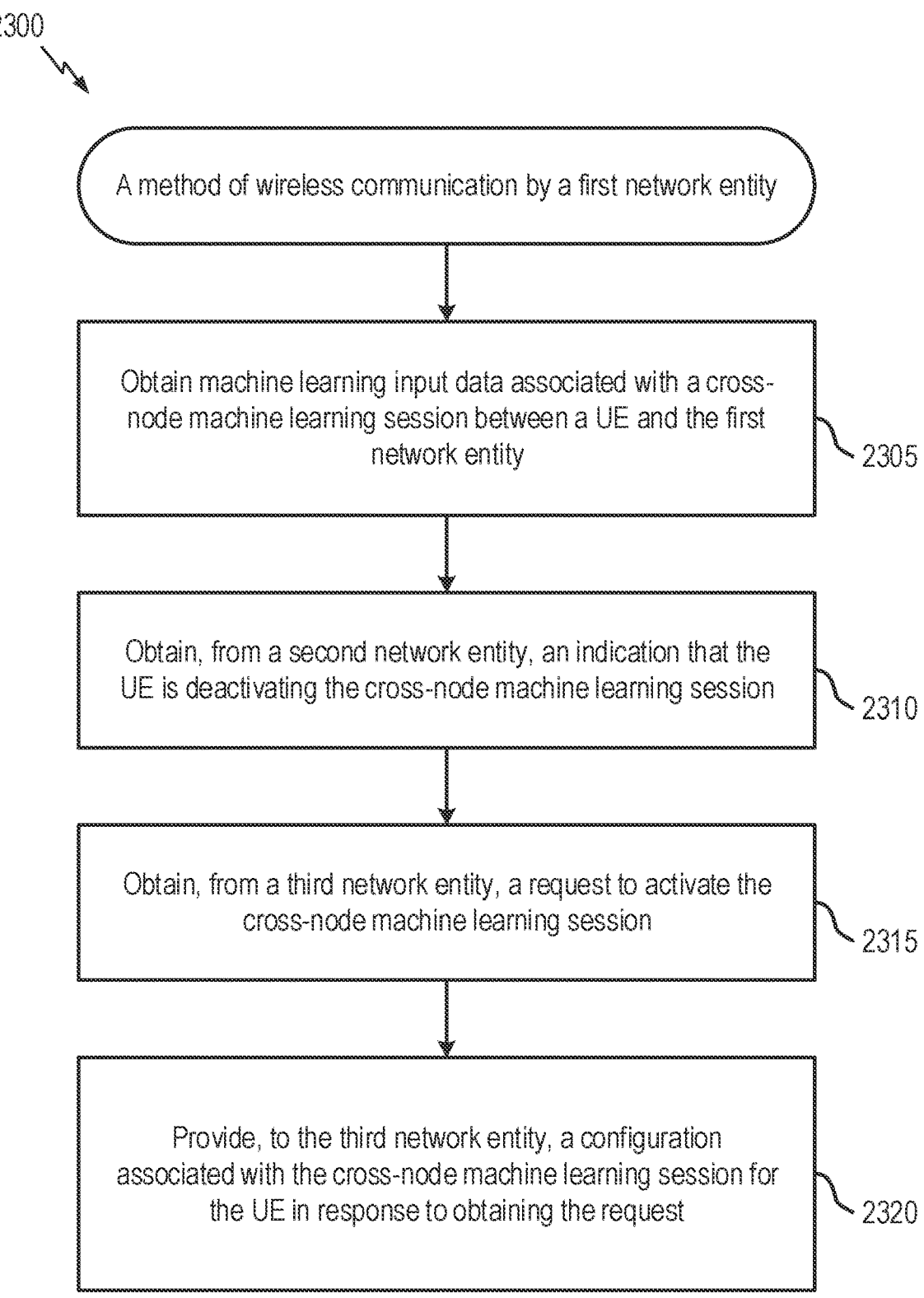

A method of wireless communication by a first network entity

Obtain machine learning input data associated with a cross-node machine learning session between a UE and the first network entity — 2305

Obtain, from a second network entity, an indication that the UE is deactivating the cross-node machine learning session — 2310

Obtain, from a third network entity, a request to activate the cross-node machine learning session — 2315

Provide, to the third network entity, a configuration associated with the cross-node machine learning session for the UE in response to obtaining the request — 2320

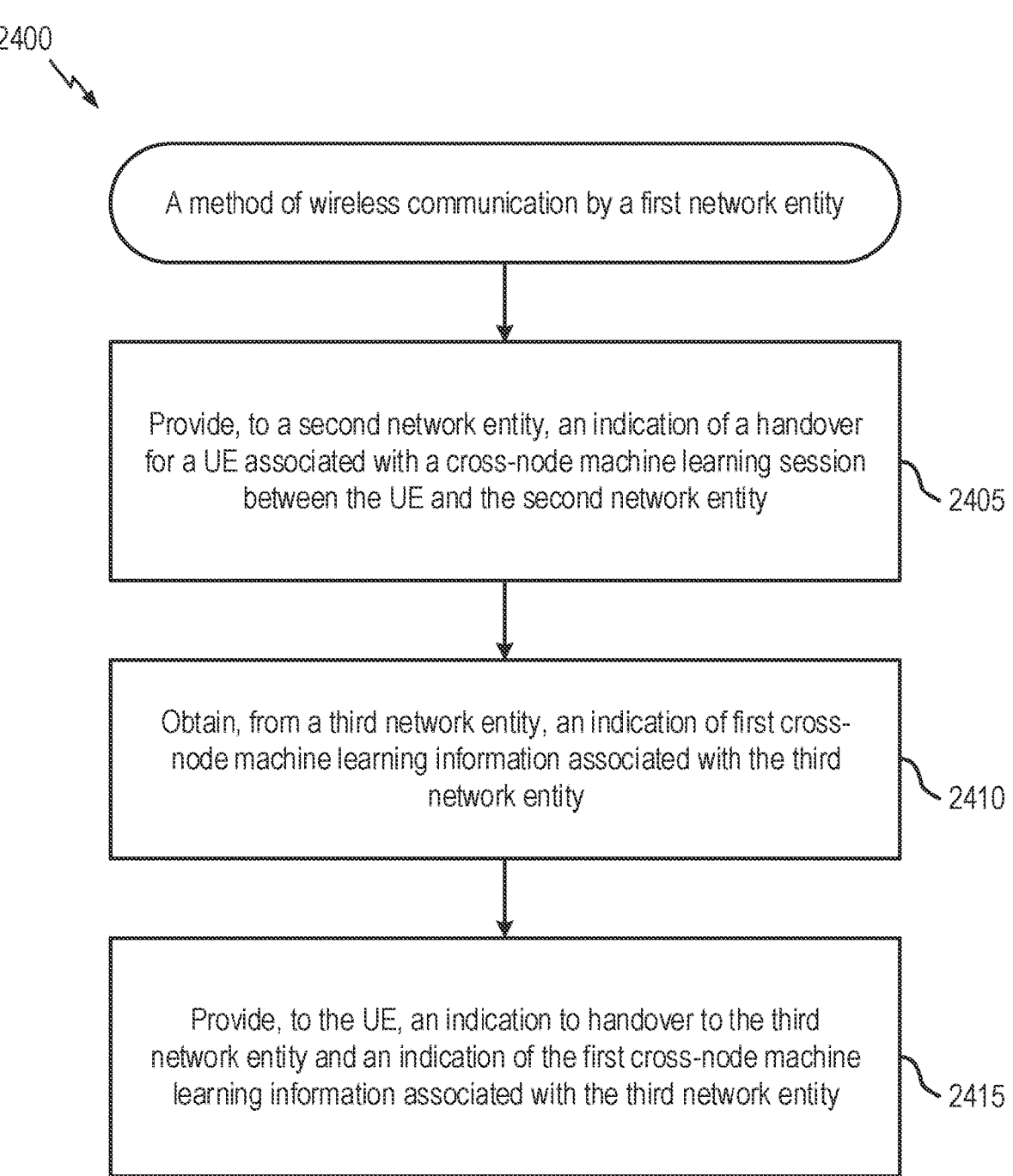

A method of wireless communication by a first network entity

Provide, to a second network entity, an indication of a handover for a UE associated with a cross-node machine learning session between the UE and the second network entity ⟋ 2405

Obtain, from a third network entity, an indication of first cross-node machine learning information associated with the third network entity ⟋ 2410

Provide, to the UE, an indication to handover to the third network entity and an indication of the first cross-node machine learning information associated with the third network entity ⟋ 2415

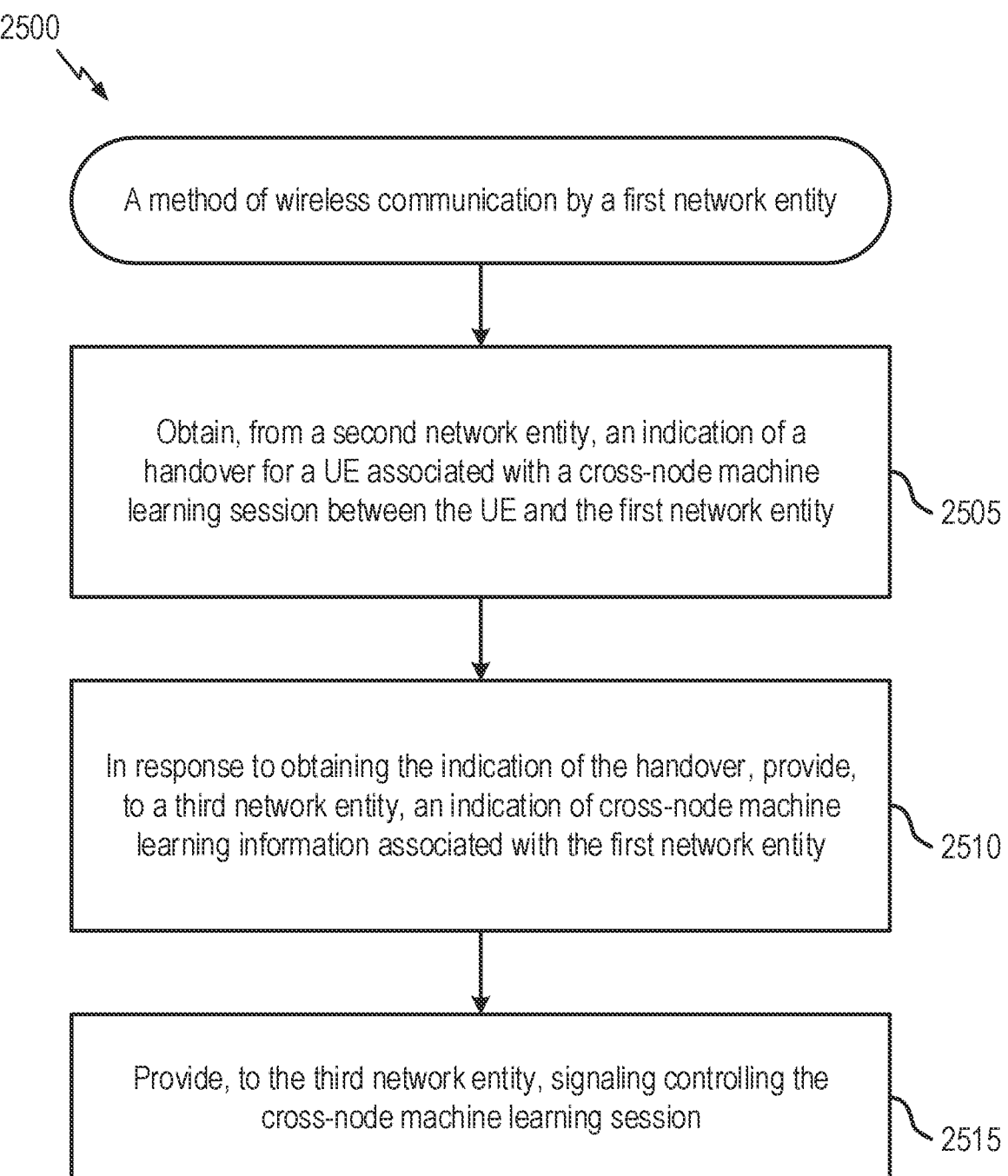

A method of wireless communication by a first network entity

Obtain, from a second network entity, an indication of a handover for a UE associated with a cross-node machine learning session between the UE and the first network entity ～2505

In response to obtaining the indication of the handover, provide, to a third network entity, an indication of cross-node machine learning information associated with the first network entity ～2510

Provide, to the third network entity, signaling controlling the cross-node machine learning session ～2515

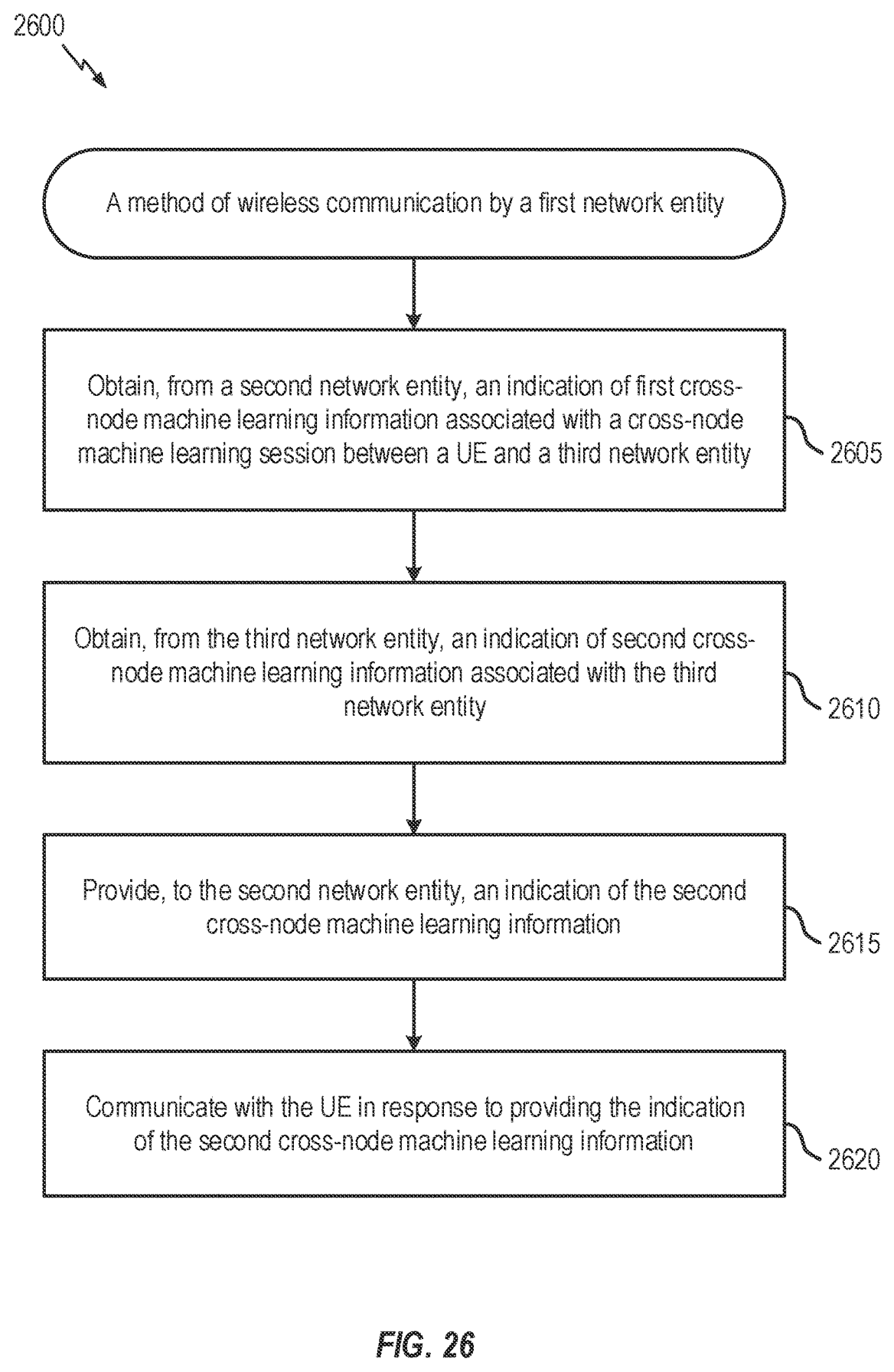

A method of wireless communication by a first network entity

Obtain, from a second network entity, an indication of first cross-node machine learning information associated with a cross-node machine learning session between a UE and a third network entity ⟋ 2605

Obtain, from the third network entity, an indication of second cross-node machine learning information associated with the third network entity ⟋ 2610

Provide, to the second network entity, an indication of the second cross-node machine learning information ⟋ 2615

Communicate with the UE in response to providing the indication of the second cross-node machine learning information ⟋ 2620

*FIG. 26*

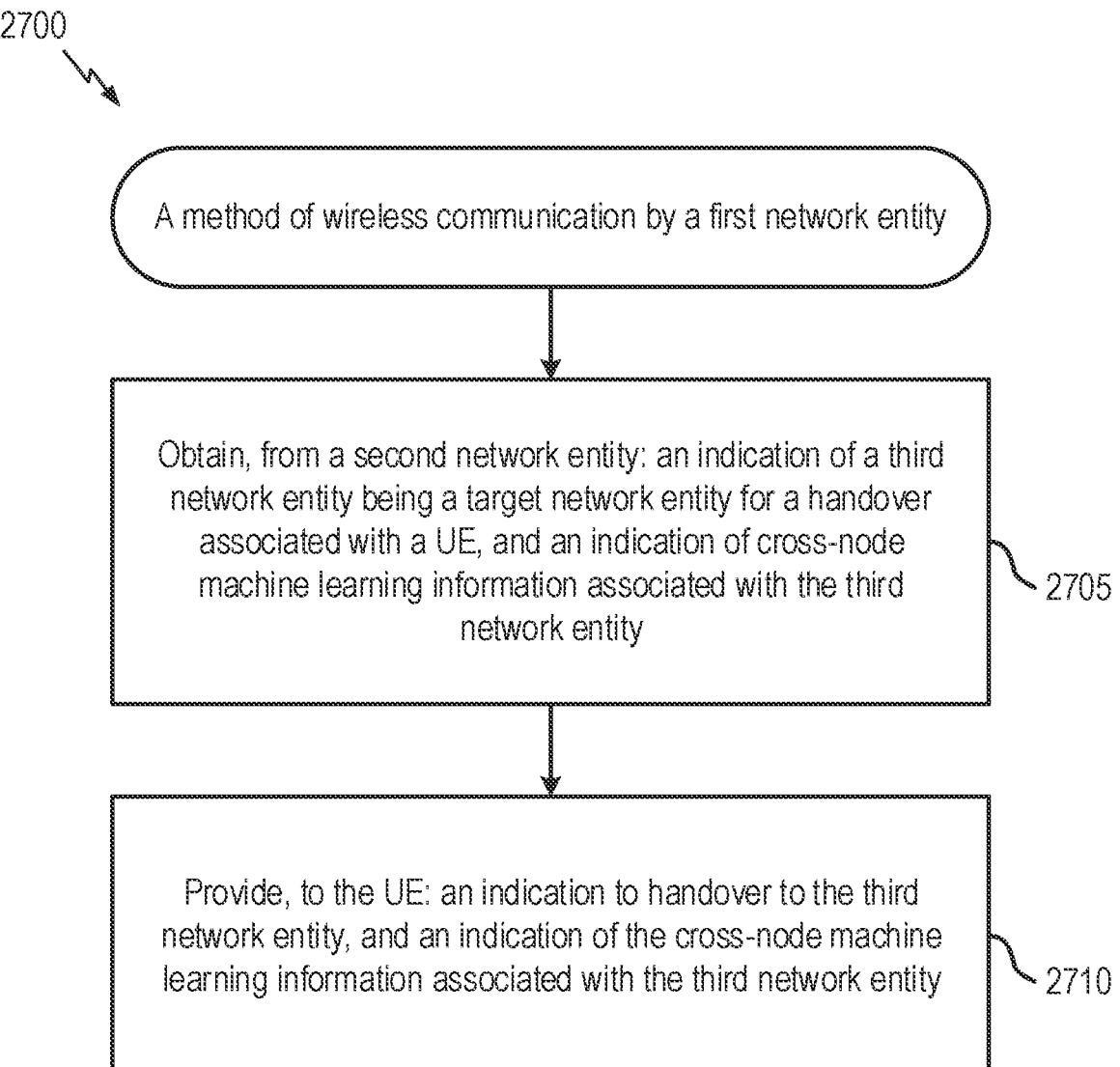

2700

A method of wireless communication by a first network entity

Obtain, from a second network entity: an indication of a third network entity being a target network entity for a handover associated with a UE, and an indication of cross-node machine learning information associated with the third network entity — 2705

Provide, to the UE: an indication to handover to the third network entity, and an indication of the cross-node machine learning information associated with the third network entity — 2710

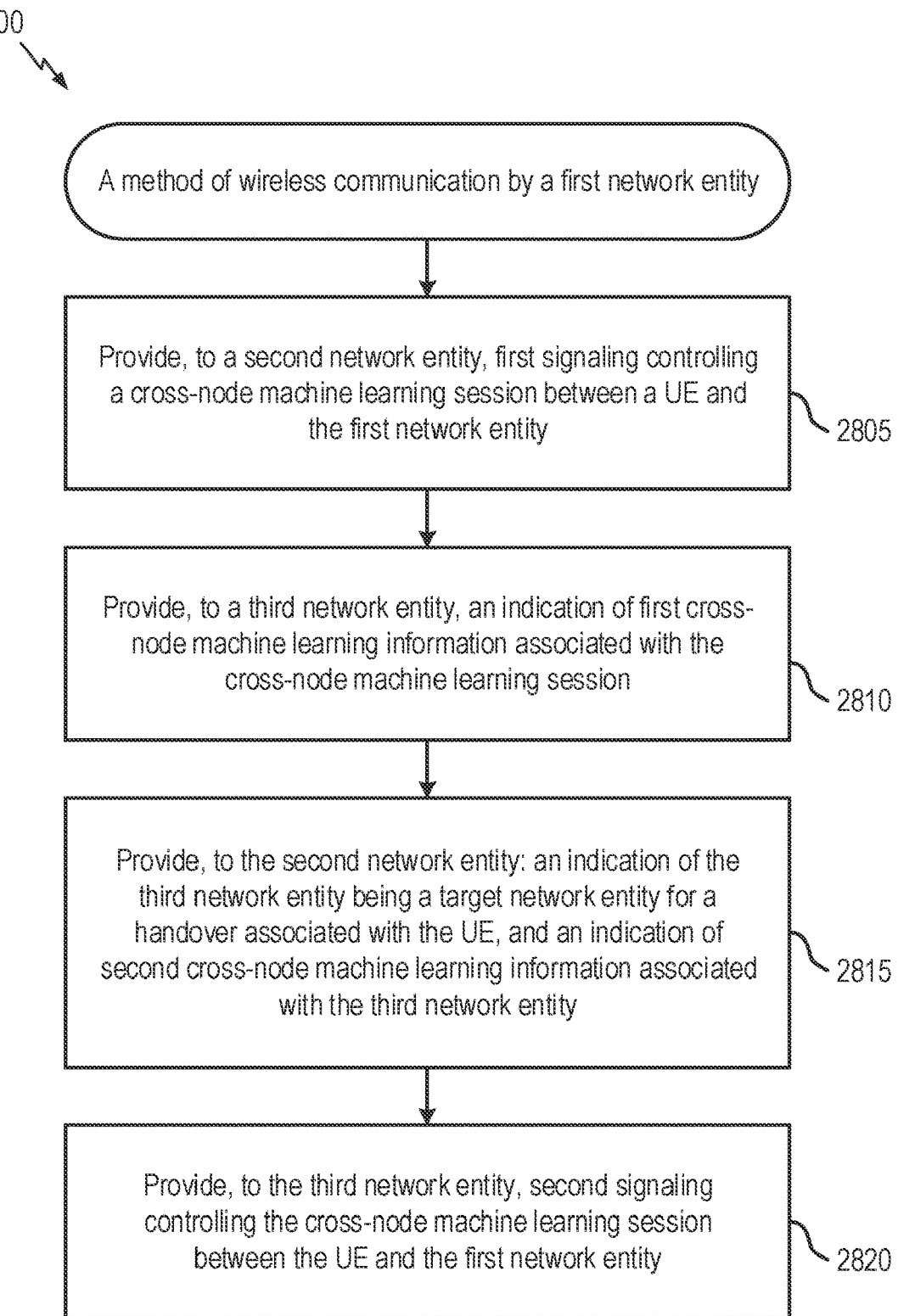

A method of wireless communication by a first network entity

Provide, to a second network entity, first signaling controlling a cross-node machine learning session between a UE and the first network entity

2805

Provide, to a third network entity, an indication of first cross-node machine learning information associated with the cross-node machine learning session

2810

Provide, to the second network entity: an indication of the third network entity being a target network entity for a handover associated with the UE, and an indication of second cross-node machine learning information associated with the third network entity

2815

Provide, to the third network entity, second signaling controlling the cross-node machine learning session between the UE and the first network entity

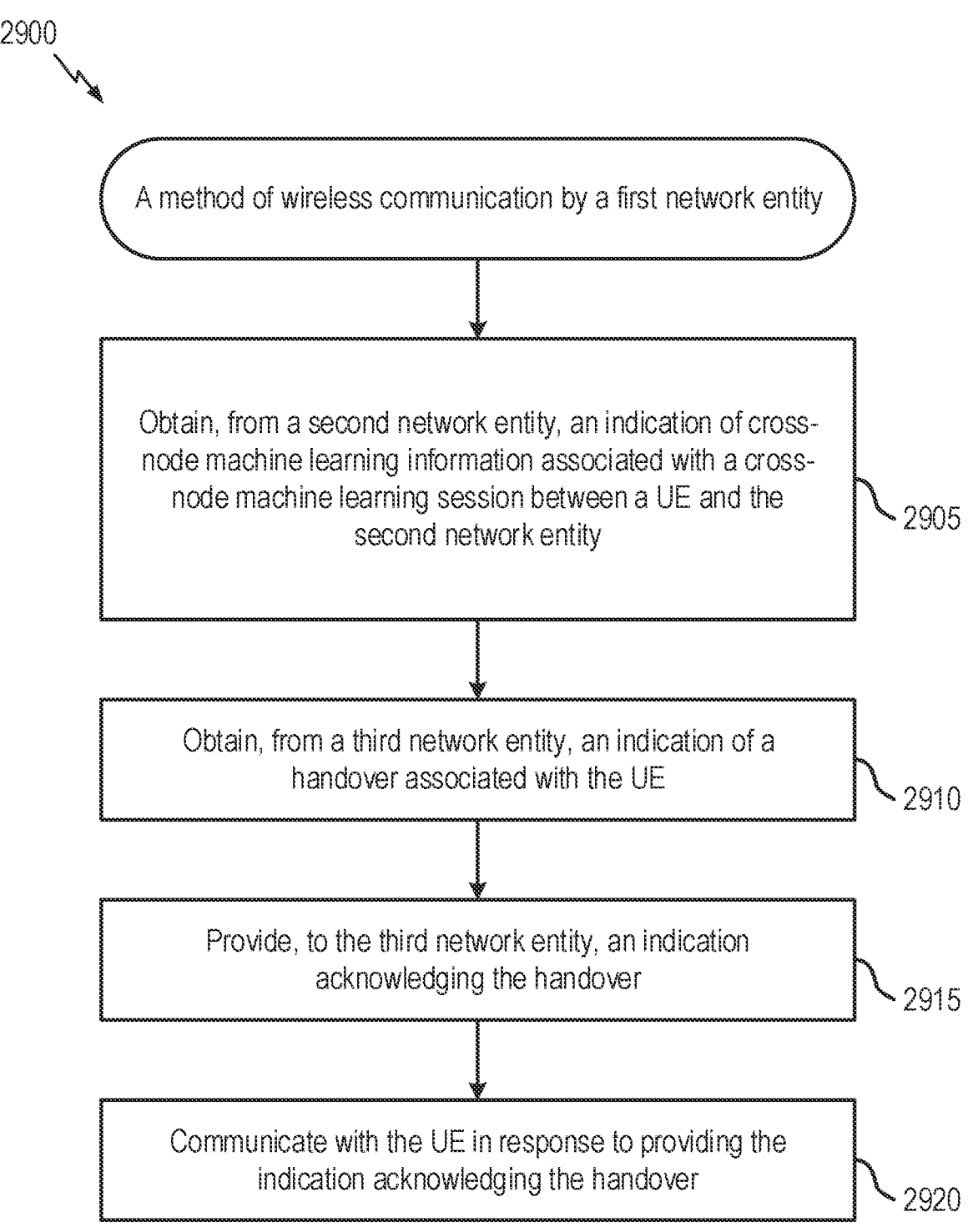

A method of wireless communication by a first network entity

Obtain, from a second network entity, an indication of cross-node machine learning information associated with a cross-node machine learning session between a UE and the second network entity — 2905

Obtain, from a third network entity, an indication of a handover associated with the UE — 2910

Provide, to the third network entity, an indication acknowledging the handover — 2915

Communicate with the UE in response to providing the indication acknowledging the handover — 2920

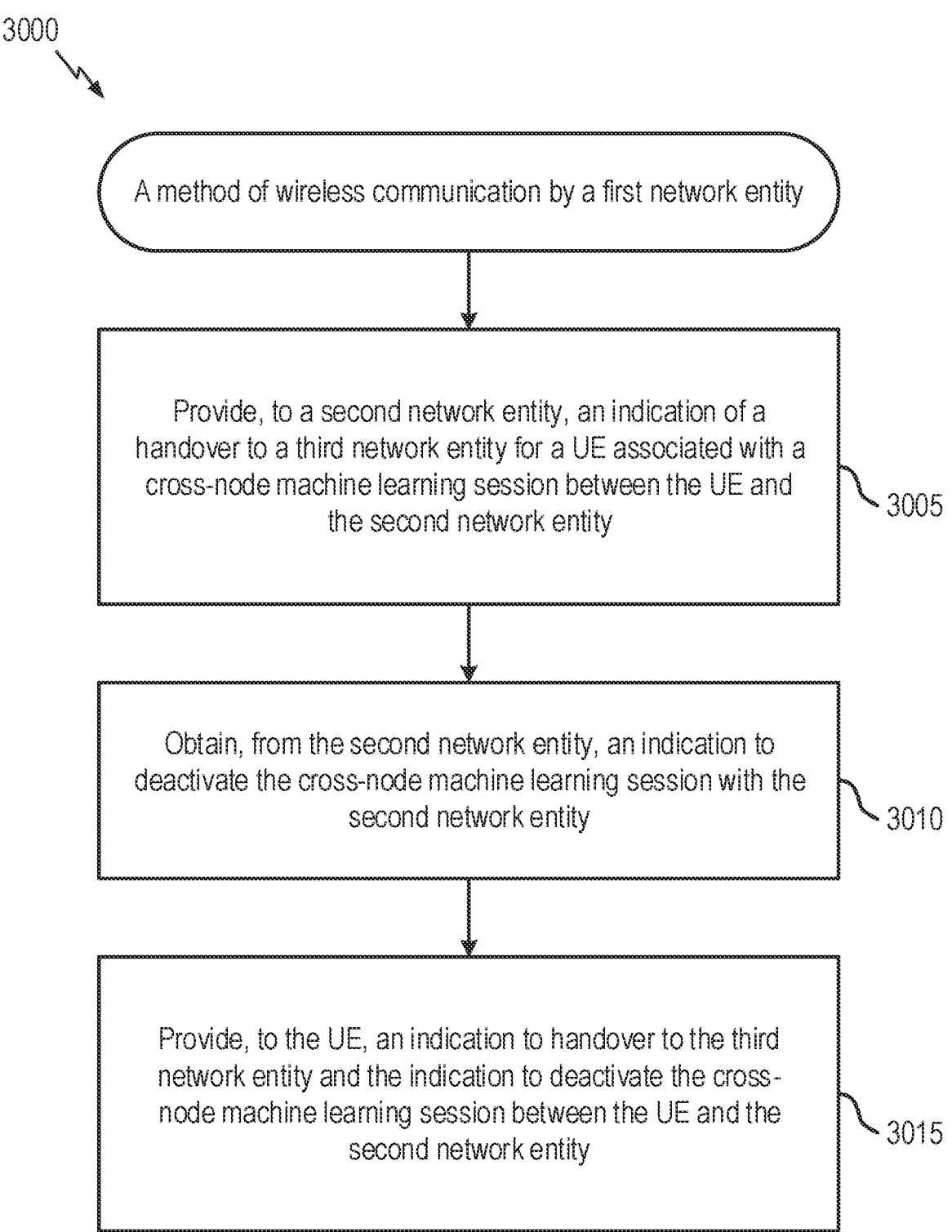

A method of wireless communication by a first network entity

Provide, to a second network entity, an indication of a handover to a third network entity for a UE associated with a cross-node machine learning session between the UE and the second network entity — 3005

Obtain, from the second network entity, an indication to deactivate the cross-node machine learning session with the second network entity — 3010

Provide, to the UE, an indication to handover to the third network entity and the indication to deactivate the cross-node machine learning session between the UE and the second network entity — 3015

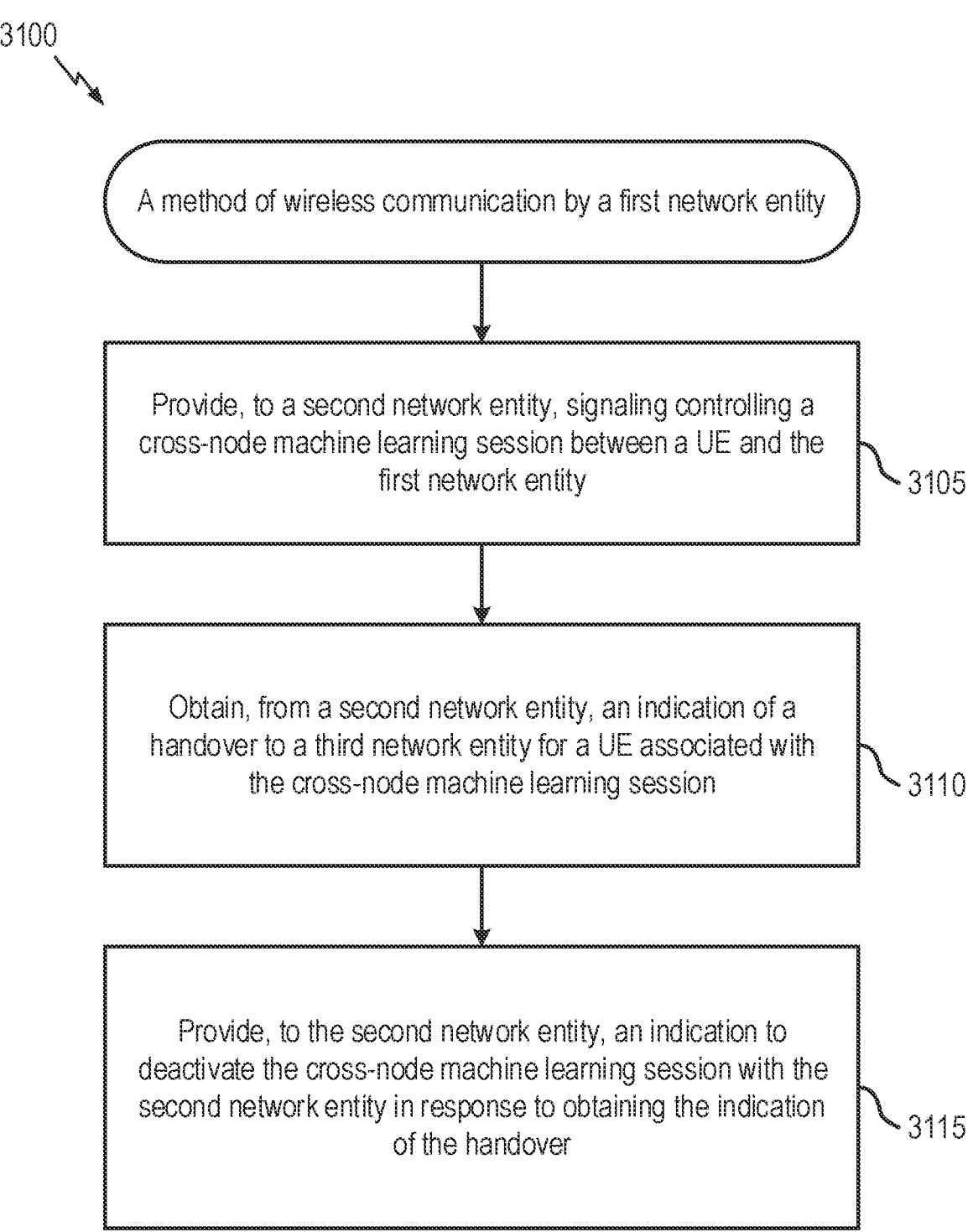

A method of wireless communication by a first network entity

Provide, to a second network entity, signaling controlling a cross-node machine learning session between a UE and the first network entity                                      3105

Obtain, from a second network entity, an indication of a handover to a third network entity for a UE associated with the cross-node machine learning session                     3110

Provide, to the second network entity, an indication to deactivate the cross-node machine learning session with the second network entity in response to obtaining the indication of the handover                                     3115

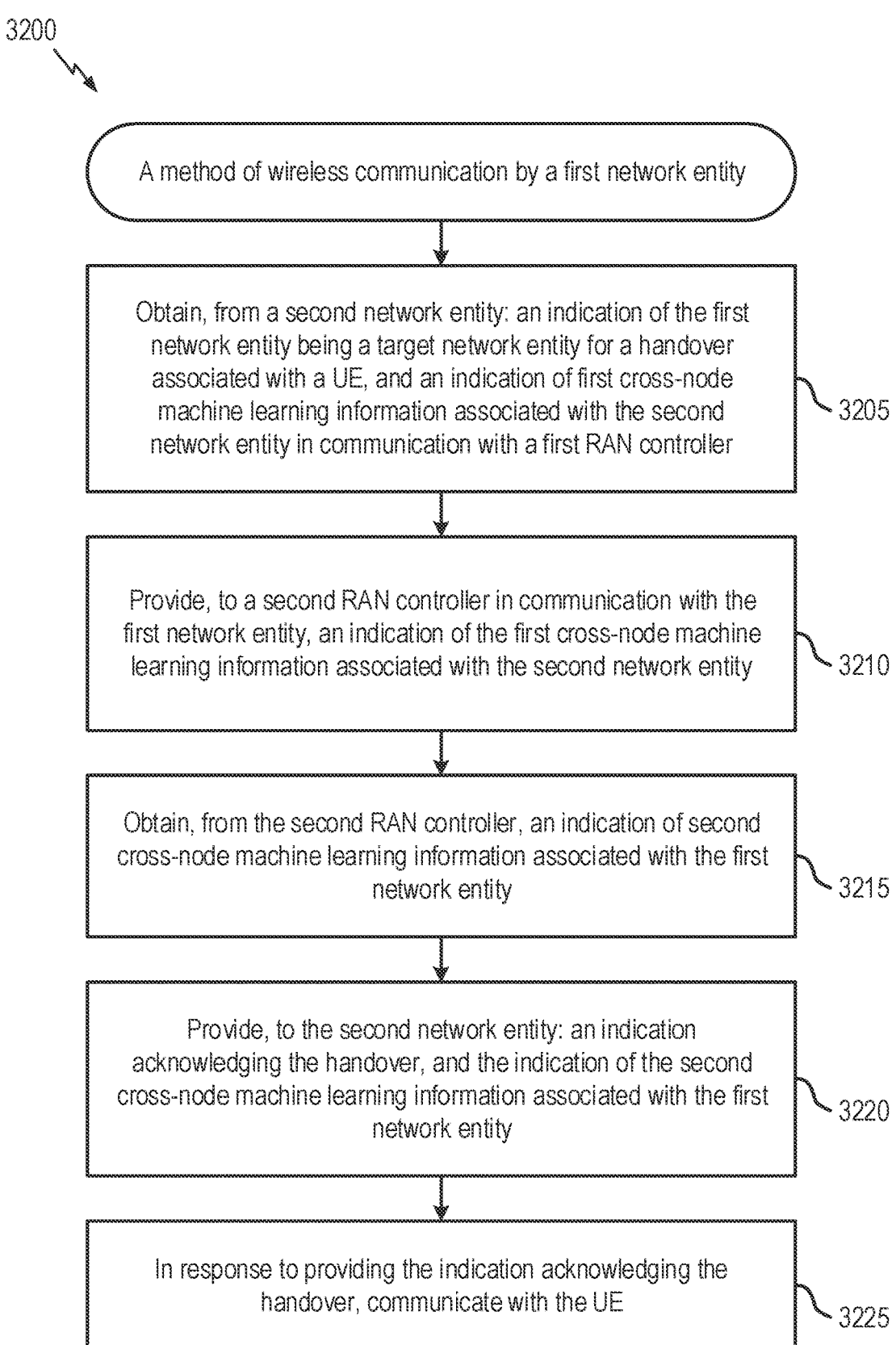

A method of wireless communication by a first network entity

Obtain, from a second network entity: an indication of the first network entity being a target network entity for a handover associated with a UE, and an indication of first cross-node machine learning information associated with the second network entity in communication with a first RAN controller — 3205

Provide, to a second RAN controller in communication with the first network entity, an indication of the first cross-node machine learning information associated with the second network entity — 3210

Obtain, from the second RAN controller, an indication of second cross-node machine learning information associated with the first network entity — 3215

Provide, to the second network entity: an indication acknowledging the handover, and the indication of the second cross-node machine learning information associated with the first network entity — 3220

In response to providing the indication acknowledging the handover, communicate with the UE — 3225

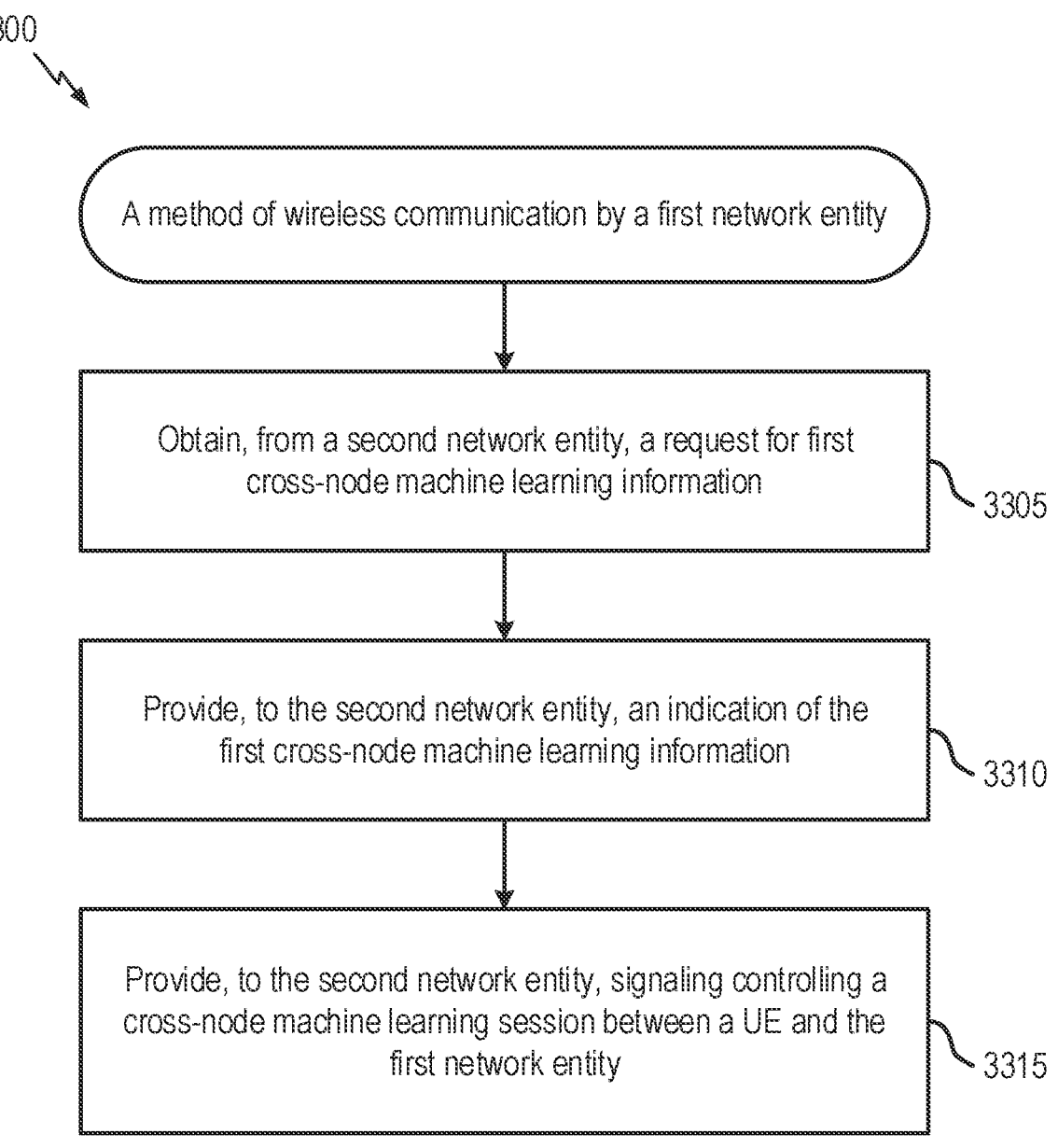

A method of wireless communication by a first network entity

Obtain, from a second network entity, a request for first cross-node machine learning information

3305

Provide, to the second network entity, an indication of the first cross-node machine learning information

3310

Provide, to the second network entity, signaling controlling a cross-node machine learning session between a UE and the first network entity

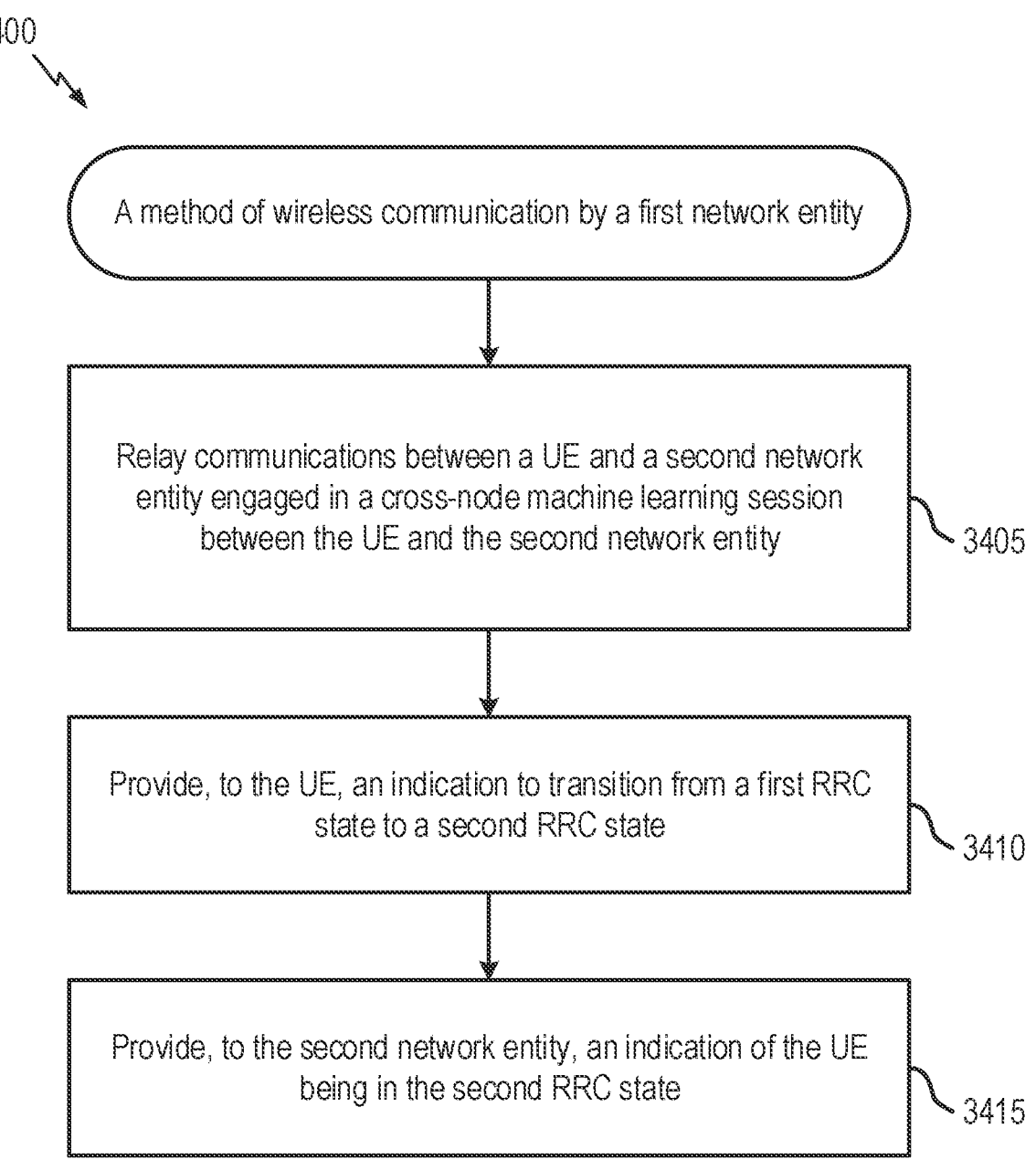

3400

A method of wireless communication by a first network entity

Relay communications between a UE and a second network entity engaged in a cross-node machine learning session between the UE and the second network entity

3405

Provide, to the UE, an indication to transition from a first RRC state to a second RRC state

3410

Provide, to the second network entity, an indication of the UE being in the second RRC state

A method of wireless communication by a first network entity

Obtain, from a second network entity, an indication of a UE being in a RRC state
3505

Provide, to the second network entity, signaling controlling a cross-node machine learning session between the UE and the first network entity in response to obtaining the indication of the UE being in the RRC state
3510

3600

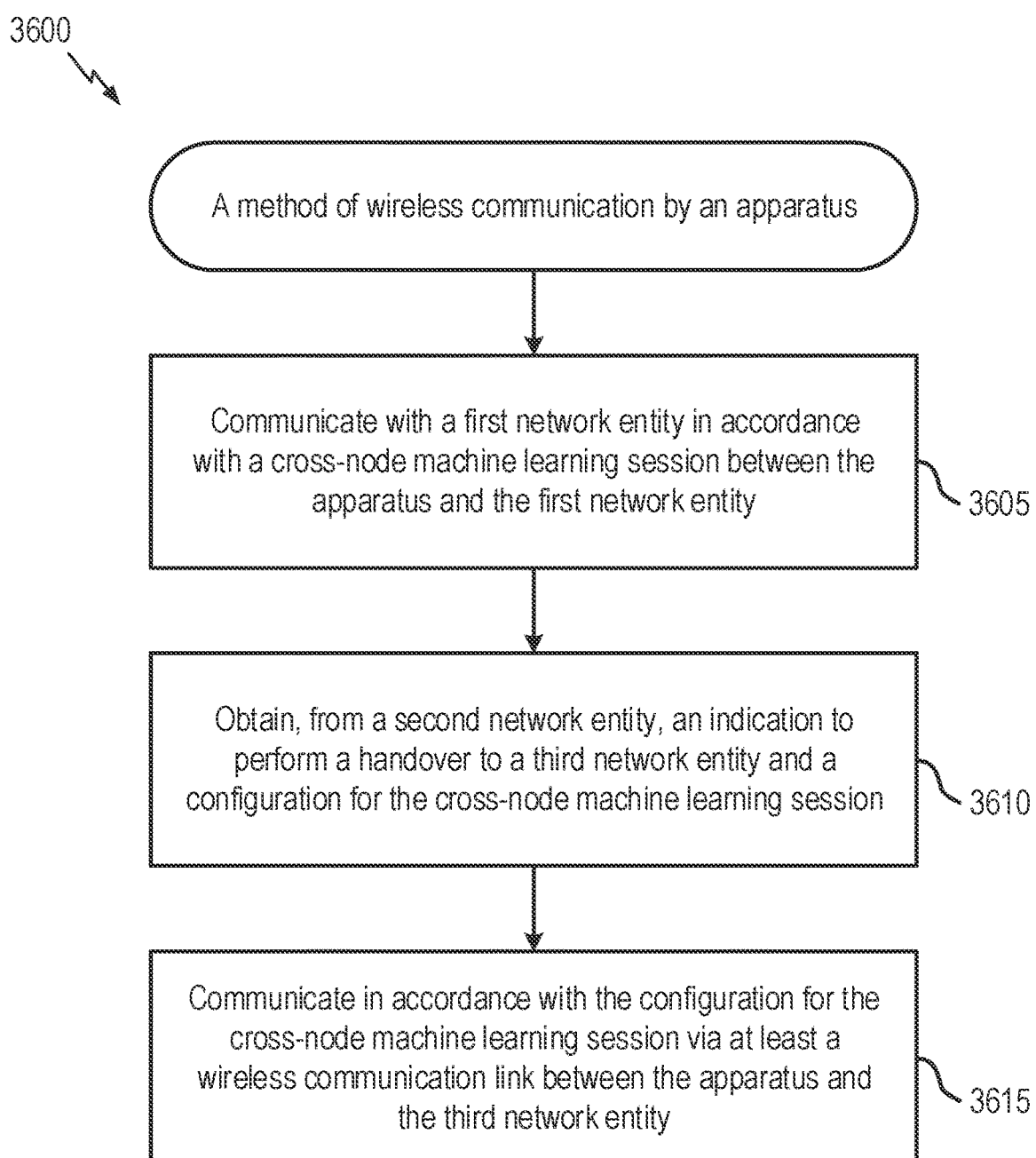

A method of wireless communication by an apparatus

Communicate with a first network entity in accordance with a cross-node machine learning session between the apparatus and the first network entity — 3605

Obtain, from a second network entity, an indication to perform a handover to a third network entity and a configuration for the cross-node machine learning session — 3610

Communicate in accordance with the configuration for the cross-node machine learning session via at least a wireless communication link between the apparatus and the third network entity — 3615

MOBILITY HANDLING OF CROSS-NODE MACHINE LEARNING SESSION IN A RADIO ACCESS NETWORK

FIELD OF THE DISCLOSURE

Aspects of the present disclosure relate to wireless communications, and more particularly, to techniques for implementing machine learning and/or artificial intelligence aspects in a radio access network (RAN).

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communication by a first network entity. The method includes obtaining, from a second network entity, an indication of a handover for a user equipment (UE); obtaining, from a third network entity, an indication of first cross-node machine learning information associated with a cross-node machine learning session between the UE and the third network entity; providing, to the second network entity, an indication acknowledging the handover; and relaying communications between the UE and the third network entity for the cross-node machine learning session.

Another aspect provides a method of wireless communication by a first network entity. The method includes providing, to a second network entity, an indication of a handover for a UE; obtaining an indication of first cross-node machine learning information associated with the second network entity; and providing, to the UE, a handover command indicating the first cross-node machine learning information for a cross-node machine learning session between the UE and a third network entity.

Another aspect provides a method of wireless communication by a first network entity. The method includes providing, to a second network entity, first signaling controlling a cross-node machine learning session between a UE and the first network entity; providing, to a third network entity, an indication of first cross-node machine learning information associated with the cross-node machine learning session; and providing, to the third network entity, second signaling controlling the cross-node machine learning session in response to a handover for the UE from the second network entity to the third network entity.

Another aspect provides a method of wireless communication by a first network entity. The method includes providing, to a UE, an indication to deactivate a cross-node machine learning session between the UE and a second network entity; providing, to the second network entity, an indication that the UE is deactivating the cross-node machine learning session; and providing, to the UE, an indication to handover to a third network entity.

Another aspect provides a method of wireless communication by a first network entity. The method includes obtaining machine learning input data associated with a cross-node machine learning session between a UE and the first network entity; obtaining, from a second network entity, an indication that the UE is deactivating the cross-node machine learning session; obtaining, from a third network entity, a request to activate the cross-node machine learning session; and providing, to the third network entity, a configuration associated with the cross-node machine learning session for the UE in response to obtaining the request.

Another aspect provides a method of wireless communication by a first network entity. The method includes providing, to a second network entity, an indication of a handover for a UE associated with a cross-node machine learning session between the UE and the second network entity; obtaining, from a third network entity, an indication of first cross-node machine learning information associated with the third network entity; and providing, to the UE, an indication to handover to the third network entity and an indication of the first cross-node machine learning information associated with the third network entity.

Another aspect provides a method of wireless communication by a first network entity. The method includes obtaining, from a second network entity, an indication of a handover for a UE associated with a cross-node machine learning session between the UE and the first network entity; in response to obtaining the indication of the handover, providing, to a third network entity, an indication of cross-node machine learning information associated with the first network entity; and providing, to the third network entity, signaling controlling the cross-node machine learning session.

Another aspect provides a method of wireless communication by a first network entity. The method includes obtaining, from a second network entity, an indication of first cross-node machine learning information associated with a cross-node machine learning session between a UE and a third network entity; obtaining, from the third network entity, an indication of second cross-node machine learning information associated with the third network entity; providing, to the second network entity, an indication of the second cross-node machine learning information; and communicating with the UE in response to providing the indication of the second cross-node machine learning information.

Another aspect provides a method of wireless communication by a first network entity. The method includes obtaining, from a second network entity: an indication of a third network entity being a target network entity for a handover associated with a UE, and an indication of cross-node machine learning information associated with the third network entity; and providing, to the UE: an indication to handover to the third network entity, and an indication of the cross-node machine learning information associated with the third network entity.

Another aspect provides a method of wireless communication by a first network entity. The method includes providing, to a second network entity, first signaling controlling a cross-node machine learning session between a UE and the first network entity; providing, to a third network entity, an indication of first cross-node machine learning information associated with the cross-node machine learning session; providing, to the second network entity: an indication of the third network entity being a target network entity for a handover associated with the UE, and an indication of second cross-node machine learning information associated with the third network entity; and providing, to the third network entity, second signaling controlling the cross-node machine learning session between the UE and the first network entity.

Another aspect provides a method of wireless communication by a first network entity. The method includes obtaining, from a second network entity, an indication of cross-node machine learning information associated with a cross-node machine learning session between a UE and the second network entity; obtaining, from a third network entity, an indication of a handover associated with the UE; providing, to the third network entity, an indication acknowledging the handover; and communicating with the UE in response to providing the indication acknowledging the handover.

Another aspect provides a method of wireless communication by a first network entity. The method includes providing, to a second network entity, an indication of a handover to a third network entity for a UE associated with a cross-node machine learning session between the UE and the second network entity; obtaining, from the second network entity, an indication to deactivate the cross-node machine learning session with the second network entity; and providing, to the UE, an indication to handover to the third network entity and the indication to deactivate the cross-node machine learning session between the UE and the second network entity.

Another aspect provides a method of wireless communication by a first network entity. The method includes providing, to a second network entity, signaling controlling a cross-node machine learning session between a UE and the first network entity; obtaining, from a second network entity, an indication of a handover to a third network entity for a UE associated with the cross-node machine learning session; and providing, to the second network entity, an indication to deactivate the cross-node machine learning session with the second network entity in response to obtaining the indication of the handover.

Another aspect provides a method of wireless communication by a first network entity. The method includes obtaining, from a second network entity: an indication of the first network entity being a target network entity for a handover associated with a UE, and an indication of first cross-node machine learning information associated with the second network entity in communication with a first RAN controller; providing, to a second RAN controller in communication with the first network entity, an indication of the first cross-node machine learning information associated with the second network entity; obtaining, from the second RAN controller, an indication of second cross-node machine learning information associated with the first network entity; providing, to the second network entity: an indication acknowledging the handover, and the indication of the second cross-node machine learning information associated with the first network entity; and in response to providing the indication acknowledging the handover, communicating with the UE.

Another aspect provides a method of wireless communication by a first network entity. The method includes obtaining, from a second network entity, a request for first cross-node machine learning information; providing, to the second network entity, an indication of the first cross-node machine learning information; and providing, to the second network entity, signaling controlling a cross-node machine learning session between a UE and the first network entity.

Another aspect provides a method of wireless communication by a first network entity. The method includes relaying communications between a UE and a second network entity engaged in a cross-node machine learning session between the UE and the second network entity; providing, to the UE, an indication to transition from a first radio resource control (RRC) state to a second RRC state; and providing, to the second network entity, an indication of the UE being in the second RRC state.

Another aspect provides a method of wireless communication by a first network entity. The method includes obtaining, from a second network entity, an indication of a UE being in a RRC state; and providing, to the second network entity, signaling controlling a cross-node machine learning session between the UE and the first network entity in response to obtaining the indication of the UE being in the RRC state.

Another aspect provides a method of wireless communication by an apparatus. The method includes communicating with a first network entity in accordance with a cross-node machine learning session between the apparatus and the first network entity; obtaining, from a second network entity, an indication to perform a handover to a third network entity and a configuration for the cross-node machine learning session; and communicating in accordance with the configuration for the cross-node machine learning session via at least a wireless communication link between the apparatus and the third network entity.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 19 depicts a method for wireless communications.

FIG. 20 depicts another method for wireless communications.

FIG. 21 depicts another method for wireless communications.

FIG. 22 depicts another method for wireless communications.

FIG. 23 depicts another method for wireless communications.

FIG. 24 depicts another method for wireless communications.

FIG. 25 depicts another method for wireless communications.

FIG. 26 depicts another method for wireless communications.

FIG. 27 depicts another method for wireless communications.

FIG. 28 depicts another method for wireless communications.

FIG. 29 depicts another method for wireless communications.

FIG. 30 depicts another method for wireless communications.

FIG. 31 depicts another method for wireless communications.

FIG. 32 depicts another method for wireless communications.

FIG. 33 depicts another method for wireless communications.

FIG. 34 depicts another method for wireless communications.

FIG. 36 depicts another method for wireless communications.

DETAILED DESCRIPTION

Figure 1:
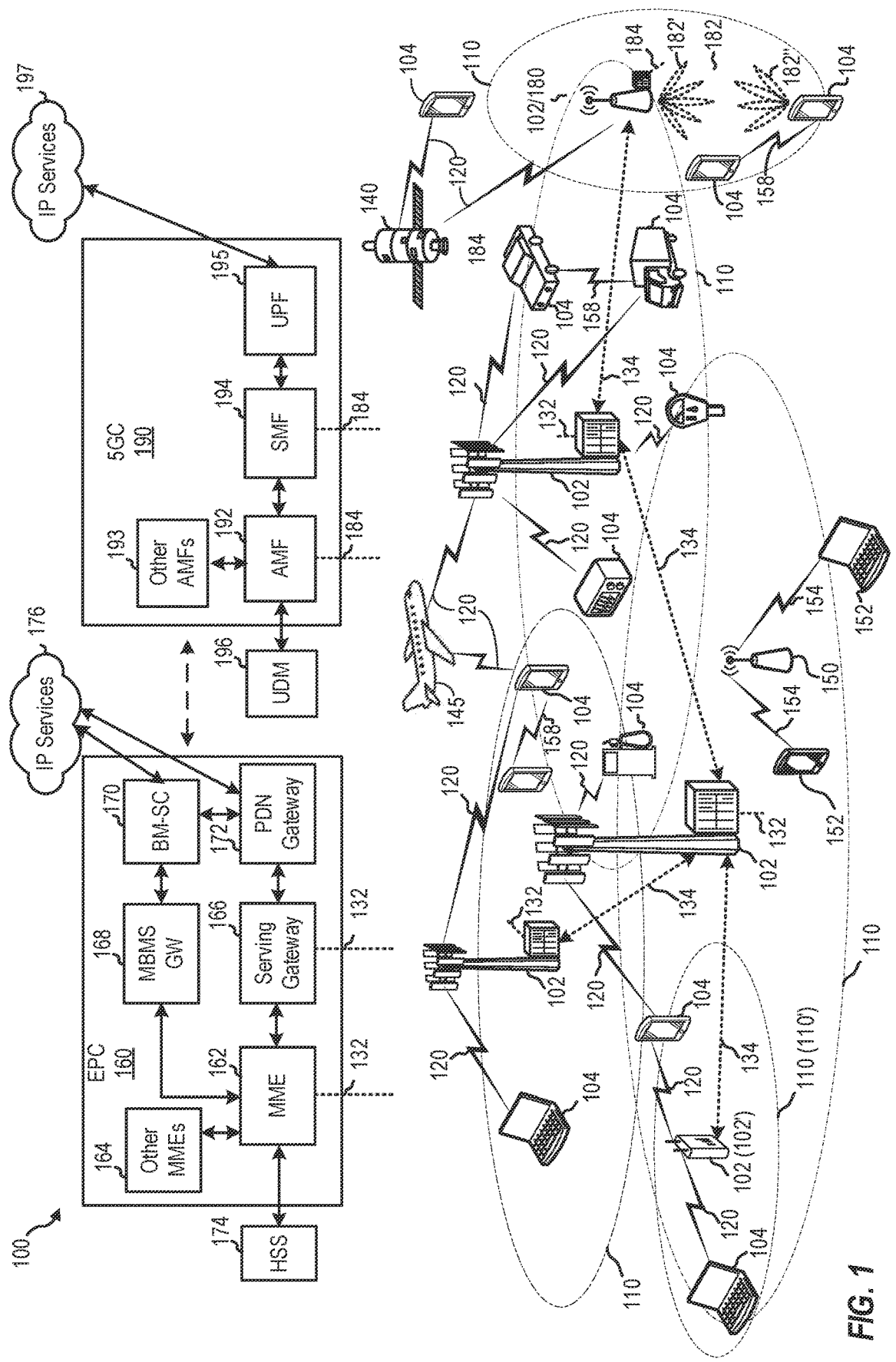
FIG. 1 depicts an example wireless communications network.

Aspects of the present disclosure provide apparatuses, methods, processing systems, and computer-readable mediums for handling user equipment (UE) mobility for cross-node artificial intelligence (AI) and/or machine learning (ML) operations in a radio access network (RAN).

In certain cases, a wireless communications system (e.g., a wireless wide area network (WWAN) including, for example, 5G New Radio and/or future WWAN systems) may employ AI/ML to perform any of various wireless communication operations, such as channel state information estimation, beam management, device positioning, etc. As an example, a radio access network entity (e.g., a base station including a disaggregated base station as further described herein) and a user equipment (UE) may apply paired or distributed AI/ML model(s) over which a joint inference may be used among the network entity and the UE. A joint inference may use an AI/ML model that is shared among certain entities in a wireless communication system, such as a UE and a base station. In some cases, a network entity (e.g., a base station) may perform certain AI/ML computations based at least in part on AI/ML input obtained from the UE (e.g., decoding or decompression of AI/ML-based feedback or input from the UE). However, the AI/ML processing performed at the network entity, such as a base station and/or disaggregated entities thereof, may be computationally intensive.

As example technical problems, the AI/ML processing may use computational resources (e.g., processing and/or storage) that could be used for other operations (e.g., scheduling and/or managing wireless communications), especially when a base station is tasked with managing the communication links for multiple UEs and/or multiple ML functions or models for one or more UEs. For example, the AI/ML processing may consume the processing capabilities of the base station to perform certain network functions, such as scheduling and/or wireless communications management, within a particular performance specification (e.g., a specified latency or reliability), or vice versa. In certain cases, deploying additional computational resources to base stations for AI/ML processing may be a costly endeavor for radio access network (RAN) operators.

Aspects described herein overcome the aforementioned technical problem(s) by providing signaling to handle UE mobility for a cross-node AI/ML session between the UE and a network entity in a cloud-based RAN architecture, such as a virtual RAN (V-RAN) and/or open RAN (O-RAN). As a UE may engage in a handover from one cell coverage area to another cell coverage, an existing cross-node AI/ML session between the UE and a RAN controller in the cloud-based RAN may be deactivated, transferred, and/or reinitiated in response to the handover. As an example, in response to a handover, a cross-node AI/ML session between the UE and the RAN controller may be deactivated, and in some cases, reinitiated after the handover is completed. In certain cases, a cross-node AI/ML session between the UE and the RAN controller may be preserved (e.g., kept alive) during the handover. For example, a source base station may provide, to a target base station, information related to preserving the cross-node AI/ML session, and when the UE completes the handover from the source base station to the target base station, the cross-node AI/ML session between the UE and the RAN controller may continue to exchange AI/ML information (e.g., input data, model data, model parameters, etc.).

The techniques for signaling to handle UE mobility for a cross-node AI/ML session as described herein may provide any of various beneficial effects and/or advantages. A cross-node AI/ML operation or session between a UE and a RAN controller in a cloud-based RAN for joint inference implementations may allow the RAN-side AI/ML processing to be performed efficiently (e.g., reduced processing latencies, dynamic load balancing, resource sharing, etc.) and distributed across a cloud platform (which may facilitate the reduced processing latencies, dynamic load balancing, resource sharing, etc.), such as an RIC. In some cases, the cross-node AI/ML session may allow RAN-side AI/ML processing to be performed at a specialized AI/ML computing device, such as a cloud server having one or more neural network processors, one or more graphical processing units, or any suitable AI/ML specific processor. The specialized AI/ML computing device may have the capability to perform AI/ML computations more efficiently compared to a general purpose processor, such as a microprocessor, which may be employed at a base station or an entity associated with a disaggregated base station. Thus, the UE mobility handling associated with the cross-node AI/ML session described herein may facilitate improved wireless communication performance, including, for example, increased throughput, decreased latency, increased network capacity, spectral efficiencies, etc., due to the efficient RAN-side AI/ML processing enabled by the cross-node AI/ML session and/or offloading of RAN-side AI/ML processing to a RAN controller from a base station and/or entity associated with a disaggregated base station.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
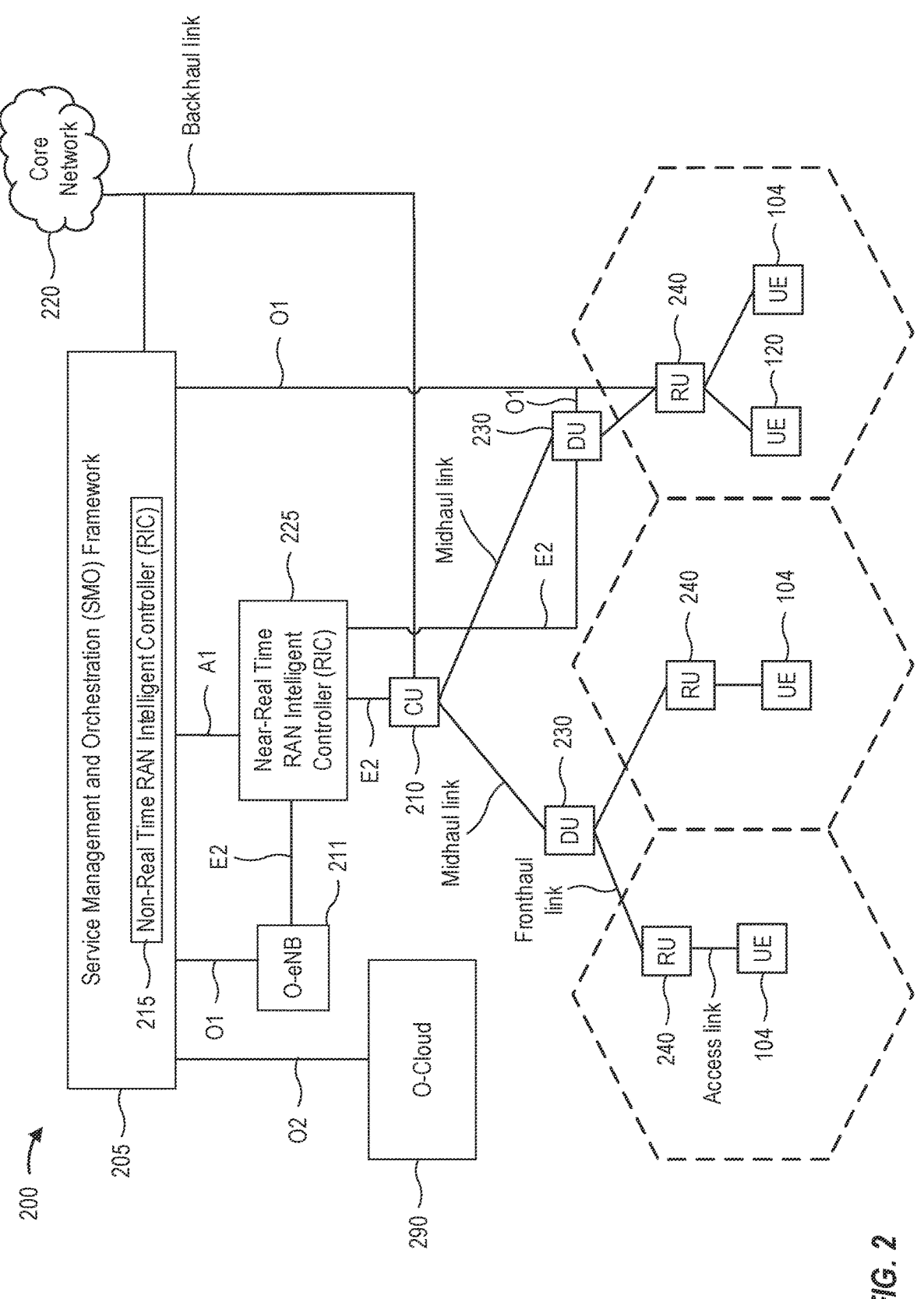
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control (e.g., greater than 1 s) and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control (e.g., in the order of 10 ms-1 s) and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML functions or models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
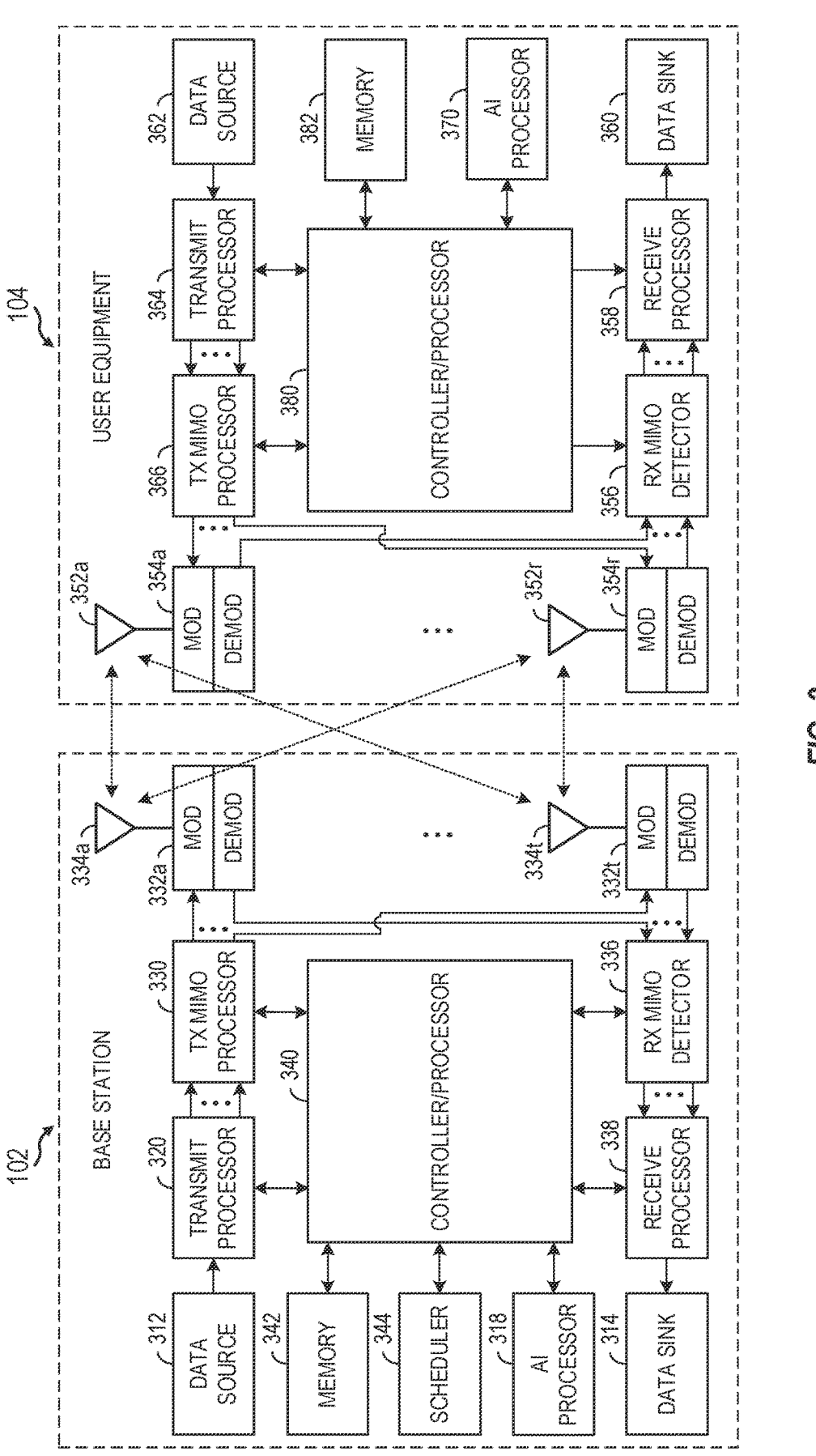
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively, such as neural network processing, deep learning, tensor processing, etc. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., non-line of sight positioning). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
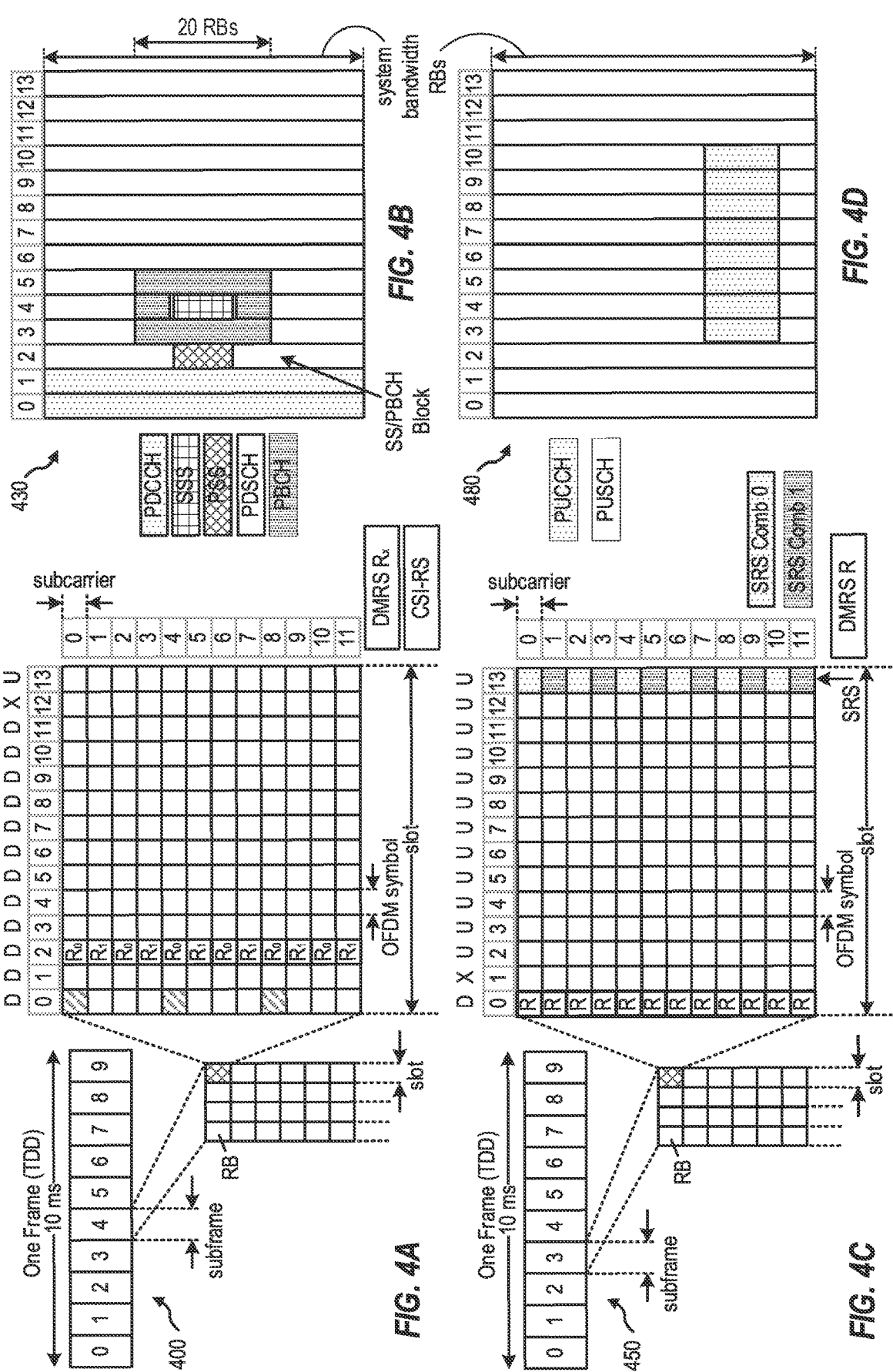
FIGS. 4A, 4B, 4C, and 4D depict various example aspects of data structures for a wireless communications network.

In particular, FIG. 4A is a diagram 400 illustrating an example of a first subframe within a 5G (e.g., 5GNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology $\mu$, there are 2 slots per subframe. Thus, numerologies ($\mu$) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^\mu \times 15$ kHz, where $\mu$ is the numerology 0 to 6. As an example, the numerology $\mu$=0 corresponds to a subcarrier spacing of 15 kHz, and the numerology $\mu$=6 corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology μ=2 with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

In certain cases, a wireless communications system (e.g., a WWAN including, for example, a 5G New Radio system and/or any future wireless communications system) may employ AI/ML to perform any of various wireless communication operations, such as channel state information estimation or feedback, beam management, device positioning, etc. As an example, an AI/ML model (e.g., a joint inference model used at the UE) may allow the UE to estimate the channel conditions of a particular communication link (e.g., one or more beams and/or frequency bands) based on measurements associated with a different communication link (e.g., different beams and/or frequency bands). The AI/ML model may allow a UE to predict the channel conditions associated with one or more narrow beams based on channel measurements associated with one or more wide beams. In certain aspects, a joint inference may be used at a UE and a network entity in a RAN. In such cases, the network entity (e.g., a base station) may perform certain AI/ML computations based at least in part on AI/ML input obtained from the UE (e.g., decoding or decompression of AI/ML-based feedback or input from the UE).

As an example, an AI/ML-based channel state information feedback (CSF) encoder may be deployed at the UE to provide compressed CSI (which may be readable by an AI/ML model) to the RAN, and an AI/ML-based CSF decoder may be deployed at the network entity to decompress the CSF and use the CSF for channel scheduling and/or configuration of a communication link with the UE and/or other UEs. In some cases, the AI/ML model may be used to predict or infer the channel conditions associated with the communication link between the UE and the network entity. The AI/ML-based channel conditions may be used to determine any of various wireless communication parameters associated with the communication link, such as a frequency band, subcarrier spacing, channel bandwidth, bandwidth part, time division duplex pattern, modulation and coding scheme (MCS), code rate, carrier aggregation, etc. In some cases, a partial inference may be performed at the UE, and then the remaining inference may be performed at the RAN, and/or vice versa. The UE may receive AI/ML specific control or input from the RAN, and/or vice versa. However, the AI/ML processing performed at the network entity, such as a base station and/or certain disaggregated entities thereof (e.g., a CU and/or DU), may be computationally intensive.

The AI/ML processing may use computational resources (e.g., processing and/or storage) that could be used for other operations (e.g., scheduling and/or managing wireless communications), especially when a base station is tasked with managing the communication links for multiple UEs and/or multiple ML models for one or more UEs. In some cases, the AI/ML processing may consume the processing capabilities of the base station to perform certain network functions, such as scheduling and/or wireless communications management, within a particular performance specification (e.g., a specified latency), or vice versa. In certain cases, deploying additional computational resources to base stations for AI/ML processing may be a costly endeavor for radio access network (RAN) operators.

Aspects Related to Mobility Handling of Cross-Node Machine Learning Operations in a RAN Certain aspects of the present disclosure provide signaling to handle UE mobility for a cross-node AI/ML session between the UE and a RAN controller in a cloud-based RAN architecture, such as a V-RAN or O-RAN.

Generally, a cross-node AI/ML session between a UE and a network entity may refer to a scenario where a UE and a network entity perform AI/ML operations, for example, using a shared AI/ML function or model for predicting, inferring, encoding, and/or decoding certain information associated with a wireless communication link, such as channel characteristics, device positioning, and/or beam management. In certain cases, a cross-node AI/ML session may include a UE using an AI/ML model to predict, infer, encode, and/or decode the information associated with the wireless communication link, and the cross-node AI/ML session may further include the network entity monitoring the performance of the AI/ML model deployed at the UE and performing certain lifecycle management tasks associated with the AI/ML model. In some cases, the UE may send, to the network entity, AI/ML input(s) (e.g., measurements associated with channel conditions) and/or AI/ML output(s) (e.g., channel state feedback) for processing or monitoring at the network entity, or vice versa. As further described herein, the AI/ML processing at the RAN for a joint inference associated with a UE-network entity pair (e.g., a cross-node) may be offloaded to a separate computing device, such as a RIC in a cloud-based RAN architecture (e.g., V-RAN and/or O-RAN), independent from a base station and/or certain disaggregated network entities associated with a base station, such as an E2 node.

An E2 node may include any physical or logical RAN node having a terminating E2 interface including, for example, a CU (for control plane and/or user plane traffic) and/or a DU. A cloud-based RAN may use a cloud computing environment to facilitate interoperable interfaces, RAN virtualization, and/or AI/ML operations. A cloud-based RAN may use a shared pool of configurable computing resources (e.g., networks, network bandwidth, servers, processing, memory, storage, applications, virtual machines, and services) to perform certain network functions, for example, as described herein with respect to FIG. 2. In some cases, the cloud-based RAN may use off-the-shelf hardware for the cloud computing environment, such as the SMO framework 205, Non-RT RIC 215, Near-RT RIC 225, CU 210, DU 230, etc.

In certain aspects, a source E2 node may select a target E2 node for a handover and notify a RAN controller serving a cross-node AI/ML session of such selection. As an example, the source E2 node may notify the target E2 node of an ongoing cross-node AI/ML session between a UE and a RAN controller to enable preservation of the cross-node session and notify the RAN controller of the handover to the target E2 node.

For certain aspects, a RAN controller (e.g., a Near-RT RIC) may select a target E2 node for the handover. Such a selection at the RAN controller may allow the RAN controller to select a target E2 node that is capable of preserving the cross-node AI/ML session. For example, the RAN controller may notify a source E2 node of the selected target E2 node for the handover, and the RAN controller may initiate a RIC subscription process with the target E2 node as further described herein.

In certain aspects, the handover may involve a handover between different RAN controllers, for example, from a source Near-RT RIC to a target Near-RT RIC. In some cases, the source Near-RT RIC may determine that the target E2 node may be in communication with the target Near-RT RIC, and the source Near-RT RIC may deactivate the cross-node AI/ML session with the UE. In certain cases, the target E2 node may query the target Near-RT RIC to determine if the target Near-RT RIC supports the on-going cross-node AI/ML session between the UE and the source Near-RT RIC, and the target E2 node may notify the source E2 node of the supported cross-node AI/ML features at the target Near-RT RIC.

Figure 5A:
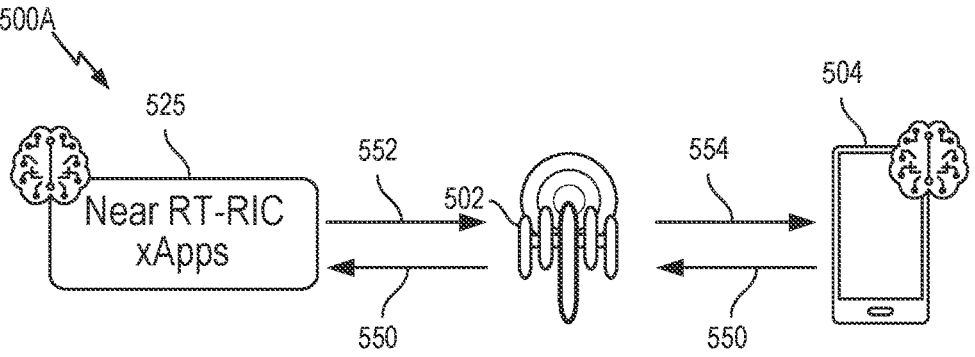
FIGS. 5A and 5B depict example communications flow associated with a cross-node artificial intelligence and/or machine learning (AI/ML) session between a UE and a radio access network (RAN) controller in example wireless communications networks, respectively.
Figure 5B:
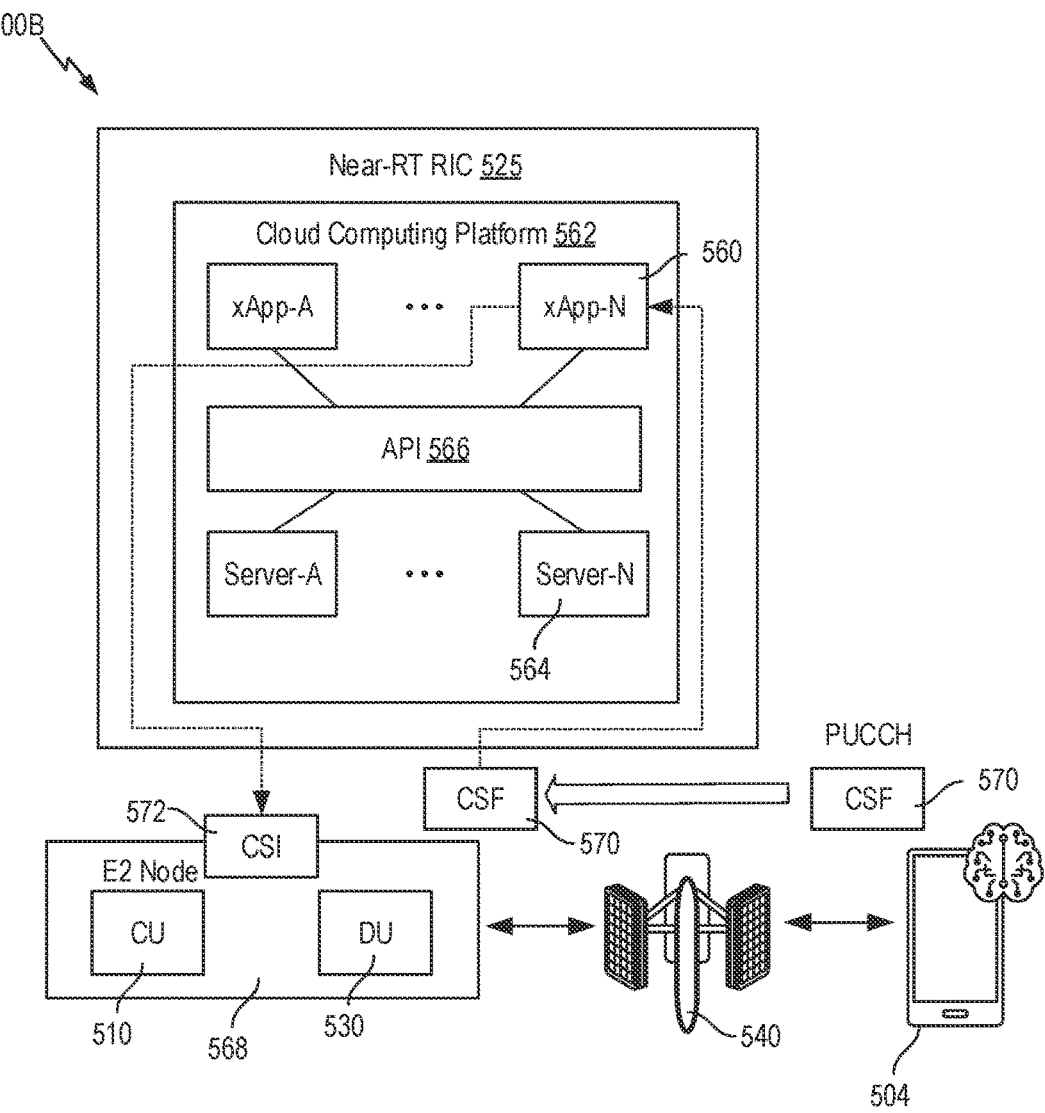

FIGS. 5A and 5B depict example communications flow associated with an example cross-node AI/ML session between a UE and a RAN controller in wireless communications networks 500A, 500B, respectively.

Referring to FIG. 5A, a UE 504 may provide AI/ML input 550 (e.g., CSF) to an xApp (e.g., the xApp 560 in FIG. 5B) running in a cloud platform (e.g., the cloud platform 562 including one or more (virtual) servers 564 in communication with the xApp 560 via an API 566) associated with a Near-RT RIC 525 via a base station 502. The xApp may be or include an application designed to run on the near-RT RIC. Such an application may include one or more microservices and at the point of on-boarding may identify which data the application consumes and which data the application provides. The xApp may be independent of the near-RT RIC and may be provided by any third party. The E2 may enable a direct association between the xApp and the RAN functionality. The xApp may process the AI/ML input 550 (e.g., decoding CSF obtained from the UE 504) and the xApp may output, to the base station 502, a RIC control message 552 (which may indicate AI/ML output and/or control information) based on the processed UE AI/ML input. The base station 502 may output, to the UE 504, an indication of AI/ML control information and/or input 554 (e.g., an updated AI model, communication link configuration, etc.) based on the RIC control message 552.

FIG. 5B illustrates an example where the cross-node AI/ML session facilitates channel state information feedback (CSF) from the UE 504 to a disaggregated base station (e.g., an E2 node 568 including a CU 510 and/or a DU 530). The UE 504 may provide encoded CSF 570 to the xApp 560 via a disaggregated base station (including an RU 540, a DU 530, and a CU 510, for example, as described in FIG. 2). The xApp 560 may decode the CSF to generate reconstructed CSI (e.g., via an AI/ML inference associated with the encoded CSF), and the xApp 560 may output the reconstructed CSI to an E2 node 568 including, for example, the CU 510 and/or the DU 530. The E2 node 568 may determine a configuration associated with the communication link between the UE 504 and the RU 540 based on the reconstructed CSI 572. For example, the E2 node 568 may adjust a modulation and coding scheme (MCS), a code rate (e.g., the proportion of the data-stream that is non-redundant), a number of aggregated component carriers, a number of MIMO layers, a channel bandwidth, a subcarrier spacing, a frequency range (e.g., FR1 or FR2 under 5G NR), a particular beam (e.g., orientation, direction, shape, etc.), etc.

The RAN-side AI/ML operation(s) associated with the cross-node AI/ML session may be performed at the Near-RT RIC 525 via a cloud platform 562 running the xApp 560, which may be or include an AI/ML-specific application. The RAN-side AI/ML operations may be offloaded from the CU 510 and/or DU 530 to the xApp 560 via the cross-node AI/ML session between the UE 504 and the Near-RT RIC 525, allowing the CU 510 and/or the DU 530 to perform other networking operations, such as scheduling and/or managing communication links (e.g., updating communication link settings) with one or more UEs.

In some cases, the cross-node AI/ML session between the UE 504 and the Near-RT RIC 525 may be used to perform AI/ML assisted CSI encoding/decoding, beam management, and/or device positioning. As an example, a CSF decoder may be deployed at the xApp 560 running at the Near-RT RIC 525 and/or the cloud platform 562 associated with the Near-RT RIC 525. The Near-RT RIC 525 and/or the cloud platform 562 may be collocated with the DU 530 and/or CU 510, for example. The xApp 560 may provide decompressed channel state information to the DU 530 and/or CU 510, which may perform scheduling functions, for example, based on the decompressed channel state information. The cross-node AI/ML session may allow secure AI/ML functions or models to be implemented at the encoder/decoder, for example.

In certain aspects, a cloud-based RAN controller (e.g., a Near-RT RIC) and/or E2 node may obtain capability information associated with a UE. The UE capability information may facilitate the RAN controller and/or E2 node to determine a cross-node AI/ML configuration for the UE. For example, the UE capability information may indicate one or more cross-node AI/ML capabilities associated with the UE, including, for example, an AI/ML function name or identifier, a module structure, an AI/ML feature, and/or an AI/ML feature group. The UE may indicate to the RAN which AI/ML features and corresponding models are supported by the UE.

In certain cases, the RAN may manage the UE AI/ML operations at a feature level, such as a CSI feedback feature, a beam management feature, a device positioning feature, etc. In such cases, the UE AI/ML capability information may include a list of one or more AI/ML feature names, for example, ml-CSIFeedback, ml-beamManagement, ml-Positioning, etc.

In some cases, the RAN may manage the AI/ML models associated with a feature (e.g., device positioning) used at a UE. In such cases, the UE AI/ML capability information may include a list of one or more AI/ML feature names, a list of one or more model identifiers supported per AI/ML feature name, and/or one or more indications that one or more specific models are loaded at the UE (e.g., model load state flag(s)).

In certain cases, the RAN may manage the model structure associated with an AI/ML model used at a UE. For example, the RAN may configure a specific model structure (e.g., indicating a model structure (MS) identifier (ID)) and/or a parameter set (PS) for a feature (e.g., beam management) used at the UE for one or more AI/ML models. As an example, the model structure may identify an architecture associated with a particular AI/ML model, such as decision tree, deep neural network, feedforward neural networks, convolutional neural networks, and transformers. In such cases, the UE AI/ML capability information may include a list of one or more AI/ML feature names and a list of one or more MS IDs supported per AI/ML feature name. In certain aspects, the PS values may not be expected to depend on UE capabilities, and thus, PS information may not be part of the UE capability information.

Example xApp Registration Procedure

Figure 6:
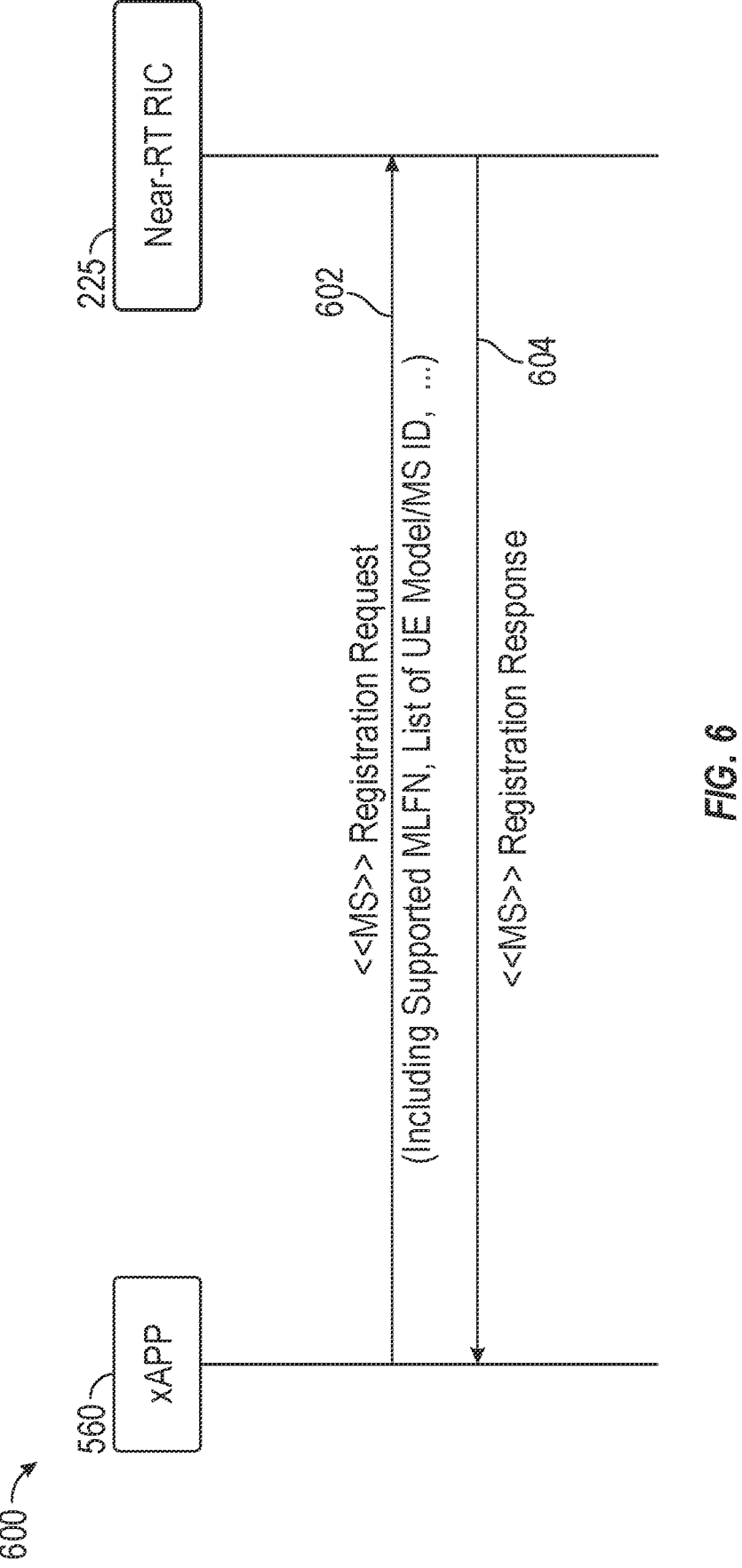
FIG. 6 illustrates a process flow for registering an RAN controller application (xApp) in a cloud-based RAN.

In certain aspects, the xApp may perform a registration procedure with the RIC (e.g., the Near-RT RIC). For example, FIG. 6 illustrates a process flow 600 for registering an xApp in a cloud-based RAN. In some aspects, the xApp 560 and/or the Near-RT RIC 225 may be or include one or more applications running on one or more computational devices, such as one or more (virtual) servers in a cloud platform (e.g., a cloud-based RAN). The communications between the xApp 560 and the Near-RT RIC 225 may represent communications among applications or software via an API, such as the API 566 of FIG. 5.

At 602, the xApp 560 sends a registration request to a RIC, such as the Near-RT RIC 225. During the xApp registration, the xApp may provide cross-node AI/ML information, including, for example, the RIC supported RAN function(s) and one or more decoders for UE-side models. The cross-node AI/ML information may include one or more AI/ML functions (e.g., CSF, beam management, and/or positioning), AI/ML features or feature groups (e.g., certain features associated with a function), AI/ML models (e.g., logical AI/ML models), AI/ML model structures (MSs), etc. supported for a cross-node AI/ML session between a UE and the xApp 560. In some cases, cross-node AI/ML information may include the machine learning function name(s) (MLFN), feature(s), and/or feature groups associated with the RAN-side AI/ML processing. The UE-side decoders may be indicated via a list of supported UE-side models and/or MS identifiers (IDs).

At 604, the Near-RT RIC 225 may send, to the xApp 560, a registration response to confirm or acknowledge the registration all or some of the features supported by the xApp 560. For xApp configuration updates, an SMO module of the cloud-based RAN may configure the xApp with updated cross-node AI/ML information (e.g., a new MLFN and/or new models or MSs per MLFN).

Example UE Capability Information Procedure

In certain aspects, the RIC may obtain UE capability information. For example, the RIC may determine various features associated with the cross-node AI/ML session based on the UE capability information as further described herein.

Figure 7:
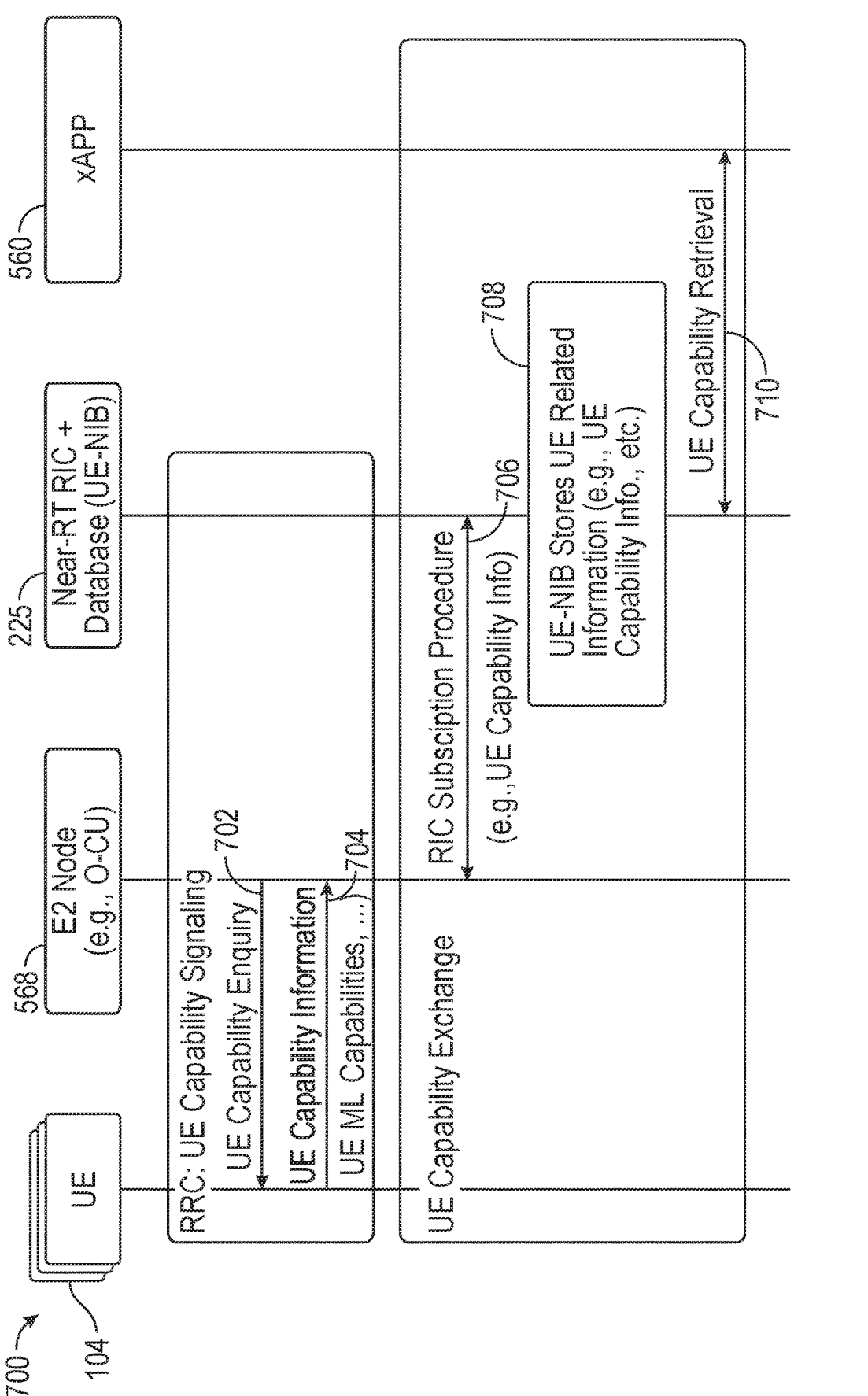
FIG. 7 illustrates a process flow for an RAN controller to obtain UE capability information.

FIG. 7 illustrates a process flow 700 for a RIC to obtain UE capability information. At 702, the E2 node 568 sends, to one or more UEs 104, a request for UE capability information. For example, the E2 node may request the UE capability information via RRC signaling, such as a UE capability enquiry.

At 704, in response to the UE capability enquiry, the UE(s) 104 sends, to the E2 node 568, the corresponding UE capability information. The UE capability information may indicate the AI/ML features or functions that the UE is capable of performing. For example, the UE capability information may include the MLFNs supported by the UE, AI/ML features or feature groups supported by the UE, and/or the MSs supported by the UE.

At 706, the E2 node 568 sends, to the Near-RT RIC 225, the UE capability information associated with a particular UE. For example, the E2 node 568 may provide the UE capability information via a RIC subscription procedure as further described herein with respect to FIG. 8A.

At 708, the Near-RT RIC 225 stores the UE capability information associated with a particular UE in a database, such as a UE network information base (UE-NIB). The UE-NIB may store information in the UE context including, for example, the UE Capability information. In the UE-NIB, the UE capability information for a given UE may be mapped to a UE identifier associated with the UE. The UE-NIB may allow the Near-RT RIC 225 to perform UE-specific control. For example, the Near-RT RIC 225 may provide a UE-specific configuration and/or instructions for cross-node AI/ML session. In some cases, the Near-RT RIC 225 may host the UE-NIB. In certain cases, UE-NIB may be accessible to the Near-RT RIC 225 and/or other entities in the cloud-based RAN, such as an xApp.

At 710, the xApp 560 obtains the UE capability information from the Near-RT RIC 225, for example, via the UE-NIB. In some cases, the xApp 560 may obtain the UE capability information via a fetch data procedure, where the xApp 560 may request data for which the xApp is authorized from the shared data layer (SDL) for local processing.

In certain cases, the xApp 560 may obtain the UE capability information via a subscribe-notify procedure followed by the fetch data procedure. The subscribe-notify procedure may involve the xApp subscribing to the SDL for notification of authorized data changes in the database (e.g., the UE-NIB), such as changes or updates to the UE-NIB. For example, the SDL may notify the xApp of a change to the UE-NIB, and then in response to such a notification, the xApp may perform a fetch data procedure to retrieve the UE capability information indicated as being updated or added to the UE-NIB. In some cases, the xApp 560 may obtain the UE capability information via a subscribe-push procedure, where the xApp 560 may subscribe to the SDL for authorized data changes in the database, and the SDL may send, to the xApp, the type of information changes (e.g., certain meta-data) and, in the same message, the updated data (e.g., UE capability information).

Example Cross-Node AI/ML Support Procedures

Figures 8A, 8B:
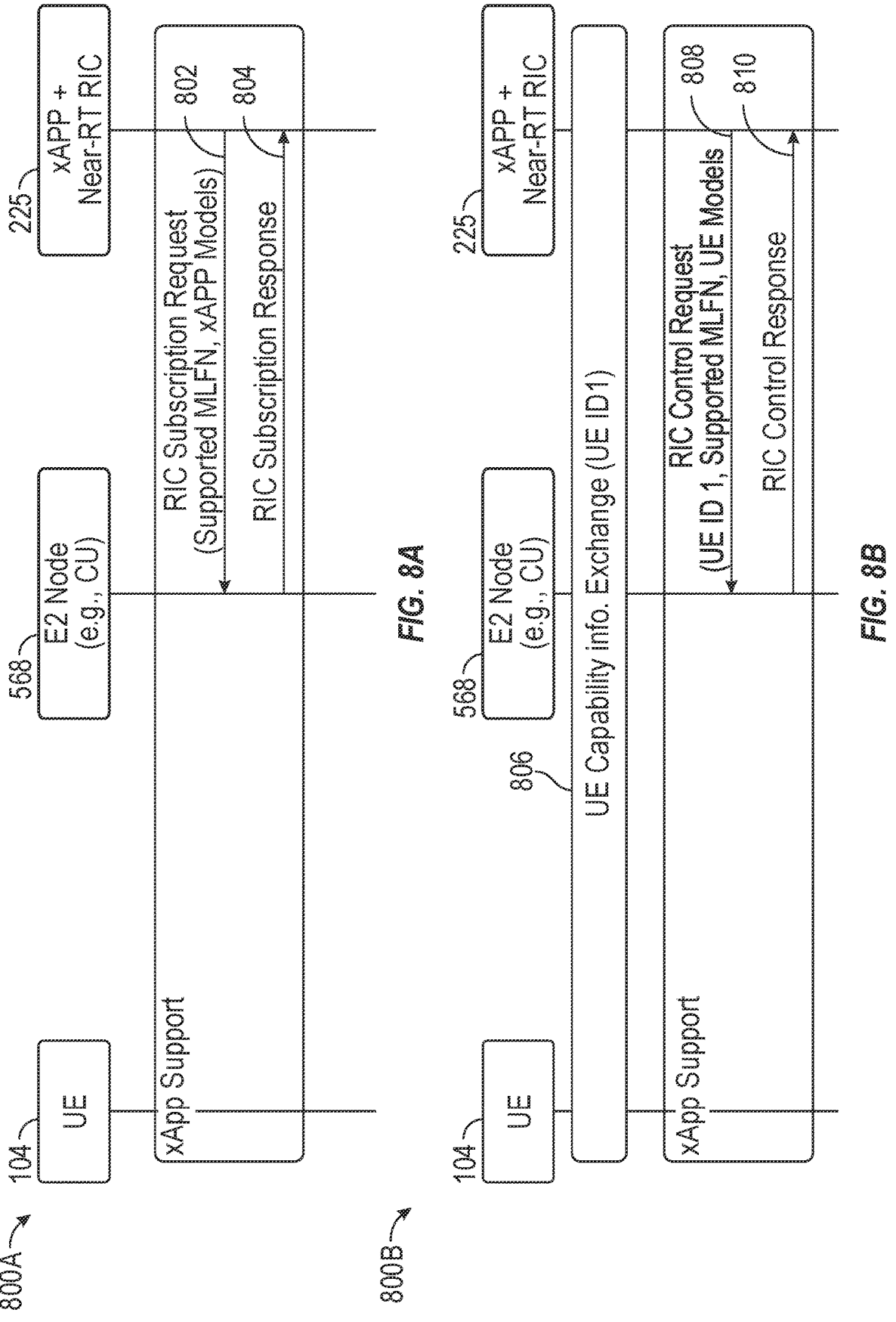
FIG. 8A illustrates a process flow of an example RAN controller subscription procedure for sending certain cross-node AI/ML information to an E2 node.
FIG. 8B illustrates a process flow of an example RAN control procedure for sending certain cross-node AI/ML information to the E2 node.

FIGS. 8A and 8B illustrate example process flows 800A, 800B for providing certain cross-node AI/ML information to one or more network entities associated with a (disaggregated) base station (e.g., an E2 node). The cross-node AI/ML information may enable the E2 node to configure one or more UEs for one or more cross-node AI/ML sessions and/or relay information (e.g., control information, AI/ML feedback, and/or AI/ML training data, AI/ML model data, etc.) associated with cross-node AI/ML session(s) between the RIC to the UE(s) as further described herein.

Regarding FIG. 8A, the process flow 800A depicts an example RIC subscription procedure for sending certain cross-node AI/ML information to the E2 node. In some cases, the RIC subscription procedure may occur before a RIC (e.g., a Near RT RIC) is aware of or has access to (e.g., via the UE-NIB as described herein with respect to FIG. 7) certain UE-specific information including, for example, UE-supported models (e.g., CSF encoder models).

At 802, the Near-RT RIC 225 sends, to the E2 node 568, a RIC subscription request indicating certain RIC-specific information for a cross-node AI/ML session between the UE 104 and the Near-RT RIC 225. The RIC-specific information may indicate or include, for example, cross-node AI/ML support associated with an xApp. The RIC-specific information may indicate or include the MLFNs, AI/ML features, and/or AI/ML feature groups supported at the RIC. The RIC-specific information may include or indicate one or more xApp models, pairing information between UE-side models and xApp-side models, and/or a list of UE-side models supported by the xApp (e.g., available for activating at a UE) and/or currently activated at a UE.

At 804, the E2 node 568 may send, to the Near-RT RIC 225, a RIC subscription response confirming or acknowledging the RIC-specific information received at 802. The information obtained via the RIC subscription request may allow the E2 node to configure a UE for a cross-node AI/ML session between the UE 104 and the Near-RT RIC 225, relay communications between the UE 104 and the Near-RT RIC 225, and/or manage the communication link between the UE and the E2 node 568 based on instructions and/or AI/ML output data (e.g., decoded CSF) from the Near-RT RIC 225.

With respect to FIG. 8B, the process flow 800B illustrates a RIC control procedure for sending certain cross-node AI/ML information to the E2 node. In some cases, the RIC control procedure may be used to convey, to the E2 node, the RIC-specific information as described herein with respect to FIG. 8A. In certain cases, the RIC control procedure may be used to convey, to the E2 node, UE-specific information and/or other RIC-specific information in addition to or instead of the RIC-specific information described herein with respect FIG. 8B.

At 806, the Near-RT RIC 225 obtains UE capability information associated with a particular UE corresponding to a UE identifier (e.g., UE ID1). As an example, the UE capability information may be obtained at the Near-RT RIC 225 as described herein with respect to FIG. 7.

At 808, the Near-RT RIC 225 sends, to the E2 node 568, certain AI/ML information via a RIC control request. For example, the AI/ML information may indicate or include an instruction to configure a UE (by indicating the UE ID) for a cross-node AI/ML session, the MLFN, the AI/ML features, the AI/ML feature groups, and/or the UE-side model(s) for configuration at the UE.

At 810, the E2 node 568 may send, to the Near-RT RIC 225, a RIC control response confirming or acknowledging the AI/ML information obtained at 808. The RIC control response may indicate that the E2 node 568 has configured or will configure the UE 104 based on the configuration obtained at 808.

Example Communication Link for a Cross-Node AI/ML Session

Figure 9:
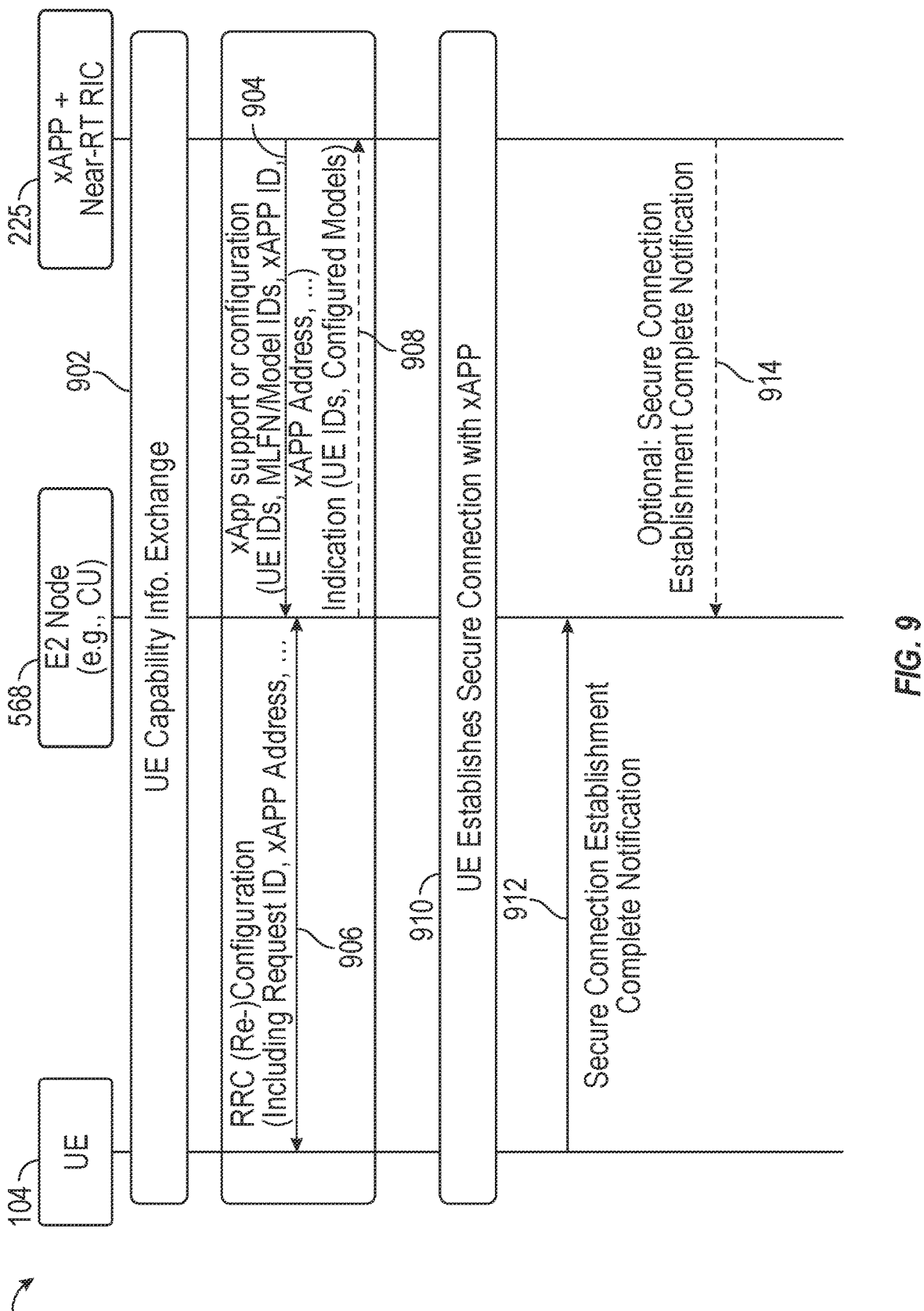
FIG. 9 illustrates an example process flow for certain signaling to establish a communication link for a cross-node AI/ML session between a UE and an xApp.

FIG. 9 illustrates an example process flow 900 for certain signaling to establish a communication link for a cross-node AI/ML session between the UE and the xApp. The communication link between the UE and the xApp may allow for cross-node a AI/ML cross-node session between the UE and the xApp that offload AI/ML processing from the E2 node 568 to the Near-RT RIC 225, for example. The UE may provide AI/ML input data to the xApp via the secure communication link, and the xApp may control the AI/ML operations at the UE via the secure communication link (e.g., a user-plane link) independent of the E2 node being aware of such control signaling and/or AI/ML feedback. Such a communication link may allow for a modular design of the AI/ML operations between the UE and the xApp independent of the E2 node.

At 902, the Near-RT RIC 225 obtains UE capability information associated with a particular UE. The UE capability information may correspond to a UE identifier (e.g., UE ID1) associated with the UE 104. As an example, the UE capability information may be obtained at the Near-RT RIC 225 as described herein with respect to FIG. 7.

At 904, the Near-RT RIC 225 sends, to the E2 node 568, an indication of certain cross-node AI/ML information including cross-node AI/ML features supported at the Near-RT RIC 225 and/or a configuration for a particular UE, for example, as described herein with respect to FIGS. 8A and 8B. The cross-node AI/ML information may indicate or include a session configuration including, for example, one or more AI/ML functions (e.g., CSF, beam management, and/or positioning), AI/ML features (or feature groups) (e.g., certain features associated with a function), AI/ML models, AI/ML model structures, etc. to use for the cross-node AI/ML session (e.g., via identifier(s) or name(s) associated with such AI/ML settings). In some cases, the session configuration may indicate or include a list of UE features, UE functionalities, and/or model IDs supported at the xApp, an xApp identifier or xApp address (e.g., a domain or internet protocol address associated with the xApp), and a configuration and/or information for establishing a secure connection between the UE and the xApp, in one example. In certain aspects, the session configuration may be addressed to a one or more UEs, xApp(s), Near-RT RIC(s), and/or any other entity associated with the AI/ML session, for example, using an identifier associated with the entity, including a UE ID or address, an xApp ID or address, a Near-RT RIC ID or address, etc.

At 906, the E2 node 568 configures the UE 104 for wireless communications, for example, via Layer 3 signaling (RRC signaling). As an example, the E2 node 568 may send, to the UE 104, an RRC configuration message or an RRC reconfiguration message indicating information to establish the communication link with the xApp, such as an xApp identifier or xApp address.

Optionally, at 908, the E2 node 568 may send, to the Near-RT RIC 225, an indication of the cross-node AI/ML configuration associated with and/or activated at the UE 104. For example, the E2 node 568 may provide an indication of the UE IDs and the AI/ML functions or models activated at the corresponding UEs. The E2 node 568 may provide such an indication where the E2 node selects the UE(s) and/or the configuration(s) for the cross-node AI/ML session between the UE 104 and the Near-RT RIC 225. The E2 node 568 may send the indication to the xApp, if the E2 node selects the UE(s) and corresponding configuration(s), for example, as described herein with respect to FIG. 11.

At 910, the UE 104 establishes a communication link (e.g., a secure user-plane connection) with the xApp. The UE 104 may communicate with the xApp via the communication link, such as a user-plane link between the UE 104 and the xApp. The user-plane link may allow the UE 104 and the xApp to communicate certain cross-node AI/ML information (e.g., AI/ML feedback, ground truth(s), training data, model data, model structures, configuration(s), request(s), response(s), instruction(s), etc.) independent of the E2 node being aware of such information.

As an example, the xApp may send, to the UE 104, one or more pre-trained AI/ML models and or information representative of the AI/ML model(s) (including, for example, a set of model parameters and/or hyperparameters, a model structure or model architecture, or any other structured or unstructured data describing the model is such a way that it may be implemented on a device) via the secure communication link with the xApp. In some cases, the xApp may send training data to the UE 104 via the communication link, and the UE 104 may use the training data to train or fine-tune an untrained or partially trained AI/ML model, for example, used for generating CSF at the UE 104. In certain cases, the xApp may update or reconfigure an AI/ML function or model used at the UE 104 via the communication link. In some cases, the UE 104 may send, to the xApp, AI/ML input data and/or feedback for the xApp inference or a federated model via the communication link with the xApp.

The communication link may allow a cross-node AI/ML session between the UE 104 and the xApp without the E2 node being aware of the actual model or model structure used at the UE 104 facilitating such a session. The communication link may allow the transfer of AI/ML model(s) to the UE 104 and/or the transfer of AI/ML input data to the Near-RT RIC 225 without the E2 node being aware of the actual AI/ML models or input. The communication link may facilitate a modular design in the cloud-based RAN where the Near-RT RIC 225 may configure and/or service cross-node AI/ML sessions the UE 104 and the Near-RT RIC 225. The communication link may allow for a modular design for the cross-node AI/ML session that offloads certain processing and/or certain communications at the E2 node 568 to the Near-RT RIC 225.

At 912, the UE 104 may send, to the E2 node 568, an indication that the secure connection between the UE 104 and xApp has been established.

Optionally, at 914, the Near-RT RIC 225 may send, to the E2 node 568, an indication that the secure connection between the UE 104 and xApp has been established. Such an indication may enable to the E2 node 568 to be aware of the connection between the UE 104 and xApp. The E2 node 568 may take measures to preserve the connection between the UE 104 and xApp, for example, in response to changes in channel conditions between the UE 104 and the E2 node 568, network resources (e.g., load or capacity), UE mobility, etc.

Example Cross-Node AI/ML Session Request Procedure

In certain aspects, the UE 104 and/or E2 node 568 may initialize the procedure to establish a cross-node AI/ML session between the UE and the Near-RT RIC 225. For example, as the UE 104 may be capable of performing AI/ML operations (e.g., AI-enhanced CSF, AI-enhanced beam management, AI-enhanced positioning, etc.), the UE 104 may request to establish a cross-node AI/ML session with the Near-RT RIC 225, for example, as described herein with respect to FIGS. 5A and 5B.

Figure 10:
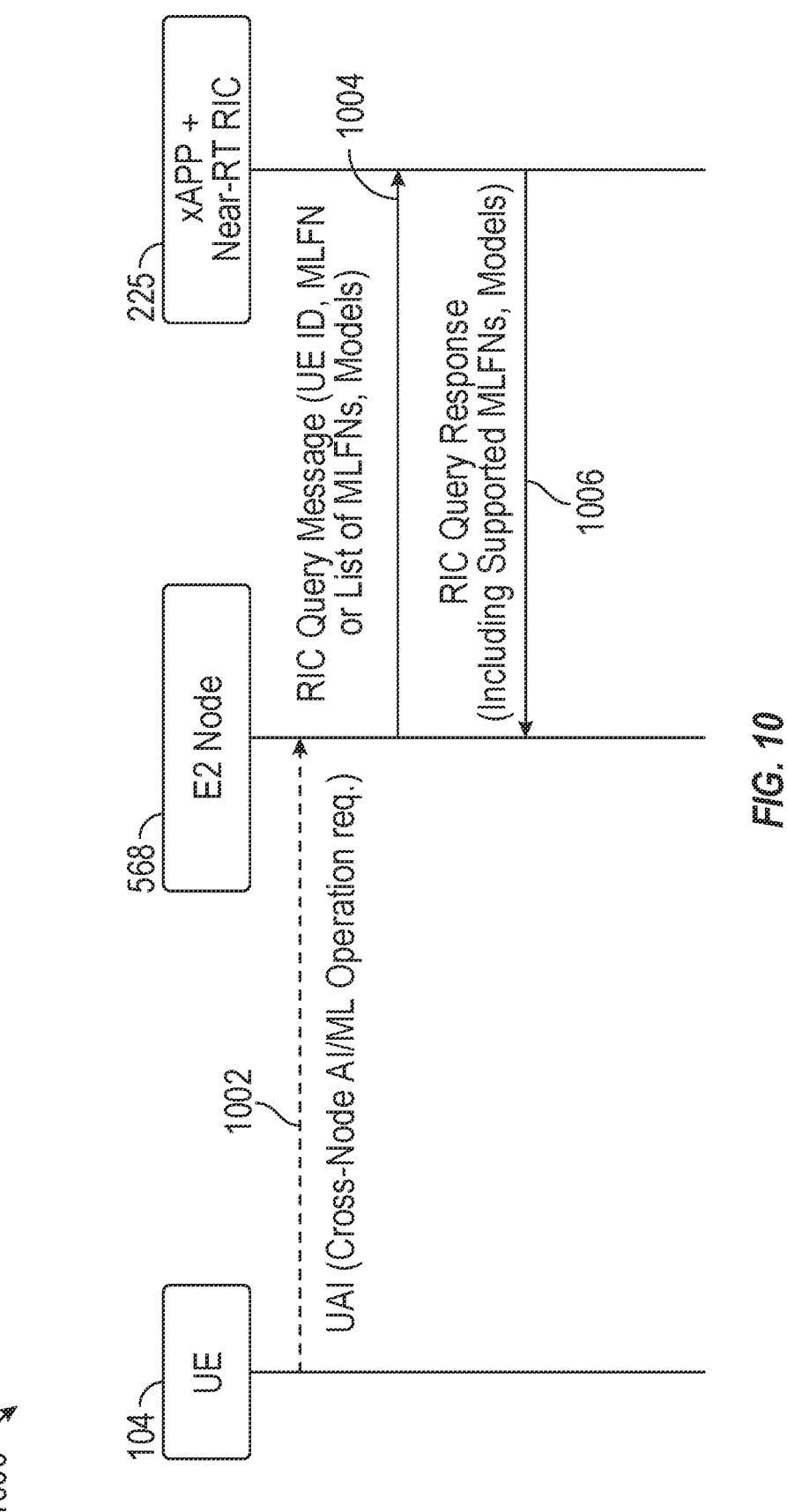
FIG. 10 illustrates an example process flow for certain signaling to initialize a cross-node AI/ML session via a request from a UE and/or an E2 node.

FIG. 10 illustrates an example process flow 1000 for certain signaling to initialize a cross-node AI/ML session via a request from the UE and/or the E2 node.

Optionally, at 1002, the UE 104 may send, to the E2 node 568, a request to establish (or initiate) a cross-node AI/ML session between the UE 104 and the Near-RT RIC 225. As an example, the request may be sent via RRC signaling, such as UE assistance information (UAI). In some cases, the request may indicate or include a certain AI/ML configuration associated with the cross-node AI/ML session. For example, the requested configuration may indicate or include a session configuration to use for the cross-node AI/ML session (e.g., as indicated via identifier(s) or name(s) associated with such AI/ML settings).

At 1004, the E2 node 568 sends, to the Near-RT RIC 225, a request to establish a cross-node AI/ML session between the UE 104 and the Near-RT RIC 225. The request may be sent via a RIC query message including, for example, a RIC indication message and/or a RIC control message. The request may indicate or include a UE identifier (ID) associated with the UE requesting the cross-node AI/ML session (e.g., the UE 104), the UE requested AI/ML configuration, and/or a separate AI/ML configuration determined at the E2 node 568. The E2 node 568 may check if the Near-RT RIC can support the configuration as requested by the UE 104. In some cases, the E2 node may request the Near-RT RIC 225 to provide a cross-node AI/ML configuration and/or cross-node AI/ML features supported at the Near-RT RIC 225.

At 1006, the Near-RT RIC 225 sends, to the E2 node 568, a response to the request. The response may be sent via a RIC query response message including, for example, a RIC indication message and/or a RIC control message. The Near-RT RIC 225 may determine if the xApp can support the UE/E2 node requested configuration. In some cases, the response may indicate or include the list of MLFN, model IDs, configurations, etc. that can be supported by the Near-RT RIC 225 for a cross-node AI/ML session. The response may indicate or include a cross-node AI/ML configuration for the UE 104. For example, the response may indicate or include a session configuration (supported by the Near-RT RIC 225) to use for the cross-node AI/ML session (e.g., via identifier(s) or name(s) associated with such AI/ML settings). The E2 node 568 may configure the UE 104 for the cross-node AI/ML session between the UE 104 and the Near-RT RIC 225, as further described herein.

Example Cross-Node AI/ML Session Configuration Procedure

In certain aspects, the E2 node 568 and/or the Near-RT RIC 225 may configure the UE 104 for a cross-node AI/ML session between the UE 104 and the Near-RT RIC 225, for example, as described herein with respect to FIGS. 5A and 5B. For example, the E2 node 568 and/or the the Near-RT RIC 225 may perform the selection of the AI/ML model and/or model structure to be used at the UE 104. In some cases, the Near-RT RIC 225 may request the E2 node 568 to report the UE status and/or cross-node AI/ML configuration implemented at the UE 104.

Figure 11:
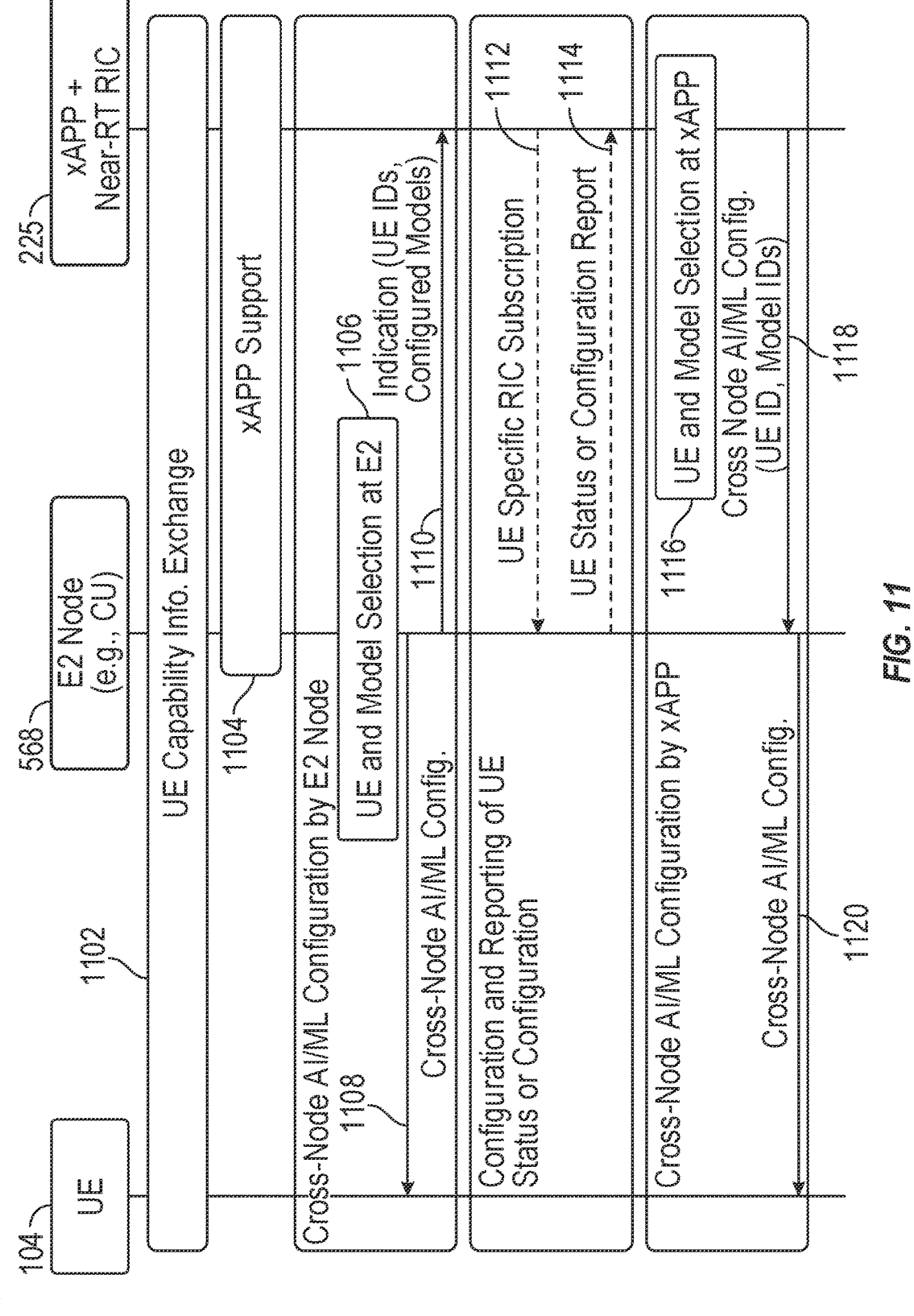
FIG. 11 illustrates an example process flow for certain signaling to configure a cross-node AI/ML session for a UE by an E2 node and/or an xApp.

FIG. 11 illustrates an example process flow 1100 for certain signaling to configure a cross-node AI/ML session for a UE by an E2 node and/or an xApp.

At 1102, the Near-RT RIC 225 obtains UE capability information associated with a particular UE (e.g., UE 104), for example, as described herein with respect to FIG. 7.

At 1104, the Near-RT RIC 225 notifies the E2 node 568 of the cross-node AI/ML features supported at the Near-RT RIC 225, for example, as described herein with respect to FIG. 8A, FIG. 8B, and/or FIG. 9.

Optionally, at 1106, the E2 node 568 may determine the UE configuration (e.g., a session configuration) for the cross-node AI/ML session between the UE 104 and the Near-RT RIC 225. The E2 node 568 may select any of various parameters for the cross-node-AI/ML session, such as one or more parameters for a session configuration to be used at the UE 104. The E2 node 568 may consider or take into account the cross-node AI/ML capabilities associated with the UE 104 and/or the Near-RT RIC 225.

At 1108, the E2 node 568 may send, to the UE 104, an indication of the UE configuration for the cross-node AI/ML session between the UE 104 and the Near-RT RIC 225. The UE configuration may be sent to the UE 104 via control signaling, such as Layer 1 (L1) signaling (e.g., DCI), Layer 2 (L2) signaling (e.g., MAC signaling), Layer 3 (L3) signaling (e.g., RRC signaling), and/or system information.

At 1110, the E2 node 568 may send, to the Near-RT RIC 225, an indication of the UE configuration (selected by the E2 node 568) for the cross-node AI/ML session between the UE 104 and the Near-RT RIC 225. The UE configuration may be sent to the Near-RT RIC 225, for example, via a RIC indication message and/or a RIC control message. The UE configuration may correspond to the UE 104 via a UE identifier associated with the UE 104. The UE configuration may indicate or include the UE identifier to which such configuration corresponds. In some cases, the UE identifier associated with the UE configuration may be implicitly or explicitly indicated.

Optionally, at 1112, the Near-RT RIC 225 may send, to the E2 node 568, a request to report certain information associated with the cross-node AI/ML session, such as the UE configuration for the cross-node AI/ML session, the UE status, and/or certain information associated with the communication link between the UE 104 and the E2 node. The request may be sent via a UE-specific RIC subscription message, an indication message originating from near-RT RIC, and/or a RIC control message. In some cases, the Near-RT RIC 225 may request such information to determine the state of the cross-node AI/ML session, for example, as configured and/or activated by the E2 node 568 at 1108. In certain cases, the Near-RT RIC 225 may request such information to determine the UE configuration for the cross-node, for example, to be configured and/or activated by the Near-RT RIC 225 at 1118.

The UE status may indicate or include whether the cross-node AI/ML session is configured, activated, and/or deactivated at the UE 104. In certain aspects, the UE status may indicate or include the current communication state associated with the UE 104, for example, RRC connected, RRC idle, or RRC inactive. In some cases, the Near-RT RIC 225 request certain information associated with the communication link between the UE 104 and the E2 node 568, such as the frequency range, the frequency band, the component carrier(s) (e.g., carrier aggregation and/or dual connectivity), the modulation and coding scheme (MCS), the code rate (e.g., the proportion of the data-stream that is non-redundant), the number of aggregated component carriers, the number of MIMO layers, the channel bandwidth, the subcarrier spacing, etc., associated with the communication link.

At 1114, the E2 node 568 may send, to the Near-RT RIC 225, the information requested by the Near-RT RIC 225, such as the UE state and/or the UE configuration for the cross-node AI/ML session, at 1112.

Optionally, at 1116, the Near-RT RIC 225 may determine the UE configuration for the cross-node AI/ML session. For example, the Near-RT RIC 225 may determine the UE configuration based on the information obtained at any of activities 1102, 1104, and 1114.

At 1118, the Near-RT RIC 225 may send, to the E2 node 568, an indication of the UE configuration for the cross-node AI/ML session between the UE 104 and the Near-RT RIC 225. For example, the UE configuration may indicate or include a session configuration to be used at the UE 104. The UE configuration may indicate or include the UE identifier to which such configuration corresponds. In some cases, the UE identifier associated with the UE configuration may be implicitly or explicitly indicated by the Near-RT RIC 225.

At 1120, the E2 node 568 may send, to the UE 104, an indication of the UE configuration (selected by the Near-RT RIC 225) for the cross-node AI/ML session between the UE 104 and the Near-RT RIC 225. The UE configuration may be sent to the UE 104 via control signaling, such as RRC signaling, MAC signaling, DCI, and/or system information. As described herein with respect to FIG. 9, the UE configuration may allow the UE 104 to communicate with the Near-RT RIC 225 via a secure connection or communication link (e.g., a user-plane communication link).

Examples of Handling UE Mobility for a Cross-Node Machine Learning Session

Figure 12:
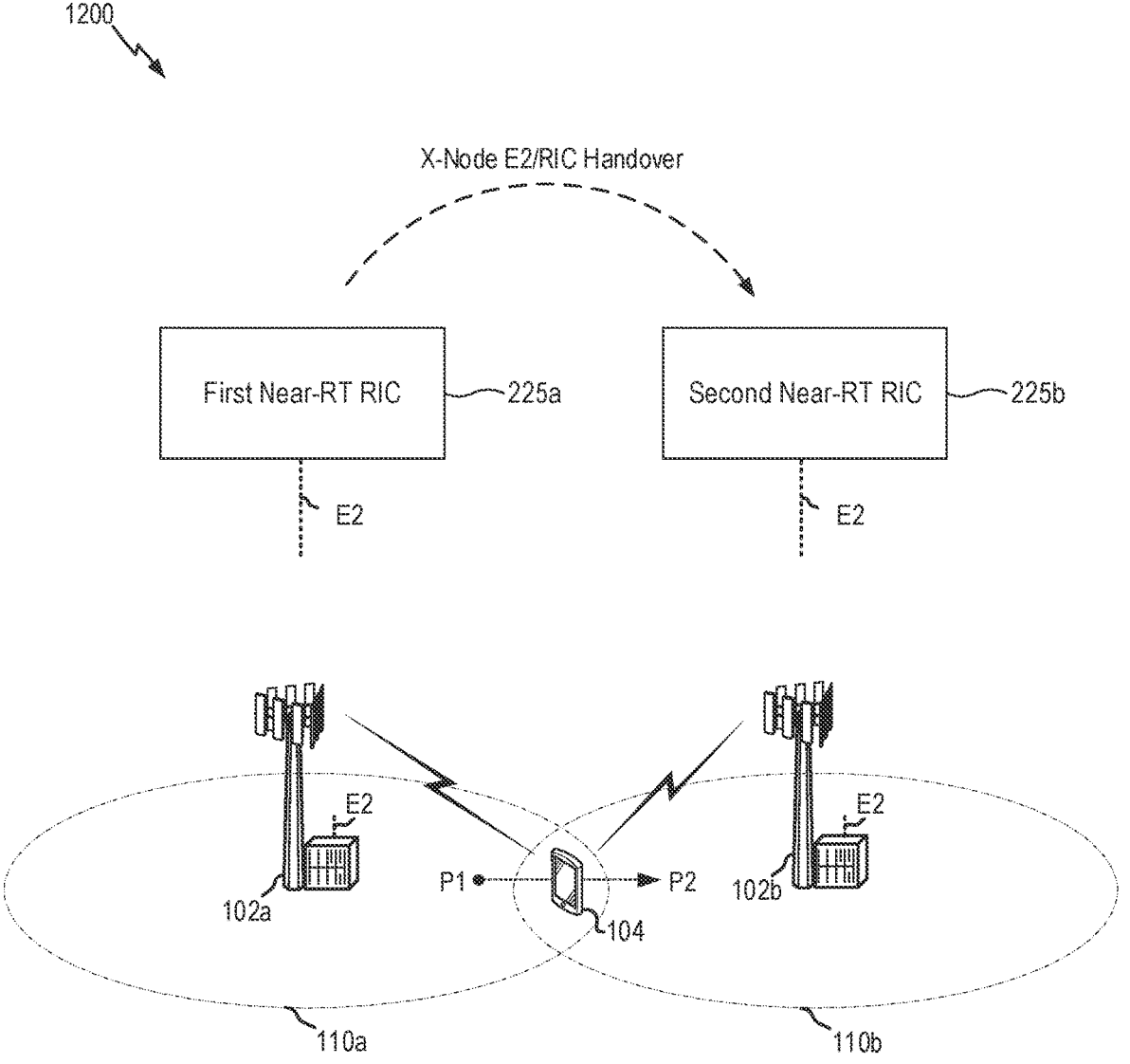
FIG. 12 is a diagram illustrating UE mobility in a wireless communications network with respect to a cross-node AI/ML session.

FIG. 12 is a diagram illustrating UE mobility in a wireless communications network 1200 with respect to a cross-node AI/ML session between a UE 104 and a RAN controller. In this example, the wireless communication network 1200 may include a first BS 102*a* having a first coverage area 110*a* and a second BS 102*b* having a second coverage 110*b*, which may overlap with the first coverage area 110*a*. Due to mobility (e.g., the UE 104 moving from the first coverage area 110*a* to the second coverage area 110*b*), the UE 104 may transition from communicating with the first BS 102*a* to communicating with the second BS 102*b*. As an example, the UE 104 may be located at a first position P1 in the first coverage area 110*a* at a first occasion, and at located at a second position P2 in the second coverage area 110*b* at a second, later occasion. In some cases, the UE 104 may send a measurement report to the first BS 102*a*, where the measurement report may provide signal strengths associated with the serving cell (e.g., the first BS 110*a*) and neighboring cells (e.g., the second BS 110*b*). Based on the measurement report (e.g., indicating a stronger signal strength for the second BS 110*b* relative to the first BS 110*a*), the first BS 110*a* may determine to handover (HO) communication with the UE 104 to the second BS 110*b*. In the context of the HO, the first BS 102*a* may be referred to as a source network entity, which may represent a point of origin for the HO (e.g., at P1); and the second BS 102*b* may be referred to as a target network entity, which may represent the destination for the HO (e.g., at P2). An intra-Near-RT RIC handover may refer to a handover from a source E2 node to a target E2 node, where the E2 nodes are in communication with the same near-RT RIC, whereas an inter-Near-RT RIC handover may refer to a handover from a source Near-RT RIC to a target Near-RT RIC via a source E2 node in communication with the source Near-RT RIC and a target E2 node in communication with a target Near-RT RIC.

In response to a HO scenario, the cross-node AI/ML session may be deactivated or preserved (e.g., via a keep-alive process) across the HO network entities (e.g., source-target E2 nodes and/or source-target RAN controllers). In some cases, the second BS 102*b* may support different AI/ML functions or features relative to the first BS 102*a*. For example, as the wireless communication environment for the second BS 102*b* may differ from the first BS 102*a*, a different AI/ML function or model may be used to predict channel conditions associated with the second BS 102*b*. In such a case, the cross-node AI/ML session may be temporarily deactivated at the UE 104 before handing over to the second BS 102*b*, and in response to handing over to the second BS 102*b*, the cross-node AI/ML session may be reactivated using an AI/ML function or model (or model structure) associated with the second BS 102*b*.

In certain aspects, the cross-node AI/ML session may be kept alive through the HO process. For example, the first BS 102*a* may provide, to the UE 104, an indication of the AI/ML functions or features supported by the second BS 102*b*, and the UE 104 may activate the supported AI/ML functions or features in response to handing over to the second BS 102*b*.

In some cases, the HO scenario may involve an intra-RIC HO, where a first near-RT RIC 225*a* may be in communication with the first BS 102*a* and the second BS 102*b* via an E2 link. In certain cases, the HO scenario may involve an inter-RIC handover, where the first near-RT RIC 225*a* is in communication with the first BS 102*a* via an E2 link, and a second near-RT RIC 225*b* is in communication with the second BS 102*b* via an E2 link.

In certain aspects, the cross-node AI/ML session between the UE and the Near-RT RIC may be deactivated as part of a handover. For example, deactivation of the cross-node AI/ML session may be in response to meeting a latency specification associated with the handover. To prioritize the handover (e.g., to expedite the completion of the handover), the cross-node AI/ML session may be deactivated and restarted after a successful handover to the target E2 node. In certain cases, the deactivation of the cross-node AI/ML session may be in response to incompatible support for the ongoing cross-node AI/ML session at any of various levels, such as the entity level (e.g., the target E2 node not supporting the ongoing cross-node AI/ML session) and/or the environment level (e.g., the target communication link not be supported by the ongoing cross-node AI/ML session). The cross-node AI/ML session between the UE and the Near-RT RIC may be re-initiated in response to completing the handover to the target E2 node. Such a deactivation and subsequent reactivation may be referred to as a break-andmake handover with respect to the cross-node AI/ML session between the UE and the Near-RT RIC.

Note that the handover illustrated in FIG. 12 is an example of a handover. Aspects of the present disclosure may be applied to various types of handover scenarios including, for example, an Xn based handover and/or an N2 based handover. A handover may be triggered, for example, due to new radio conditions, load balancing, and/or a specific service (e.g. in the presence of a QoS specification).

Figure 13:
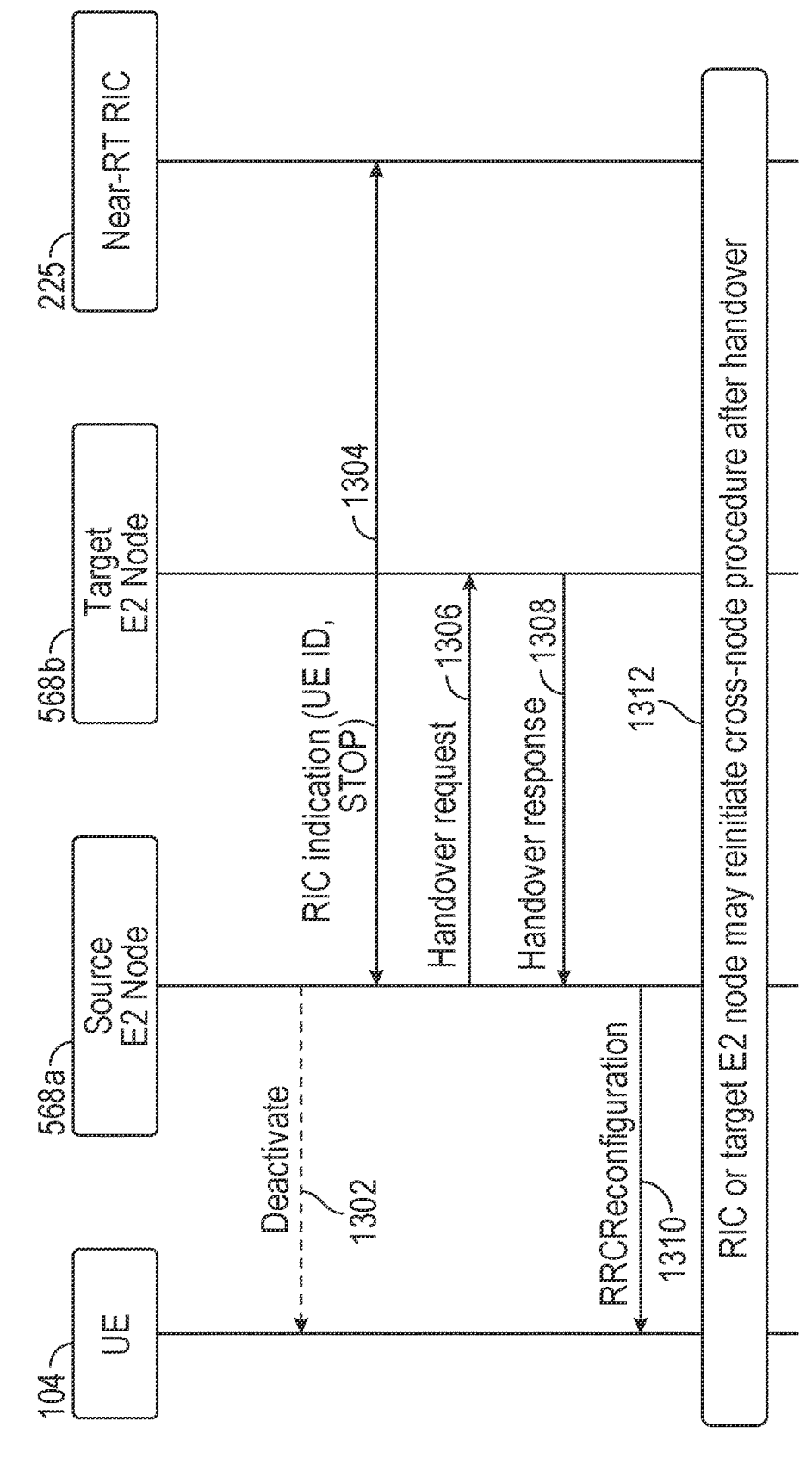
FIG. 13 illustrates an example process flow for performing a UE handover from a source E2 node to a target E2 node.

FIG. 13 illustrates an example process flow 1300 for performing a UE HO from a source E2 node to a target E2 node, for example, as described herein with respect to FIG. 12.

In this example, the UE 104 may have an on-going cross-node AI/ML session with the Near-RT RIC 225, for example, as described herein with respect to FIGS. 5A and 5B. The on-going cross-node AI/ML session may be established as described herein with respect to FIG. 11. In response to UE mobility (e.g., the UE 104 moving from the first coverage area 110*a* to the second coverage area 110*b* as depicted in FIG. 12, the source E2 node may handle deactivation of the cross-node AI/ML session between the UE 104 and the Near-RT RIC 225.

Optionally, at 1302, the source E2 node 568*a* may send, to the UE 104, an indication to deactivate a cross-node AI/ML session between the UE 104 and the Near-RT RIC 225. For example, the source E2 node 568*a* may send the indication to deactivate the cross-node AI/ML session via control signaling including, for example, RRC signaling, MAC signaling, downlink control information, and/or system information.

At 1304, the source E2 node 568*a* sends, to the Near-RT RIC 225, an indication to deactivate the cross-node AI/ML session between the UE 104 and the Near-RT RIC 225. For example, the source E2 node 568*a* may send the indication to deactivate the cross-node AI/ML session via a RIC indication message. The RIC indication message may indicate or include a UE identifier (ID) associated with the UE 104 and/or a notification to stop cross-node AI/ML session with the UE 104.

At 1306, the source E2 node 568*a* sends, to the target E2 node 568*b*, an indication to perform a handover for the UE 104, for example, via a handover request message. The handover request message may indicate or include certain information (e.g., UE capabilities, UE context, protocol data unit (PDU) session, etc.) used to perform the handover at the target E2 node 568*b*. The handover request message may be or include a UE mobility management message to request the preparation of resources for a handover at a target network entity.

At 1308, the target E2 node 568*b* sends, to the source E2 node 568*a*, an indication confirming or acknowledging the handover associated with the UE 104. For example, the target E2 node 568*b* may send the indication confirming or acknowledging the handover via a handover response message. The handover response message may be or include a UE mobility management message to inform that the resource are prepared at the target network entity.

At 1310, the source E2 node 568*a* sends, to the UE 104, a handover command indicating to handover to the target E2 node 568*b* in response to the handover response. The source E2 node 568*a* may send the handover command via an RRC reconfiguration message. The handover command may indicate or include certain information used to access the target E2 node, such as a target cell identifier (ID) and a cell radio network temporary identifier (C-RNTI) associated with the target E2 node 568*b*. In response to the RRC reconfiguration message, the UE 104 may initiate a RACH procedure with the target E2 node 568*b* to establish communications with the target E2 node 568*b*.

At 1312, a cross-node AI/ML session between the UE 104 and the Near-RT RIC 225 is reinitiated in response to establishing communications between the UE 104 and the target E2 node 568*b*. The Near-RT RIC 225 and/or the target E2 node 568*b* may reinitiate or reestablish the cross-node AI/ML session, for example, as described herein with respect to FIG. 8A, FIG. 8B, FIG. 9, FIG. 10, and/or FIG. 11.

In certain aspects, the cross-node AI/ML session between the UE and the Near-RT RIC may be preserved throughout the handover process. In some cases, the source E2 node may select the target E2 node, for example, based on a measurement report providing channel characteristics associated with one or more neighboring cells.

Figure 14:
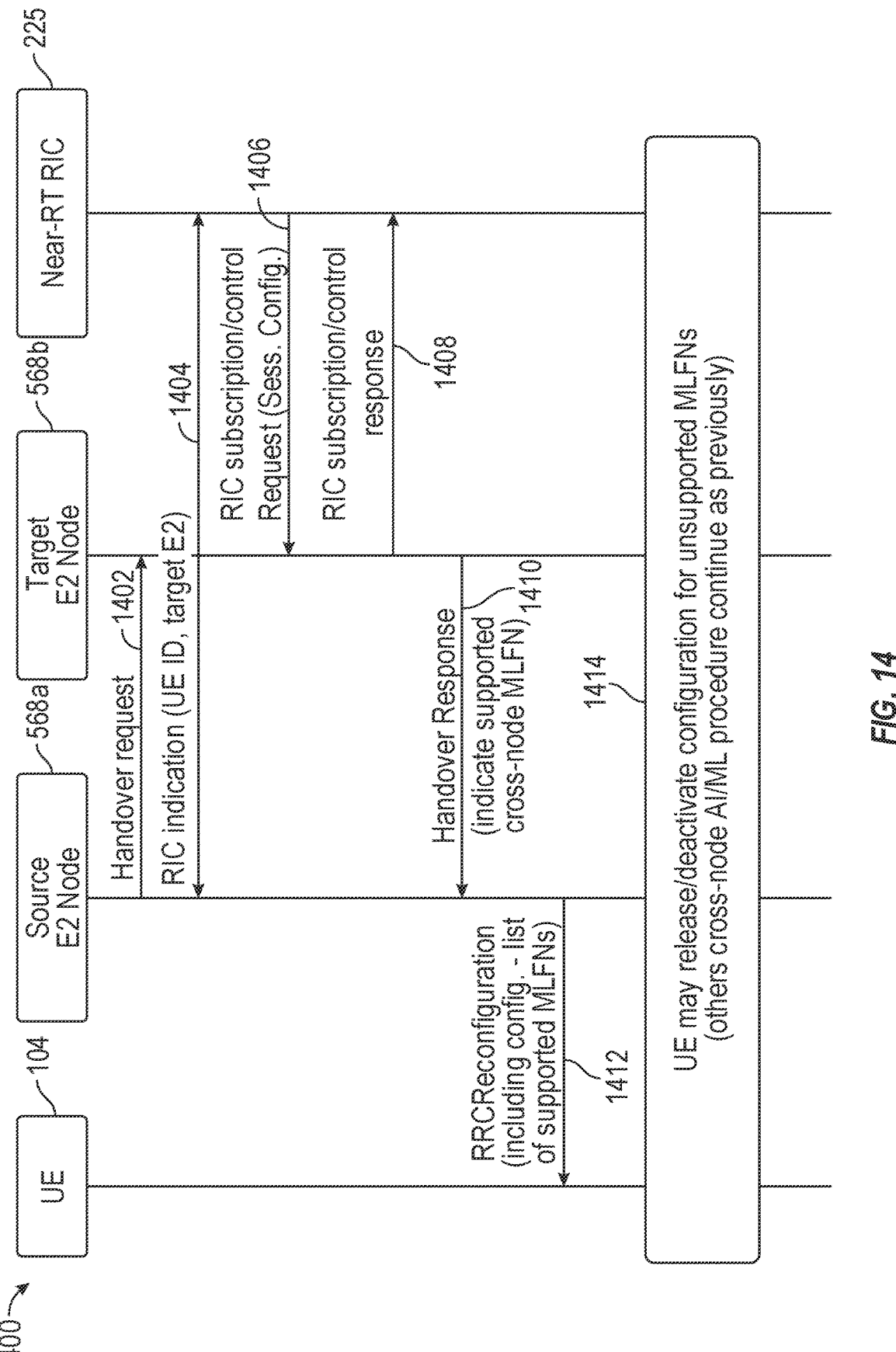
FIG. 14 illustrates an example process flow for signaling associated with a handover where a source E2 node selects a target E2 node.

FIG. 14 illustrates an example process flow 1400 for signaling associated with a handover where the source E2 node selects the target E2 node. In this example, the UE 104 may have an on-going cross-node AI/ML session with the Near-RT RIC 225, for example, as described herein with respect to FIGS. 5A and 5B. The on-going cross-node AI/ML session may be established as described herein with respect to FIG. 11. In response to UE mobility (for example, as described herein with respect to FIG. 12), the source E2 node may select the target E2 node and notify the target E2 node of the ongoing cross-node AI/ML session in order to keep the session between the UE and the Near-RT RIC alive after the handover.

At 1402, the source E2 node 568*a* sends, to the target E2 node 568*b*, an indication to perform a handover for the UE 104, for example, via a handover request message. The handover request message may indicate or include certain information (e.g., UE capabilities, UE context, protocol data unit (PDU) session, etc.) used to perform the handover at the target E2 node 568*b*. In certain aspects, the handover request may indicate or include information associated with the ongoing cross-node AI/ML session/operations between the UE 104 and the Near-RT RIC 225, such as the AI/ML function(s), feature(s), and/or feature group(s) activated for the cross-node AI/ML session at the UE 104 and/or the Near-RT RIC 225. Such information may allow the target E2 node 568*b* to keep the cross-node AI/ML session alive after the handover.

At 1404, the source E2 node 568*a* sends, to the Near-RT RIC 225, an indication of the handover to the target E2 node, for example, via a RIC indication message. For example, the indication of the handover may include a UE identifier associated with the UE 104, target E2 node information, such as an identifier associated with the target E2 node.

At 1406, the Near-RT RIC 225 sends, to the target E2 node 568*b*, an indication of cross-node AI/ML information associated with the cross-node AI/ML session, for example, via a RIC subscription message and/or a RIC control message as described herein with respect to FIG. 8A and/or FIG. 8B. The cross-node AI/ML information may indicate or include a session configuration supported by the Near-RT RIC 225 and/or associated with the ongoing cross-node AI/ML session between the UE 104 and the Near-RT RIC 225. In some cases, the session configuration may be addressed to the UE 104 using a UE ID.

At 1408, the target E2 node 568*b* may send, to the Near-RT RIC 225, an indication confirming or acknowledging the cross-node AI/ML information, for example, via a RIC subscription response and/or a RIC control response message as described herein with respect to FIG. 8A and/or FIG. 8B.

At 1410, the target E2 node 568*b* sends, to the source E2 node 568*a*, an indication confirming or acknowledging the handover associated with the UE 104, for example, via a handover response message. The handover response message may indicate or include a session configuration to use for the cross-node AI/ML session as supported at the target E2 node 568*b*.

At 1412, the source E2 node 568*a* sends, to the UE 104, a handover command indicating to handover to the target E2 node 568*b* in response to the handover response. The source E2 node 568*a* may send the handover command via an RRC reconfiguration message. The handover command may indicate or include certain information used to access the target E2 node, for example, as described herein with respect to FIG. 13. In certain aspects, the handover command may include a session configuration to use for the cross-node AI/ML session between the UE 104 and the Near-RT RIC 225. As an example, in response to the RRC reconfiguration message, the UE 104 may initiate communications with the target E2 node 568*b*, for example, a RACH procedure with the target E2 node 568*b* to establish communications with the target E2 node 568*b*.

At 1414, the UE 104 communicates with the Near-RT RIC 225 via the target E2 node 568*b*, for example, as described herein with respect to FIG. 9 and/or FIG. 11 keeping alive the cross-node AI/ML session between the UE 104 and the Near-RT RIC 225. In some cases, the UE 104 may deactivate certain aspects associated with an ongoing session configuration, where the aspects may be unsupported at or incompatible with the target E2 node 568*b* based on the cross-node AI/ML configuration obtained at 1412.

In certain aspects, the RAN controller (e.g., a Near-RT RIC) may select the target E2 node for the handover. For example, the RAN controller may be aware of a target E2 node that is capable of supporting the cross-node AI/ML session between the UE and the RAN controller, and the RAN controller may select such a target E2 node for the handover. Such a selection at the RAN controller may allow the RAN controller to keep the cross-node AI/ML session between the UE and the RAN controller alive throughout the handover.

Figure 15:
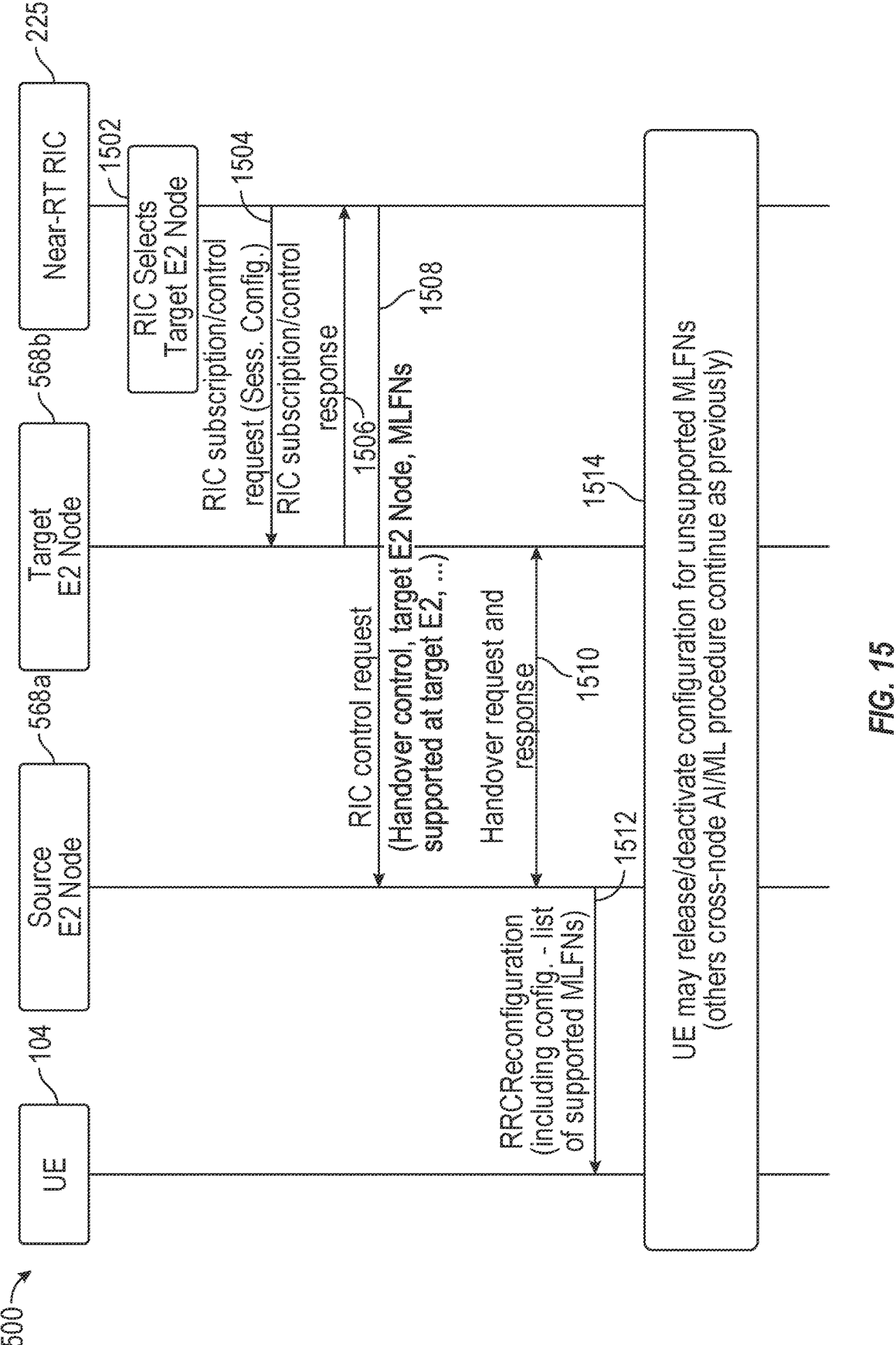
FIG. 15 illustrates an example process flow for signaling associated with a handover where a RAN controller selects a target E2 node.

FIG. 15 illustrates an example process flow 1500 for signaling associated with a handover where the RAN controller selects the target E2 node.

In this example, the UE 104 may have an on-going cross-node AI/ML session with the Near-RT RIC 225, for example, as described herein with respect to FIGS. 5A and 5B. The on-going cross-node AI/ML session may be established as described herein with respect to FIG. 11. In response to UE mobility (for example, as described herein with respect to FIG. 12), the Near-RT RIC node may select the target E2 node and notify the target E2 node of the ongoing cross-node AI/ML session in order to keep the session between the UE and the Near-RT RIC alive after the handover.

At 1502, the Near-RT RIC 225 selects the target E2 node 568*b* for a handover associated with a communication link with the UE 104. The Near-RT RIC 225 may select the target E2 node 568*b* based on the cross-node AI/ML functions and/or features supported at the target E2 node 568*b*. As an example, the target E2 node 568*b* may be selected due to the target E2 node 568 being capable of implementing processed AI/ML output (e.g., decoded CSF, beam management instructions, etc.) from the Near-RT RIC 225, for example, as described herein with respect to FIGS. 5A and 5B. The Near-RT RIC 225 may prioritize the target E2 node 568b based at least in part on the target network entity supporting the ongoing cross-node AI/ML session between the UE 104 and the Near-RT RIC 225.

At 1504, the Near-RT RIC 225 sends, to the target E2 node 568b, an indication of cross-node AI/ML information associated with the cross-node AI/ML session, for example, via a RIC subscription message and/or a RIC control message as described herein with respect to FIG. 8A and/or FIG. 8B. The cross-node AI/ML information may indicate or include a session configuration to use for the cross-node AI/ML session supported by the Near-RT RIC 225 and/or associated with the ongoing cross-node AI/ML session between the UE 104 and the Near-RT RIC 225. In some cases, the session configuration may be addressed to the UE 104 using a UE ID.

At 1506, the target E2 node 568b may send, to the Near-RT RIC 225, an indication confirming or acknowledging the cross-node AI/ML information, for example, via a RIC subscription response and/or a RIC control message as described herein with respect to FIG. 8A and/or FIG. 8B.

At 1508, the Near-RT RIC 225 sends, to the source E2 node 568a, an instruction to perform a handover for the UE 104 to the target E2 node 568b (e.g., via an identifier associated with the target E2 node 568b) and an indication of the corresponding cross-node AI/ML configuration supported by the target E2 node 568b. The Near-RT RIC 225 may provide such an instruction/indication via a RIC control request. For example, the cross-node AI/ML configuration supported by the target E2 node 568b may indicate or include a session configuration to use for the cross-node AI/ML session between the UE 104 and the Near-RT RIC 225 following the handover to the target E2 node 568b.

At 1510, a handover response-request exchange is performed between the source E2 node 568a and the target E2 node 568b, for example, in response to the instruction to perform the handover from Near-RT RIC 225. As an example, the source E2 node 568a sends, to the target E2 node 568b, an indication to perform a handover for the UE 104, for example, via a handover request message. In some cases, the handover request may indicate or include the information used to perform the handover and the information associated with the ongoing cross-node AI/ML session, for example, as described herein with respect to FIG. 14. The target E2 node 568b sends, to the source E2 node 568a, an indication confirming or acknowledging the handover associated with the UE 104, for example, via a handover response message. The handover response message may indicate or include a session configuration to use for the cross-node AI/ML session as supported at the target E2 node 568b.

At 1512, the source E2 node 568a sends, to the UE 104, a handover command indicating to handover to the target E2 node 568b in response to the handover response. The source E2 node 568a may send the handover command via an RRC reconfiguration message. The handover command may indicate or include certain information used to access the target E2 node, for example, as described herein with respect to FIG. 13. In certain aspects, the handover command may include a cross-node AI/ML configuration indicating or including a session configuration to use for the cross-node AI/ML session between the UE 104 and the Near-RT RIC 225. In response to the RRC reconfiguration message, the UE 104 may initiate communications with the target E2 node 568b, for example, a RACH procedure with the target E2 node 568b to establish communications with the target E2 node 568b.

At 1514, the UE 104 communicates with the Near-RT RIC 225 via the target E2 node 568b, for example, as described herein with respect to FIG. 9 and/or FIG. 11. With the session configuration received via the handover command, the cross-node AI/ML session between the UE 104 and the Near-RT RIC 225 may be kept alive following the handover. In some cases, the UE 104 may deactivate certain aspects associated with a session configuration, where the deactivated aspects (e.g., certain MLFN(s)) may be unsupported at or incompatible with the target E2 node 568b based on the cross-node AI/ML configuration obtained at 1512.

In certain aspects, the handover process may include a handover from a source RAN controller to a target RAN controller (referred to as an inter-RAN controller handover or inter-RIC handover), for example, as described herein with respect to FIG. 12. The source E2 node may be in communication with a different RAN controller (e.g., a source Near-RT RIC) than the target E2 node, which may be in communication with a target RAN controller (e.g., a target Near-RT RIC).

Figure 16:
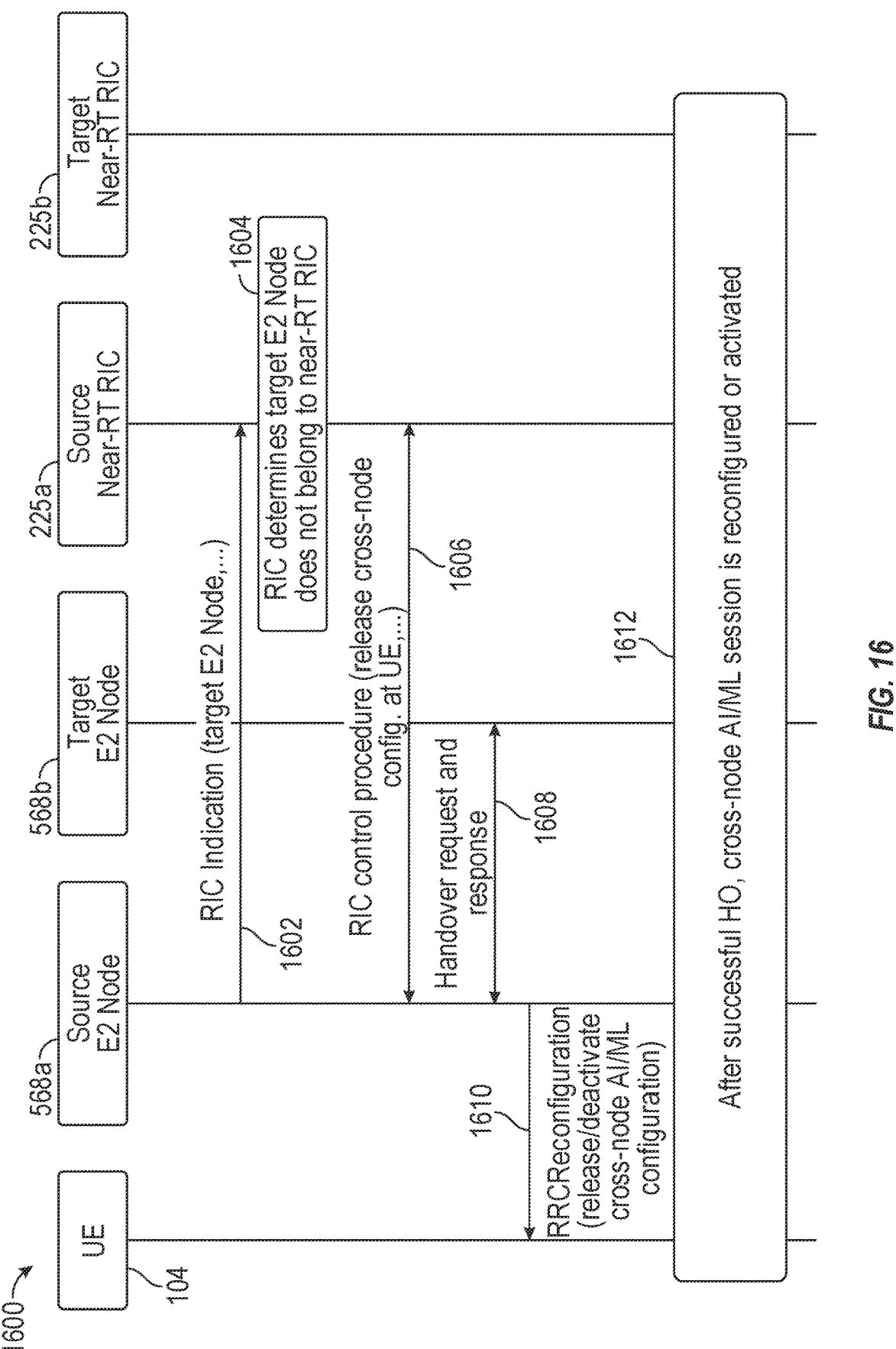
FIG. 16 illustrates an example process flow for signaling associated with an inter-RAN controller handover.

FIG. 16 illustrates an example process flow 1600 for signaling associated with an inter-RAN controller handover (e.g., a handover from a source Near-RT RIC to a target Near-RT RIC).

In this example, the UE 104 may have an on-going cross-node AI/ML session with a source Near-RT RIC 225, for example, as described herein with respect to FIGS. 5A and 5B. The on-going cross-node AI/ML session may be established as described herein with respect to FIG. 11. In response to UE mobility (for example, as described herein with respect to FIG. 12), the source Near-RT RIC may determine that a target E2 node is associated with a target Near-RT RIC, and the source Near-RT RIC may instruct the source E2 node to deactivate the cross-node AI/ML session at the UE to perform the handover to the E2 node. After the successful handover to the target E2 node, an AI/ML session between the UE 104 and the target Near-RT RIC may be established, reconfigured, and/or activated, for example, as described herein with respect to FIG. 8A, FIG. 8B, FIG. 9, FIG. 10, and/or FIG. 11.

At 1602, the source E2 node 568a sends, to the source Near-RT RIC 225a, an indication of a handover to the target E2 node 568b for the UE 104 associated with a cross-node AI/ML session between the UE 104 and the source Near-RT RIC 225a. The source E2 node 568a may send the indication of the handover via a RIC indication message. The indication of the handover may identify the target E2 node 568 as the target network entity for the handover. The indication of the handover may include an identifier (e.g., a cell identifier) associated with the target E2 node 568b.

At 1604, the source Near-RT RIC 225a determines that the target E2 node 568 is not associated with the source Near-RT RIC 225a. The source Near-RT RIC 225a may not manage wireless communication functions associated with the target E2 node 568. The target Near-RT RIC 225b may manage the wireless communication functions associated with the target E2 node 568.

At 1606, a RIC control procedure is performed between the source Near-RT RIC 225a and the source E2 node 568a. For example, in response to the determination at 1604, the source Near-RT RIC 225a sends, to the source E2 node 568a, a RIC control request (and/or a RIC indication message) indicating to release or deactivate the cross-node AI/ML session at the UE 104. In some cases, the source E2 node 568a may send, to the source Near-RT RIC 225a, an indication acknowledging the RIC control request, for example, via a RIC control response.

At 1608, a handover response-request exchange is performed between the source E2 node 568a and the target E2 node 568b. As an example, the source E2 node 568a may send, to the target E2 node 568b, an indication to perform a handover for the UE 104, for example, via a handover request message. The source E2 node 568a sends the handover request in response to obtaining the RIC control request from the source Near-RT RIC 225a. The target E2 node 568b sends, to the source E2 node 568a, an indication confirming or acknowledging the handover associated with the UE 104, for example, via a handover response message.

At 1610, the source E2 node 568a sends, to the UE 104, a handover command indicating to handover to the target E2 node 568b in response to the handover response. The source E2 node 568a may send the handover command via an RRC reconfiguration message. The handover command may indicate or include certain information used to access the target E2 node, for example, as described herein with respect to FIG. 13. In certain aspects, the handover command may indicate or include an instruction to deactivate the cross-node AI/ML session with the source Near-RT RIC 225a. In response to the RRC reconfiguration message, the UE 104 may initiate communications with the target E2 node 568b, for example, via a RACH procedure with the target E2 node 568b to establish communications with the target E2 node 568b.

At 1612, a cross-node AI/ML session between the UE 104 and the target Near-RT RIC 225b is initiated in response to establishing communications between the UE 104 and the target E2 node 568b. The target Near-RT RIC 225b and/or the target E2 node 568b may initiate or establish the cross-node AI/ML session, for example, as described herein with respect to FIGS. 8A, 8B, 9, 10, 11. As an example, the target Near-RT RIC 525b may reconfigure the cross-node AI/ML session at the UE 104.

In certain aspects, for an inter-RAN controller (e.g., Near-RT RIC) handover, the cross-node AI/ML session at the UE may be preserved or updated via a handover command. For example, the target E2 node may notify the source E2 node of the functions and/or features associated with a cross-node AI/ML session supported at the target RAN controller, and the source E2 node may provide such information to the UE via the handover command to allow the UE to handover the cross-node AI/ML communication link with the target RAN controller.

Figure 17:
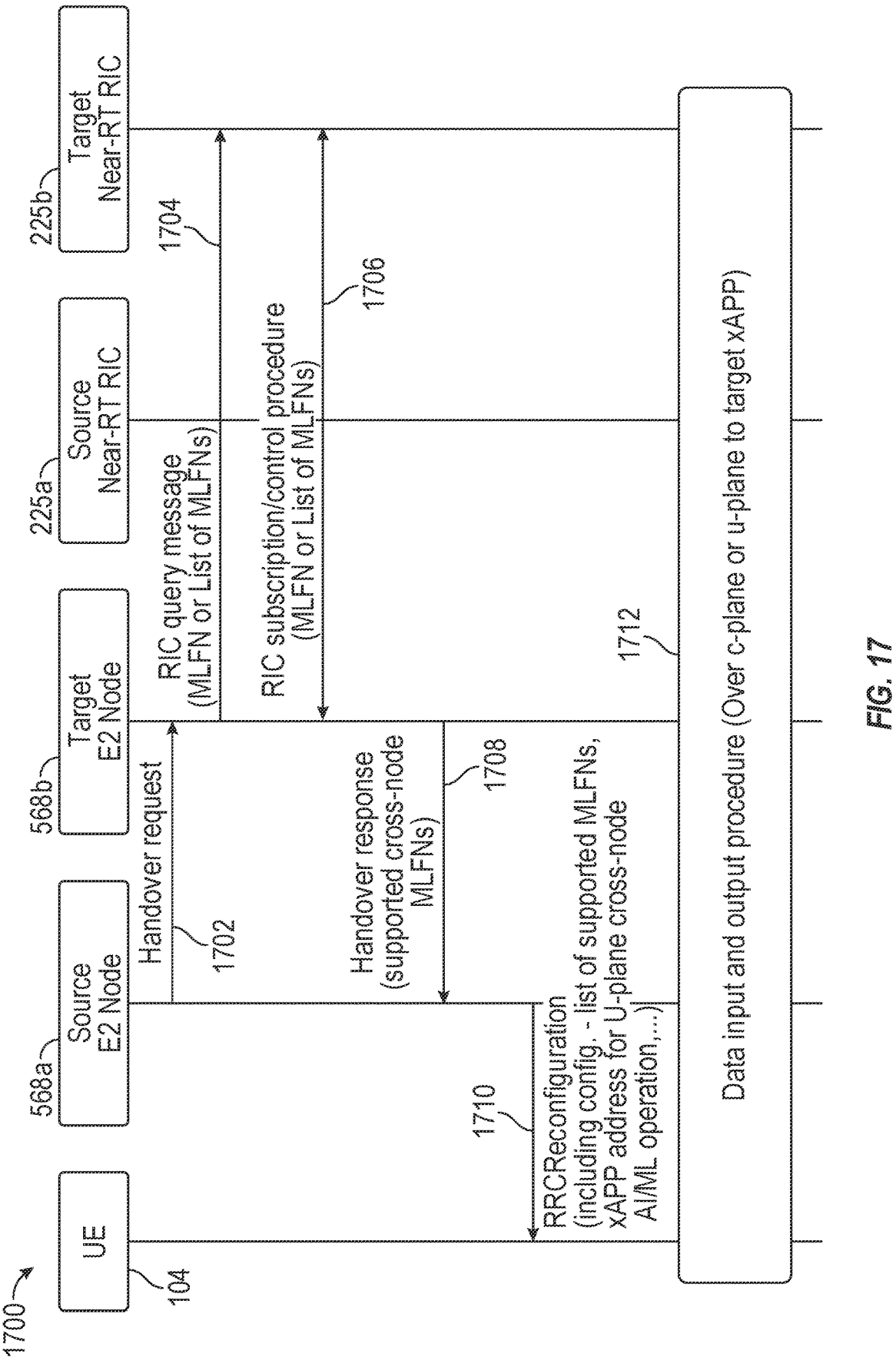
FIG. 17 illustrates an example process flow for signaling associated with an inter-RAN controller handover, where the cross-node AI/ML session at the UE is preserved or switched to a cross-node AI/ML function or feature supported at the target RAN controller.

FIG. 17 illustrates an example process flow 1700 for signaling associated with an inter-RAN controller handover, where the cross-node AI/ML session at the UE is preserved or switched to a cross-node AI/ML function or feature supported at the target RAN controller.

In this example, the UE 104 may have an on-going cross-node AI/ML session with a source Near-RT RIC 225, for example, as described herein with respect to FIGS. 5A and 5B. The on-going cross-node AI/ML session may be established as described herein with respect to FIG. 11. In response to UE mobility (for example, as described herein with respect to FIG. 12), the target E2 node may notify the target Near-RT RIC of the handover and ongoing cross-node AI/ML session. The target Near-RT RIC may respond with the cross-node AI/ML functions and/or features supported at the target Near-RT RIC. The target E2 node may notify the source E2 node of the cross-node AI/ML support information associated with the target Near-RT RIC to facilitate a handover command with such support information.

At 1702, the source E2 node 568a sends, to the target E2 node 568b, an indication to perform a handover for the UE 104, for example, via a handover request message. The handover request message may indicate or include certain information (e.g., UE capabilities, UE context, protocol data unit (PDU) session, etc.) used to perform the handover at the target E2 node 568b. In certain aspects, the handover request may indicate or include information associated with the ongoing cross-node AI/ML session/operations between the UE 104 and the source Near-RT RIC 225a, such as the AI/ML function(s), feature(s), and/or feature group(s), models activated for the cross-node AI/ML session at the UE 104 and/or the source Near-RT RIC 225a. Such information may allow the target E2 node 568b and/or the target Near-RT RIC 225b to keep the cross-node AI/ML session alive after the handover.

At 1704, the target E2 node 568b sends, to the target Near-RT RIC 225b, a RIC query message (or request) for information associated with the cross-node AI/ML operations/sessions supported at the target Near-RT RIC 225b in response to receiving the handover request at 1702. In some cases, the RIC query message may include an indication of the information associated with the on-going cross-node AI/ML session between the UE 104 and the source Near-RT RIC 225a. Such information may allow the target Near-RT RIC 225b to determine if the on-going cross-node AI/ML session or any aspects thereof can be supported at the target Near-RT RIC 225b.

At 1706, a RIC subscription/control procedure is performed between the target Near-RT RIC 225b and the target E2 node 568b in order to notify the target E2 node of the cross-node AI/ML operations supported at the target Near-RT RIC 225b, for example, as described herein with respect to FIGS. 8A and 8B. As an example, in response to the RIC query message at 1704, the target Near-RT RIC 225b sends, to the target E2 node 568b, a RIC subscription request (and/or a RIC control request) indicating cross-node AI/ML information associated with the cross-node AI/ML operations supported at the target Near-RT RIC 225b. The cross-node AI/ML information may indicate or include a session configuration to use for the cross-node AI/ML session (e.g., via identifier(s) or name(s) associated with such AI/ML settings) supported by the target Near-RT RIC 225b and/or associated with the ongoing cross-node AI/ML session between the UE 104 and the source Near-RT RIC 225a. In some cases, the target E2 node 568b may send, to the target Near-RT RIC 225b, an indication acknowledging the RIC control request (and/or a RIC subscription request), for example, via a RIC control response (and/or a RIC subscription response).

At 1708, the target E2 node 568b sends, to the source E2 node 568a, an indication confirming or acknowledging the handover associated with the UE 104, for example, via a handover response message. The handover response message may indicate or include a session configuration to use for the cross-node AI/ML session as supported at the target E2 node 568b and/or the target Near-RT RIC 225b.

At 1710, the source E2 node 568a sends, to the UE 104, a handover command indicating to handover to the target E2 node 568b in response to the handover response. The source E2 node 568a may send the handover command via an RRC reconfiguration message. The handover command may indicate or include certain information used to access the target E2 node, for example, as described herein with respect to FIG. 13. In certain aspects, the handover command may indicate or include a session configuration to use for the cross-node AI/ML session between the UE 104 and the target Near-RT RIC 225*b*. The session configuration may indicate or include an xApp address for establishing a user-plane communication link between the UE 104 and the xApp running on the target Near-RT RIC 225*b*.

At 1712, the UE 104 communicates with the target Near-RT RIC 225*b* via the target E2 node 568*b*, for example, as described herein with respect to FIG. 9 and/or FIG. 11. With the session configuration received via the handover command, the cross-node AI/ML session from the UE perspective may effectively be kept alive following the handover. In some cases, the UE 104 may deactivate certain aspects associated with the session configuration, where the deactivated aspects (e.g., certain MLFN(s)) may be unsupported at or incompatible with the target E2 node 568*b* based on the cross-node AI/ML configuration obtained at 1710.

Example UE State Notifications for a Cross-Node Machine Learning Session

In certain aspects, the Near-RT RIC 225 may perform specific action(s) on a cross-node AI/ML session associated with a UE in response to certain state changes associated with the UE, for example, Layer 3 (L3) state changes (such as RRC idle, RRC connected, and/or RRC inactive), mobility state changes, etc.

Figure 18:
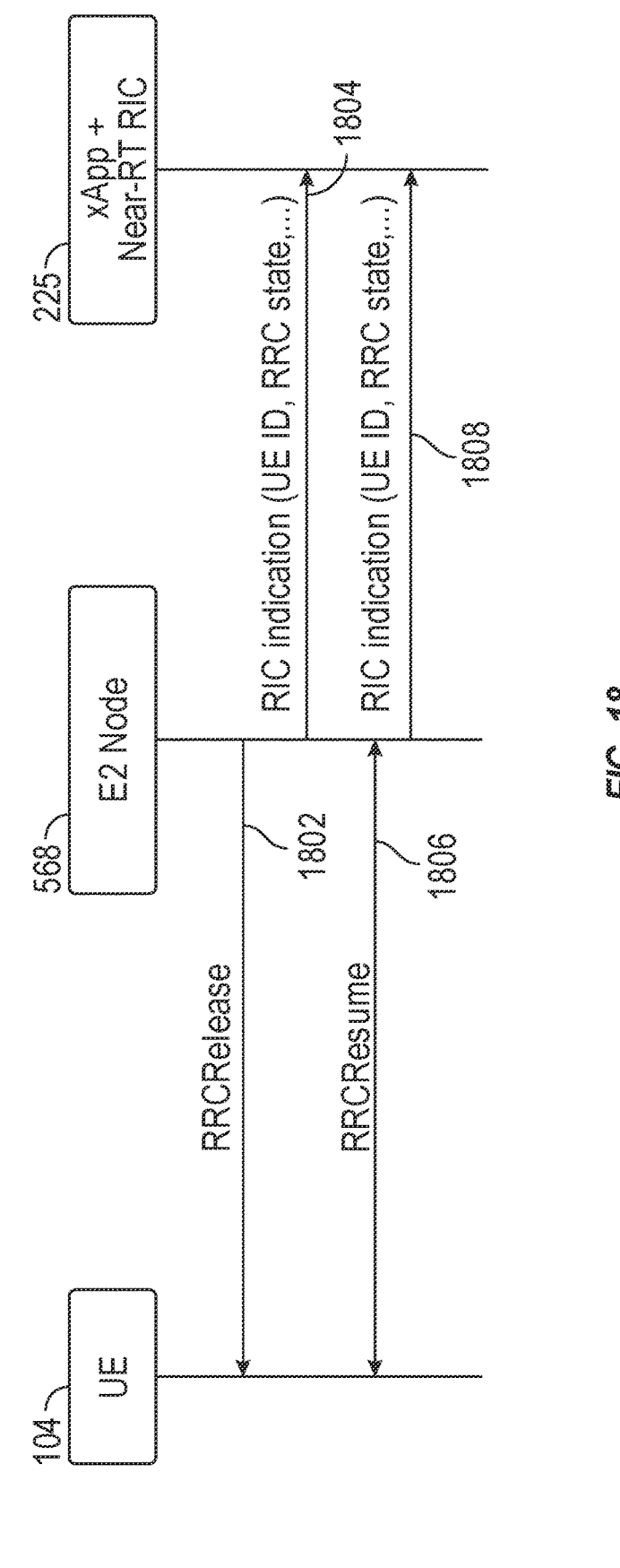
FIG. 18 illustrates an example process flow for notifying a RAN controller of a radio resource control state associated with a UE.

FIG. 18 illustrates an example process flow 1800 for notifying (or reporting to) a RAN controller of the RRC state associated with a UE. RRC state transitions may be indicated to the RAN controller, for example, when the UE moves between an RRC connected state and an idle/inactive state, when the UE moves between an RRC inactive state and an RRC idle state. Such a notification may allow the RAN controller to perform one or more lifecycle management tasks associated with the cross-node AI/ML session between the UE and the RAN controller based on the reported RRC state associated with the UE. For example, the RAN controller may activate, deactivate, switch, or update the cross-node AI/ML session in response to the reported RRC state associated with the UE. Note that the RRC states changes are example UE state changes. Aspects of the present disclosure may be applied to other types of state changes associated with the UE, such as mobility state changes, etc.

At 1802, the E2 node 568 sends, to the UE 104, an indication to transition from an RRC connected state to an RRC idle state or an RRC inactivate state. As an example, the E2 node 568 may send the indication via Layer 3 signaling, such as an RRC connection release message.

At 1804, the E2 node 568 sends, to the Near-RT RIC 225, an indication of the RRC state associated with the UE in response to sending the indication to transition to the RRC idle state or the RRC inactive state associated with the UE. The E2 node 568 may send the indication of the RRC state via a RIC indication message. The indication of the RRC state may indicate or include a UE identifier and the current RRC state associated with the UE 104 (e.g., RRC idle or RRC inactive state). In certain aspects, the Near-RT RIC 225 may adjust certain operations associated with the cross-node AI/ML session with the UE 104 in response to the current RRC state associated with the UE 104. For example, the Near-RT RIC 225 may (temporarily) deactivate or reconfigure the cross-node AI/ML session in response to the UE 104 being in an RRC idle or RRC inactive state.

At 1806, a RRC resume and/or RRC connection establishment process is performed between the UE 104 and the E2 node 568. For example, the E2 node 568 may send, to the UE 104, an indication to transition from the RRC idle state or the RRC inactivate state to the RRC connected state. The E2 node 568 may send the indication to transition to the RRC connected state via paging, for example. In some cases, the UE 104 may send, to the E2 node 568, a request to resume or establish an RRC connection, for example, via an RRC resume request message and/or an RRC connection establishment message.

At 1808, the E2 node 568 sends, to the Near-RT RIC 225, an indication of the RRC state associated with the UE in response to sending the indication to transition to the RRC connected state and/or in responses to obtaining the request to resume or establish an RRC connection. As an example, the Near-RT RIC 225 may (temporarily) activate or reconfigure the cross-node AI/ML session in response to the UE 104 being in the RRC connected state.

While the examples depicted in FIGS. 5A-18 are described herein with respect to a Near-RT RIC communicating with an E2 node to facilitate understanding of certain aspects associated with a cross-node AI/ML session, aspects of the present disclosure may be applied to any other RAN controller (e.g., RIC) in addition to or instead of the Near-RT RIC (e.g., operating control loops in the order of 10 ms-1 s), such as a Non-RT RIC (e.g., operating control loops greater than 1 s) or any future RAN controller including an RT RIC (e.g., operating control loops below 10 ms). In certain aspects, the Non-RT RIC, Near-RT RIC, and the RT RIC may represent different tiers of computational capabilities associated with the respective RIC relative to another type of RIC. For example, the Non-RT RIC may be capable of performing certain control loops within a first time window (e.g., greater than 1 s); the Near-RT RIC may be capable of performing certain control loops within a second time window (e.g., in the order of 10 ms-1 s) shorter than the first time window; and the RT RIC may be capable performing certain control loops within a third time window (e.g., below 10 ms) shorter than the second time window. Such different tiers of computational capabilities may allow various functionalities (e.g., scheduling, beam management, radio link management, AI/ML processing, CSF processing, transmit power controls, energy conservation, load balancing, etc.) associated a cloud-based RAN to be distributed or assigned to the respective RAN controller based on a performance specification (e.g., latency, throughput, reliability, etc.) associated with the functionality. In some aspects, a cloud-based RAN may use any number of tiers associated with computational or processing resources, networking resources, and/ or memory or storage resources for servicing one or more cross-node AI/ML sessions.

With respect to an E2 node, aspects of the present disclosure may be applied to any of the disaggregated network entities, including one or more CUs, one or more DUs, and/or one or more RUs, for example, as described herein with respect to FIG. 2. The communications between any of the RICs and an E2 node may be sent or obtained via an E2 interface and/or an O1 interface as described herein with respect to FIG. 2. Certain operations associated with a cross-node AI/ML session described herein with respect to a Near-RT RIC may be performed via an xApp associated with servicing and/or configuring a cross-node AI/ML session.

The examples of the handover request-response signaling depicted in FIGS. 13-17 are described herein with respect to signaling between E2 nodes to facilitate an understanding of a handover between such nodes. Aspects of the present disclosure associated with the handover request-response signaling may apply to communicating such requests/responses with a core network, such as the 5GC network 190 and/or the AMF 192.

Example Operations of Network Entities

FIG. 19 shows a method 1900 for wireless communication by a first network entity, such as an E2 node of FIGS. 2, 5A, and 5B, or any other suitable disaggregated network entity, such as one or more CUs, one or more DUs, and/or one or more RUs. In certain aspects, the method 1900 includes the operations performed by the target E2 node 568b as described herein with respect to FIGS. 14, 15, and/or 17.

Method 1900 begins at block 1905 with obtaining, from a second network entity, an indication of a handover for a UE.

Method 1900 then proceeds to block 1910 with obtaining, from a third network entity, an indication of first cross-node machine learning information associated with a cross-node machine learning session between the UE and the third network entity.

Method 1900 then proceeds to block 1915 with providing, to the second network entity, an indication acknowledging the handover.

Method 1900 then proceeds to block 1920 with relaying communications between the UE and the third network entity for the cross-node machine learning session.

In certain aspects, block 1905 includes obtaining, from second network entity, the indication of the handover via a handover request; and block 1915 includes providing, to the second network entity, the indication acknowledging the handover via a handover response.

In certain aspects, the handover request comprises an indication of second cross-node machine learning information associated with the first network entity; and the handover response comprises an indication of the first cross-node machine learning information.

In certain aspects, the first cross-node machine learning information comprises one or more machine learning function names supported at the third network entity, and the second cross-node machine learning information comprises one or more machine learning function names supported at the first network entity.

In certain aspects, block 1920 includes relaying communications between the UE and the third network entity via a user plane communication link.

In certain aspects, block 1910 includes obtaining, from the third network entity, the indication of the first cross-node machine learning information via a RIC subscription request message.

In certain aspects, method 1900 further includes providing, to the third network entity, a request for the first cross-node machine learning information in response to obtaining the indication of the handover, wherein block 1905 includes obtaining, from the second network entity, the indication of the handover via a handover request comprising an indication of second cross-node machine learning information associated with the first network entity.

In certain aspects, providing the request comprises providing, to the third network entity, the request via a RIC query message, the request comprising the second cross-node machine learning information; block 1910 includes obtaining, from the third network entity, the indication of the first cross-node machine learning information via a RIC subscription request message in response to the RIC query message.

Figure 37:
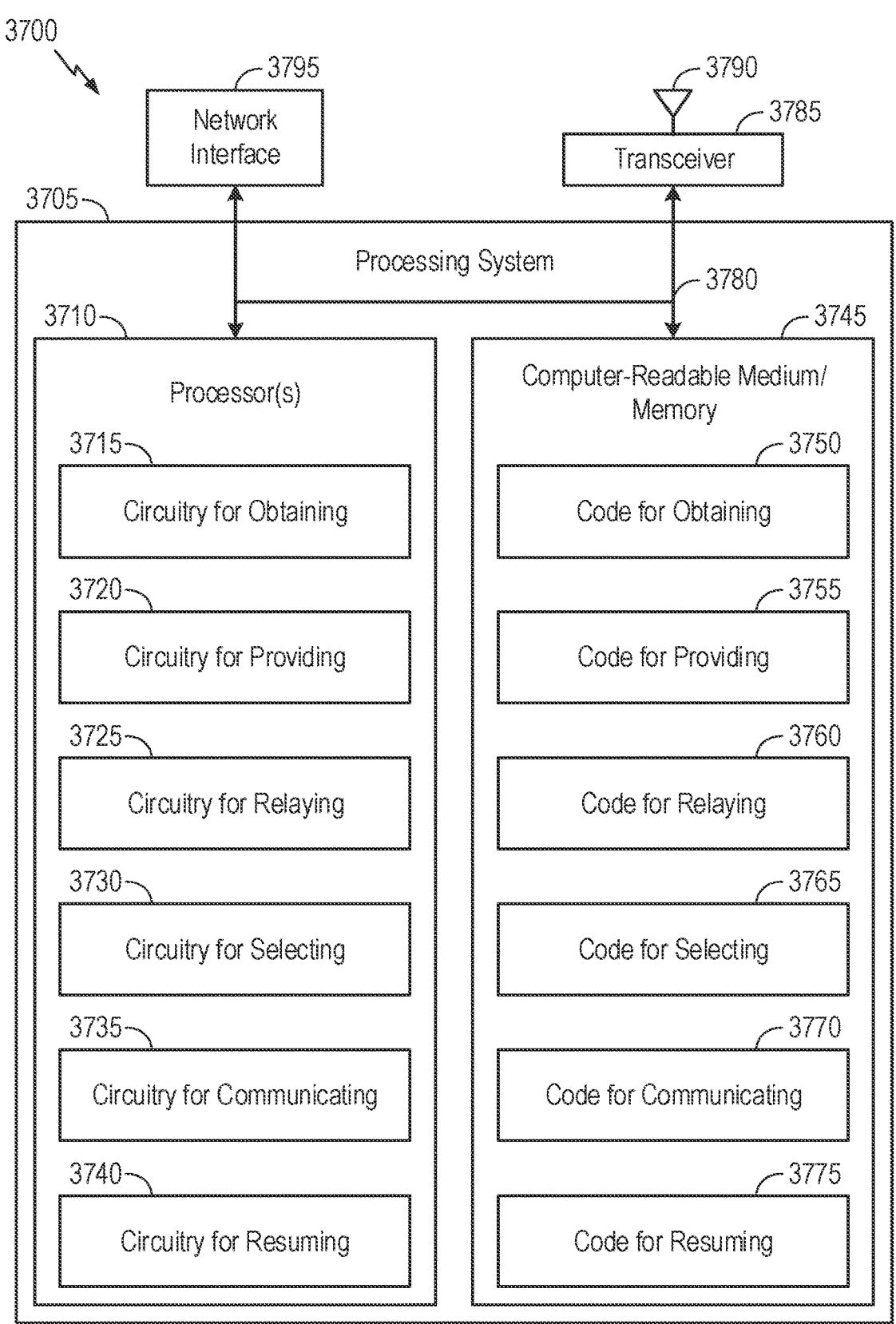
FIG. 37 depicts aspects of an example communications device.

In certain aspects, method 1900, or any aspect related to it, may be performed by an apparatus, such as communications device 3700 of FIG. 37, which includes various components operable, configured, or adapted to perform the method 1900. Communications device 3700 is described below in further detail.

Note that FIG. 19 is just one example of a method, and other methods including fewer, additional, or alternative operations are possible consistent with this disclosure.

FIG. 20 shows a method 2000 for wireless communication by a first network entity, such as an E2 node of FIGS. 2, 5A, and 5B, or any other suitable disaggregated network entity, such as one or more CUs, one or more DUs, and/or one or more RUs. In certain aspects, the method 2000 includes the operations performed by the source E2 node 568a as described herein with respect to FIGS. 14, 15, and/or 17.

Method 2000 begins at block 2005 with providing, to a second network entity, an indication of a handover for a UE.

Method 2000 then proceeds to block 2010 with obtaining an indication of first cross-node machine learning information associated with the second network entity.

Method 2000 then proceeds to block 2015 with providing, to the UE, a handover command indicating the first cross-node machine learning information for a cross-node machine learning session between the UE and a third network entity.

In certain aspects, block 2005 includes providing, to the second network entity, the indication of the handover via a handover request comprising second cross-node machine learning information associated with the first network entity; and block 2010 includes obtaining, from the second network entity, the indication of the first cross-node machine learning information via a handover response.

In certain aspects, the first cross-node machine learning information comprises one or more machine learning function names supported at the second network entity, and the second cross-node machine learning information comprises one or more machine learning function names supported at the first network entity.

In certain aspects, method 2000 further includes providing, to the third network entity, an indication of the handover for the UE associated with the cross-node machine learning session via a RIC indication message.

In certain aspects, block 2015 includes providing, to the UE, the handover command via a RRC reconfiguration message.

In certain aspects, block 2010 includes obtaining, from the third network entity, the indication of the first cross-node machine learning information via a RIC control request message.

In certain aspects, the RIC control request comprises an indication of the second network entity being a target network entity for the handover associated with the UE; and block 2005 includes providing, to the second network entity, the indication of the handover via a handover request in response to obtaining the indication of the second network entity being the target network entity for the handover.

In certain aspects, method 2000, or any aspect related to it, may be performed by an apparatus, such as communications device 3700 of FIG. 37, which includes various components operable, configured, or adapted to perform the method 2000. Communications device 3700 is described below in further detail.

Note that FIG. 20 is just one example of a method, and other methods including fewer, additional, or alternative operations are possible consistent with this disclosure.

FIG. 21 shows a method 2100 for wireless communication by a first network entity, such as a Near-RT RIC of FIGS. 2, 5A, and 5B, or any other suitable RAN controller in a cloud-based RAN. In certain aspects, the method 2100 includes the operations performed by the Near-RT RIC 225 as described herein with respect to FIGS. 14, 15, and/or 17.

Method 2100 begins at block 2105 with providing, to a second network entity, first signaling controlling a cross-node machine learning session between a UE and the first network entity.

Method 2100 then proceeds to block 2110 with providing, to a third network entity, an indication of first cross-node machine learning information associated with the cross-node machine learning session.

Method 2100 then proceeds to block 2115 with providing, to the third network entity, second signaling controlling the cross-node machine learning session in response to a handover for the UE from the second network entity to the third network entity.

In certain aspects, the second signaling indicates an update to a configuration used at the UE for the cross-node machine learning session.

In certain aspects, method 2100 further includes obtaining, from the second network entity, an indication of the handover for the UE associated with the first cross-node machine learning session, wherein block 2110 includes providing, to the third network entity, the indication of the first cross-node machine learning information via a RIC subscription request message in response to obtaining the indication of the handover.

In certain aspects, the indication of the handover comprises: a first identifier associated with the UE, and a second identifier associated with the third network entity being a target network entity for the handover.

In certain aspects, the first cross-node machine learning information comprises one or more machine learning function names supported at the first network entity.

In certain aspects, method 2100 further includes providing, to the second network entity, an indication of the third network entity being a target network entity for the handover associated with the UE.

In certain aspects, providing the indication of the third network entity being the target network entity comprises providing, to the second network entity, the indication of the third network entity being the target network entity via a RIC control request.

In certain aspects, method 2100 further includes obtaining, from the third network entity, a request for the first cross-node machine learning information, wherein block 2110 includes providing, to the third network entity, the indication of the first cross-node machine learning information in response to the request.

In certain aspects, obtaining the request comprises obtaining, from the third network entity, the request via a RIC query message, the request comprising an indication of second cross-node machine learning information associated with the second network entity; and wherein block 2110 includes providing, to the third network entity, the indication of the first cross-node machine learning information via a RIC subscription request in response to the RIC query message.

Figure 38:
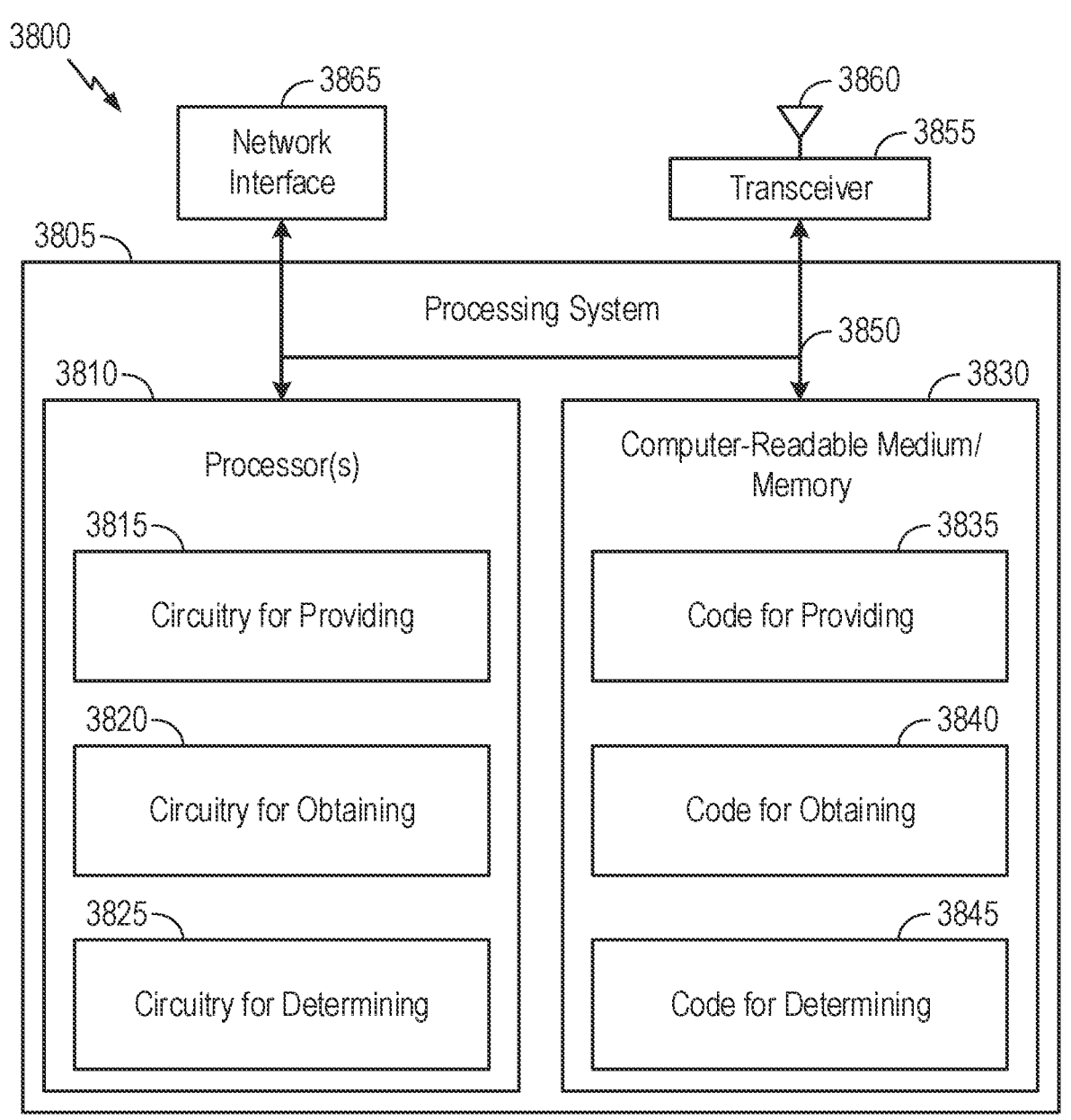
FIG. 38 depicts aspects of an example communications device.

In certain aspects, method 2100, or any aspect related to it, may be performed by an apparatus, such as communications device 3800 of FIG. 38, which includes various components operable, configured, or adapted to perform the method 2100. Communications device 3800 is described below in further detail.

Note that FIG. 21 is just one example of a method, and other methods including fewer, additional, or alternative operations are possible consistent with this disclosure.

FIG. 22 shows a method 2200 for wireless communication by a first network entity, such as an E2 node of FIGS. 2, 5A, and 5B, or any other suitable disaggregated network entity, such as one or more CUs, one or more DUs, and/or one or more RUs. In certain aspects, the method 2200 includes the operations performed by the source E2 node 568a as described herein with respect to FIG. 13.

Method 2200 begins at block 2205 with providing, to a UE, an indication to deactivate a cross-node machine learning session between the UE and a second network entity.

Method 2200 then proceeds to block 2210 with providing, to the second network entity, an indication that the UE is deactivating the cross-node machine learning session.

Method 2200 then proceeds to block 2215 with providing, to the UE, an indication to handover to a third network entity.

In certain aspects, block 2205 includes providing, to the second network entity, the indication that the UE is deactivating the cross-node machine learning session via a RIC indication message.

In certain aspects, method 2200 further includes selecting the third network entity for the handover.

In certain aspects, method 2200 further includes providing, to the third network entity, a handover request indicating to handover communications with the UE.

In certain aspects, method 2200 further includes obtaining, from the third network entity, a handover response acknowledging the handover.

In certain aspects, block 2215 includes providing, to the UE, the indication to handover via a RRC reconfiguration message.

In certain aspects, method 2200, or any aspect related to it, may be performed by an apparatus, such as communications device 3700 of FIG. 37, which includes various components operable, configured, or adapted to perform the method 2200. Communications device 3700 is described below in further detail.

Note that FIG. 22 is just one example of a method, and other methods including fewer, additional, or alternative operations are possible consistent with this disclosure.

FIG. 23 shows a method 2300 for wireless communication by a first network entity, such as a Near-RT RIC of FIGS. 2, 5A, and 5B, or any other suitable RAN controller in a cloud-based RAN. In certain aspects, the method 2300 includes the operations performed by the Near-RT RIC 225 as described herein with respect to FIG. 13.

Method 2300 begins at block 2305 with obtaining machine learning input data associated with a cross-node machine learning session between a UE and the first network entity.

Method 2300 then proceeds to block 2310 with obtaining, from a second network entity, an indication that the UE is deactivating the cross-node machine learning session.

Method 2300 then proceeds to block 2315 with obtaining, from a third network entity, a request to activate the cross-node machine learning session.

Method 2300 then proceeds to block 2320 with providing, to the third network entity, a configuration associated with the cross-node machine learning session for the UE in response to obtaining the request.

In certain aspects, block 2310 includes obtaining, from the second network entity, the indication that the UE is deactivating the cross-node machine learning session via a RIC indication message.

In certain aspects, method 2300, or any aspect related to it, may be performed by an apparatus, such as communications device 3800 of FIG. 38, which includes various components operable, configured, or adapted to perform the method 2300. Communications device 3800 is described below in further detail.

Note that FIG. 23 is just one example of a method, and other methods including fewer, additional, or alternative operations are possible consistent with this disclosure.

FIG. 24 shows a method 2400 for wireless communication by a first network entity, such as an E2 node of FIGS. 2, 5A, and 5B, or any other suitable disaggregated network entity, such as one or more CUs, one or more DUs, and/or one or more RUs. In certain aspects, the method 2400 includes the operations performed by the source E2 node 568a as described herein with respect to FIG. 14.

Method 2400 begins at block 2405 with providing, to a second network entity, an indication of a handover for a UE associated with a cross-node machine learning session between the UE and the second network entity.

Method 2400 then proceeds to block 2410 with obtaining, from a third network entity, an indication of first cross-node machine learning information associated with the third network entity.

Method 2400 then proceeds to block 2415 with providing, to the UE, an indication to handover to the third network entity and an indication of the first cross-node machine learning information associated with the third network entity.

In certain aspects, block 2405 includes providing, to the second network entity, the indication of the handover via a RIC indication message.

In certain aspects, the indication of the handover comprises: a first identifier associated with the UE, and a second identifier associated with the third network entity being a target network entity for the handover.

In certain aspects, method 2400 further includes providing, to the third network entity via a handover request, an indication of second cross-node machine learning information associated with the first network entity, wherein block 2410 includes obtaining the indication of the first cross-node machine learning information via a handover response.

In certain aspects, the first cross-node machine learning information comprises one or more machine learning function names supported at the third network entity, and the second cross-node machine learning information comprises one or more machine learning function names supported at the first network entity.

In certain aspects, block 2405 includes providing, to the UE, the indication to handover and the indication of the first cross-node machine learning information via a RRC reconfiguration message.

In certain aspects, method 2400, or any aspect related to it, may be performed by an apparatus, such as communications device 3700 of FIG. 37, which includes various components operable, configured, or adapted to perform the method 2400. Communications device 3700 is described below in further detail.

Note that FIG. 24 is just one example of a method, and other methods including fewer, additional, or alternative operations are possible consistent with this disclosure.

FIG. 25 shows a method 2500 for wireless communication by a first network entity, such as a Near-RT RIC of FIGS. 2, 5A, and 5B, or any other suitable RAN controller in a cloud-based RAN. In certain aspects, the method 2500 includes the operations performed by the Near-RT RIC 225 as described herein with respect to FIG. 14.

Method 2500 begins at block 2505 with obtaining, from a second network entity, an indication of a handover for a UE associated with a cross-node machine learning session between the UE and the first network entity.

Method 2500 then proceeds to block 2510 with, in response to obtaining the indication of the handover, providing, to a third network entity, an indication of cross-node machine learning information associated with the first network entity.

Method 2500 then proceeds to block 2515 with providing, to the third network entity, signaling controlling the cross-node machine learning session.

In certain aspects, the signaling indicates an update to a configuration used at the UE for the cross-node machine learning session.

In certain aspects, block 2505 includes obtaining, from the second network entity, the indication of the handover via a RIC indication message.

In certain aspects, the indication of the handover comprises: a first identifier associated with the UE, and a second identifier associated with the third network entity being a target network entity for the handover.

In certain aspects, block 2510 includes providing, to the third network entity, the indication of cross-node machine learning information via a RIC subscription request.

In certain aspects, method 2500, or any aspect related to it, may be performed by an apparatus, such as communications device 3800 of FIG. 38, which includes various components operable, configured, or adapted to perform the method 2500. Communications device 3800 is described below in further detail.

Note that FIG. 25 is just one example of a method, and other methods including fewer, additional, or alternative operations are possible consistent with this disclosure.

FIG. 26 shows a method 2600 for wireless communication by a first network entity, such as an E2 node of FIGS. 2, 5A, and 5B, or any other suitable disaggregated network entity, such as one or more CUs, one or more DUs, and/or one or more RUs. In certain aspects, the method 2600 includes the operations performed by the target E2 node 568b as described herein with respect to FIG. 14.

Method 2600 begins at block 2605 with obtaining, from a second network entity, an indication of first cross-node machine learning information associated with a cross-node machine learning session between a UE and a third network entity.

Method 2600 then proceeds to block 2610 with obtaining, from the third network entity, an indication of second cross-node machine learning information associated with the third network entity.

Method 2600 then proceeds to block 2615 with providing, to the second network entity, an indication of the second cross-node machine learning information.

Method 2600 then proceeds to block 2620 with communicating with the UE in response to providing the indication of the second cross-node machine learning information.

In certain aspects, method 2600 further includes providing, to the third network entity, an indication acknowledging the second cross-node machine learning information, wherein block 2610 includes obtaining, from the third network entity, the indication of the second cross-node machine learning information via a RIC subscription message.

In certain aspects, block 2605 includes obtaining, from the second network entity, the indication of the first cross-node machine learning information via a handover request; and block 2615 includes providing, the second network entity, indication of the second cross-node machine learning information via a handover response.

In certain aspects, the first cross-node machine learning information comprises one or more machine learning function names supported at the third network entity, and the second cross-node machine learning information comprises one or more machine learning function names supported at the first network entity.

In certain aspects, method 2600, or any aspect related to it, may be performed by an apparatus, such as communications device 3700 of FIG. 37, which includes various components operable, configured, or adapted to perform the method 2600. Communications device 3700 is described below in further detail.

Note that FIG. 26 is just one example of a method, and other methods including fewer, additional, or alternative operations are possible consistent with this disclosure.

FIG. 27 shows a method 2700 for wireless communication by a first network entity, such as an E2 node of FIGS. 2, 5A, and 5B, or any other suitable disaggregated network entity, such as one or more CUs, one or more DUs, and/or one or more RUs. In certain aspects, the method 2700 includes the operations performed by the source E2 node 568a as described herein with respect to FIG. 15.

Method 2700 begins at block 2705 with obtaining, from a second network entity: an indication of a third network entity being a target network entity for a handover associated with a UE, and an indication of cross-node machine learning information associated with the third network entity.

Method 2700 then proceeds to block 2710 with providing, to the UE: an indication to handover to the third network entity, and an indication of the cross-node machine learning information associated with the third network entity.

In certain aspects, block 2705 includes obtaining, from the second network entity, the indication of the third network entity and the indication of the cross-node machine learning information via a RIC control request.

In certain aspects, method 2700 further includes providing, to the third network entity, an indication of the handover associated with the UE via a handover request.

In certain aspects, method 2700 further includes obtaining, from the third network entity, an indication acknowledging the handover via a handover response.

In certain aspects, block 2710 includes providing, to the UE, the indication to handover and the indication of the cross-node machine learning information via a RRC reconfiguration message.

In certain aspects, method 2700, or any aspect related to it, may be performed by an apparatus, such as communications device 3700 of FIG. 37, which includes various components operable, configured, or adapted to perform the method 2700. Communications device 3700 is described below in further detail.

Note that FIG. 27 is just one example of a method, and other methods including fewer, additional, or alternative operations are possible consistent with this disclosure.

FIG. 28 shows a method 2800 for wireless communication by a first network entity, such as a Near-RT RIC of FIGS. 2, 5A, and 5B, or any other suitable RAN controller in a cloud-based RAN. In certain aspects, the method 2800 includes the operations performed by the Near-RT RIC 225 as described herein with respect to FIG. 15.

Method 2800 begins at block 2805 with providing, to a second network entity, first signaling controlling a cross-node machine learning session between a UE and the first network entity.

Method 2800 then proceeds to block 2810 with providing, to a third network entity, an indication of first cross-node machine learning information associated with the cross-node machine learning session.

Method 2800 then proceeds to block 2815 with providing, to the second network entity: an indication of the third network entity being a target network entity for a handover associated with the UE, and an indication of second cross-node machine learning information associated with the third network entity.

Method 2800 then proceeds to block 2820 with providing, to the third network entity, second signaling controlling the cross-node machine learning session between the UE and the first network entity.

In certain aspects, block 2810 includes providing the indication of the first cross-node machine learning information via a RIC subscription message.

In certain aspects, block 2815 includes providing, to the second network entity, the indication of the third network entity being the target network entity and the indication of the second cross-node machine learning information via a RIC control request.

In certain aspects, the second signaling indicates an update to a configuration used at the UE for the cross-node machine learning session.

In certain aspects, the first cross-node machine learning information comprises one or more machine learning function names supported at the second network entity, and the second cross-node machine learning information comprises one or more machine learning function names supported at the third network entity.

In certain aspects, method 2800, or any aspect related to it, may be performed by an apparatus, such as communications device 3800 of FIG. 38, which includes various components operable, configured, or adapted to perform the method 2800. Communications device 3800 is described below in further detail.

Note that FIG. 28 is just one example of a method, and other methods including fewer, additional, or alternative operations are possible consistent with this disclosure.

FIG. 29 shows a method 2900 for wireless communication by a first network entity, such as an E2 node of FIGS. 2, 5A, and 5B, or any other suitable disaggregated network entity, such as one or more CUs, one or more DUs, and/or one or more RUs. In certain aspects, the method 2900 includes the operations performed by the target E2 node 568b as described herein with respect to FIG. 15.

Method 2900 begins at block 2905 with obtaining, from a second network entity, an indication of cross-node machine learning information associated with a cross-node machine learning session between a UE and the second network entity.

Method 2900 then proceeds to block 2910 with obtaining, from a third network entity, an indication of a handover associated with the UE.

Method 2900 then proceeds to block 2915 with providing, to the third network entity, an indication acknowledging the handover.

Method 2900 then proceeds to block 2920 with communicating with the UE in response to providing the indication acknowledging the handover.

In certain aspects, block 2905 includes obtaining, from the second network entity, the indication of cross-node machine learning information via a RIC subscription request.

In certain aspects, method 2900 further includes obtaining, from the third network entity, the indication of the handover via a handover request.

In certain aspects, method 2900 further includes providing, to the third network entity, the indication acknowledging the handover via a handover response.

In certain aspects, method 2900, or any aspect related to it, may be performed by an apparatus, such as communications device 3700 of FIG. 37, which includes various components operable, configured, or adapted to perform the method 2900. Communications device 3700 is described below in further detail.

Note that FIG. 29 is just one example of a method, and other methods including fewer, additional, or alternative operations are possible consistent with this disclosure.

FIG. 30 shows a method 3000 for wireless communication by a first network entity, such as an E2 node of FIGS. 2, 5A, and 5B, or any other suitable disaggregated network entity, such as one or more CUs, one or more DUs, and/or one or more RUs. In certain aspects, the method 3000 includes the operations performed by the source E2 node 568a as described herein with respect to FIG. 16.

Method 3000 begins at block 3005 with providing, to a second network entity, an indication of a handover to a third network entity for a UE associated with a cross-node machine learning session between the UE and the second network entity.

Method 3000 then proceeds to block 3010 with obtaining, from the second network entity, an indication to deactivate the cross-node machine learning session with the second network entity.

Method 3000 then proceeds to block 3015 with providing, to the UE, an indication to handover to the third network entity and the indication to deactivate the cross-node machine learning session between the UE and the second network entity.

In certain aspects, block 3005 includes providing, to the second network entity, the indication of the handover via a RIC indication message.

In certain aspects, the indication of the handover comprises an identifier associated with the third network entity being a target network entity for the handover.

In certain aspects, block 3010 includes obtaining, from the second network entity, the indication to deactivate the cross-node machine learning session via a RIC control request.

In certain aspects, method 3000 further includes providing, to the third network entity, an indication of the handover for the UE via a handover request.

In certain aspects, method 3000 further includes obtaining, from the third network entity, an indication acknowledging the handover via a handover response.

In certain aspects, block 3005 includes providing, to the UE, the indication to handover and the indication to deactivate the cross-node machine learning session via a RRC reconfiguration message.

In certain aspects, method 3000, or any aspect related to it, may be performed by an apparatus, such as communications device 3700 of FIG. 37, which includes various components operable, configured, or adapted to perform the method 3000. Communications device 3700 is described below in further detail.

Note that FIG. 30 is just one example of a method, and other methods including fewer, additional, or alternative operations are possible consistent with this disclosure.

FIG. 31 shows a method 3100 for wireless communication by a first network entity, such as a Near-RT RIC of FIGS. 2, 5A, and 5B, or any other suitable RAN controller in a cloud-based RAN. In certain aspects, the method 3100 includes the operations performed by the Near-RT RIC 225 as described herein with respect to FIG. 16.

Method 3100 begins at block 3105 with providing, to a second network entity, signaling controlling a cross-node machine learning session between a UE and the first network entity.

Method 3100 then proceeds to block 3110 with obtaining, from a second network entity, an indication of a handover to a third network entity for a UE associated with the cross-node machine learning session.

Method 3100 then proceeds to block 3115 with providing, to the second network entity, an indication to deactivate the cross-node machine learning session with the second network entity in response to obtaining the indication of the handover.

In certain aspects, block 3110 includes obtaining, from the second network entity, the indication of the handover via a RIC indication message.

In certain aspects, the indication of the handover comprises an identifier associated with the third network entity being a target network entity for the handover.

In certain aspects, block 3115 includes providing, to the second network entity, the indication to deactivate the cross-node machine learning session via a RIC control request.

In certain aspects, the signaling indicates an update to a configuration used at the UE for the cross-node machine learning session.

In certain aspects, method 3100 further includes determining that the third network entity is managed by a fourth network entity, wherein block 3115 includes providing, to the second network entity, the indication to deactivate the cross-node machine learning session further in response to determining that the third network entity is managed by a fourth network entity.

In certain aspects, method 3100, or any aspect related to it, may be performed by an apparatus, such as communications device 3800 of FIG. 38, which includes various components operable, configured, or adapted to perform the method 3100. Communications device 3800 is described below in further detail.

Note that FIG. 31 is just one example of a method, and other methods including fewer, additional, or alternative operations are possible consistent with this disclosure.

FIG. 32 shows a method 3200 for wireless communication by a first network entity, such as an E2 node of FIGS. 2, 5A, and 5B, or any other suitable disaggregated network entity, such as one or more CUs, one or more DUs, and/or one or more RUs. In certain aspects, the method 3200 includes the operations performed by the target E2 node 568b as described herein with respect to FIG. 17.

Method 3200 begins at block 3205 with obtaining, from a second network entity: an indication of the first network entity being a target network entity for a handover associated with a UE, and an indication of first cross-node machine learning information associated with the second network entity in communication with a first RAN controller.

Method 3200 then proceeds to block 3210 with providing, to a second RAN controller in communication with the first network entity, an indication of the first cross-node machine learning information associated with the second network entity.

Method 3200 then proceeds to block 3215 with obtaining, from the second RAN controller, an indication of second cross-node machine learning information associated with the first network entity.

Method 3200 then proceeds to block 3220 with providing, to the second network entity: an indication acknowledging the handover, and the indication of the second cross-node machine learning information associated with the first network entity.

Method 3200 then proceeds to block 3225 with, in response to providing the indication acknowledging the handover, communicating with the UE.

In certain aspects, block 3205 includes obtaining, from the second network entity, the indication of the first network entity via a handover request, and block 3220 includes providing, to the second network entity, the indication acknowledging the handover and the indication of the second cross-node machine learning information via a handover response.

In certain aspects, block 3220 includes providing, to the second RAN controller in communication with the first network entity, the indication of the second cross-node machine learning information via a RIC query message.

In certain aspects, block 3215 includes obtaining, from the second RAN controller, the indication of the second cross-node machine learning information via a RIC subscription request message.

In certain aspects, method 3200, or any aspect related to it, may be performed by an apparatus, such as communications device 3700 of FIG. 37, which includes various components operable, configured, or adapted to perform the method 3200. Communications device 3700 is described below in further detail.

Note that FIG. 32 is just one example of a method, and other methods including fewer, additional, or alternative operations are possible consistent with this disclosure.

FIG. 33 shows a method 3300 for wireless communication by a first network entity, such as a Near-RT RIC of FIGS. 2, 5A, and 5B, or any other suitable RAN controller in a cloud-based RAN. In certain aspects, the method 3300 includes the operations performed by the target Near-RT RIC 225b as described herein with respect to FIG. 17.

Method 3300 begins at block 3305 with obtaining, from a second network entity, a request for first cross-node machine learning information.

Method 3300 then proceeds to block 3310 with providing, to the second network entity, an indication of the first cross-node machine learning information.

Method 3300 then proceeds to block 3315 with providing, to the second network entity, signaling controlling a cross-node machine learning session between a UE and the first network entity.

In certain aspects, block 3305 includes obtaining, from the second network entity, the request via a RIC query message.

In certain aspects, obtaining the request indicates second cross-node machine learning information associated with a cross-node machine learning session between the UE and a third network entity.

In certain aspects, the first cross-node machine learning information comprises one or more machine learning function names supported at the first network entity, and the second cross-node machine learning information comprises one or more machine learning function names supported at the third network entity.

In certain aspects, block 3310 includes providing, to the second network entity, the indication of the first cross-node machine learning information via a RIC subscription request message.

In certain aspects, method 3300, or any aspect related to it, may be performed by an apparatus, such as communications device 3800 of FIG. 38, which includes various components operable, configured, or adapted to perform the method 3300. Communications device 3800 is described below in further detail.

Note that FIG. 33 is just one example of a method, and other methods including fewer, additional, or alternative operations are possible consistent with this disclosure.

FIG. 34 shows a method 3400 for wireless communication by a first network entity, such as an E2 node of FIGS. 2, 5A, and 5B, or any other suitable disaggregated network entity, such as one or more CUs, one or more DUs, and/or one or more RUs. In certain aspects, the method 3400 includes the operations performed by the E2 node 568 as described herein with respect to FIG. 18.

Method 3400 begins at block 3405 with relaying communications between a UE and a second network entity engaged in a cross-node machine learning session between the UE and the second network entity.

Method 3400 then proceeds to block 3410 with providing, to the UE, an indication to transition from a first RRC state to a second RRC state.

Method 3400 then proceeds to block 3415 with providing, to the second network entity, an indication of the UE being in the second RRC state.

In certain aspects, block 3410 includes providing, to the UE, the indication via a RRC release message; and block 3415 includes providing, to the second network entity, the indication of the UE being in the second RRC state via a RIC indication message.

In certain aspects, method 3400 further includes providing, to the UE, an indication to transition from the second RRC state to the first RRC state via a RRC resume message.

In certain aspects, method 3400 further includes providing, to the second network entity, an indication of the UE being in the first RRC state via a RIC indication message.

In certain aspects, method 3400 further includes resuming relaying communications between the UE and the second network entity engaged in the cross-node machine learning session between the UE and the second network entity.

In certain aspects, the first RRC state comprises a RRC connected state; and the second RRC state comprises a RRC inactive state.

In certain aspects, the first RRC state comprises a RRC connected state; and the second RRC state comprises a RRC idle state.

In certain aspects, in response to the providing the indication of the UE being in the second RRC state, method 3400 further includes obtaining, from the second network entity, an indication to deactivate the cross-node machine learning session between the UE and the second network entity.

In certain aspects, method 3400 further includes providing, to the UE, the indication to the cross-node machine learning session.

In certain aspects, method 3400, or any aspect related to it, may be performed by an apparatus, such as communications device 3700 of FIG. 37, which includes various components operable, configured, or adapted to perform the method 3400. Communications device 3700 is described below in further detail.

Note that FIG. 34 is just one example of a method, and other methods including fewer, additional, or alternative operations are possible consistent with this disclosure.

Figure 35:
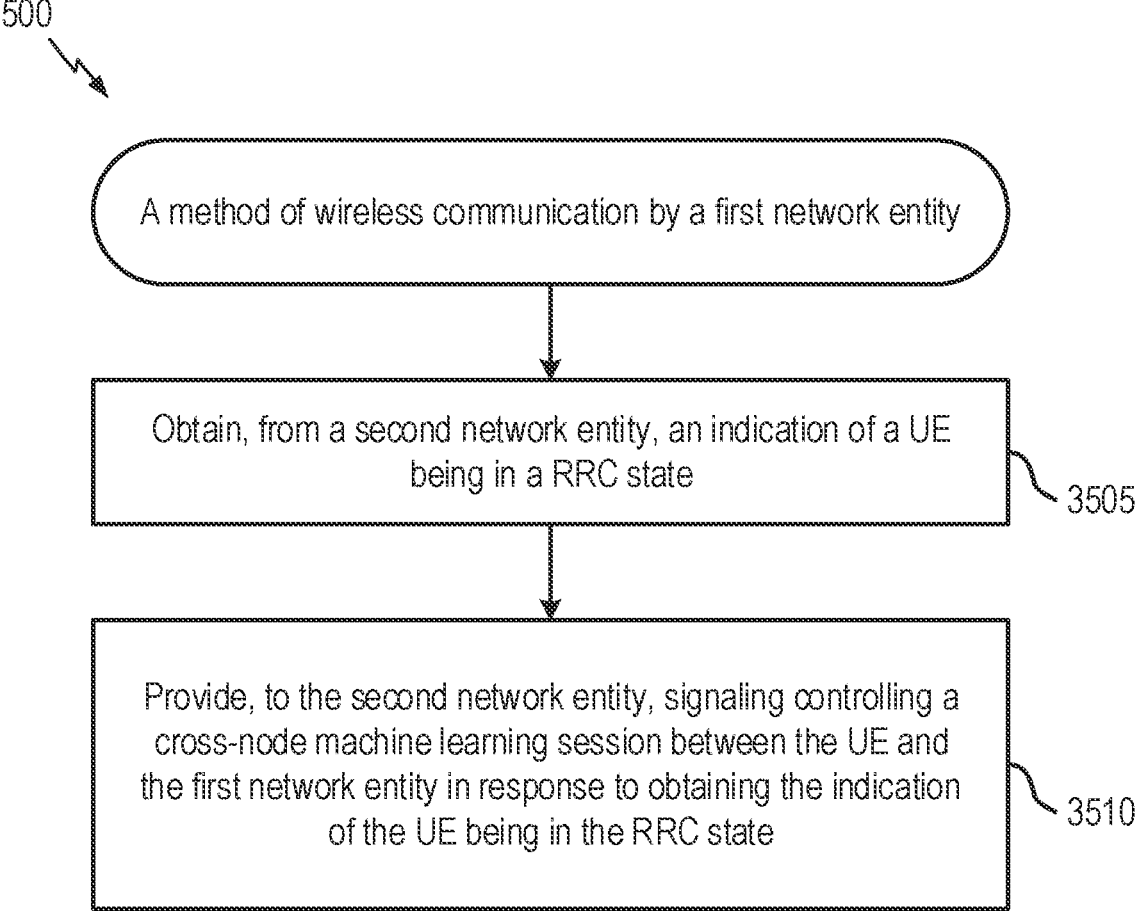
FIG. 35 depicts another method for wireless communications.

FIG. 35 shows a method 3500 for wireless communication by a first network entity, such as a Near-RT RIC of FIGS. 2, 5A, and 5B, or any other suitable RAN controller in a cloud-based RAN. In certain aspects, the method 3500 includes the operations performed by the Near-RT RIC 225 as described herein with respect to FIG. 18.

Method 3500 begins at block 3505 with obtaining, from a second network entity, an indication of a UE being in a RRC state.

Method 3500 then proceeds to block 3510 with providing, to the second network entity, signaling controlling a cross-node machine learning session between the UE and the first network entity in response to obtaining the indication of the UE being in the RRC state.

In certain aspects, block 3505 includes obtaining, from the second network entity, the indication of the UE being in the RRC state via a RIC indication message.

In certain aspects, the RRC state comprises an RRC connected state, an RRC idle state, or an RRC inactive state.

In certain aspects, the signaling indicates to deactivate the cross-node machine learning session between the UE and the first network entity.

In certain aspects, the signaling indicates to update the cross-node machine learning session between the UE and the first network entity.

In certain aspects, method 3500, or any aspect related to it, may be performed by an apparatus, such as communications device 3800 of FIG. 38, which includes various components operable, configured, or adapted to perform the method 3500. Communications device 3800 is described below in further detail.

Note that FIG. 35 is just one example of a method, and other methods including fewer, additional, or alternative operations are possible consistent with this disclosure.
Example Operations of a User Equipment FIG. 36 shows a method 3600 for wireless communication by an apparatus, such as UE 104 of FIGS. 1 and 3. In certain aspects, the method 3600 includes the operations performed by the UE 104 as described herein with respect to FIGS. 13, 14, 15, and/or 17.

Method 3600 begins at block 3605 with communicating with a first network entity in accordance with a cross-node machine learning session between the apparatus and the first network entity.

Method 3600 then proceeds to block 3610 with obtaining, from a second network entity, an indication to perform a handover to a third network entity and a configuration for the cross-node machine learning session.

Method 3600 then proceeds to block 3615 with communicating in accordance with the configuration for the cross-node machine learning session via at least a wireless communication link between the apparatus and the third network entity.

In certain aspects, communicating with the first network entity comprises communicating with the first network entity via a user-plane communication link associated with the cross-node machine learning session.

In certain aspects, the configuration includes an indication of one or more parameters supported by the third network entity in association with the cross-node machine learning session.

In certain aspects, communicating in accordance with the configuration for the cross-node machine learning session comprises communicating with the first network entity via a user-plane communication link associated with the cross-node machine learning session.

In certain aspects, the configuration includes an indication to handover the cross-node machine learning session to a fourth network entity; and communicating in accordance with the configuration for the cross-node machine learning session comprises communicating with the fourth network entity via a user-plane communication link associated with the cross-node machine learning session.

In certain aspects, method 3600 further includes providing, to the first network entity, machine learning information via at least the wireless communication link. In certain aspects, method 3600 further includes obtaining, from the third network entity, signaling controlling the wireless communication link in response to the machine learning information.

In certain aspects, the first network entity comprises a RIC, such as a Near-RT RIC, a Non-RT RIC, and/or a RT RIC in a cloud-based RAN; the second network entity comprises a first CU, a first DU, and/or a first RU in communication with the first network entity via an E2 interface and/or an O1 interface; and the third network entity comprises a second a second CU, a second DU, and/or a second RU in communication with the first network entity via the E2 interface and/or the O1 interface.

Figure 39:
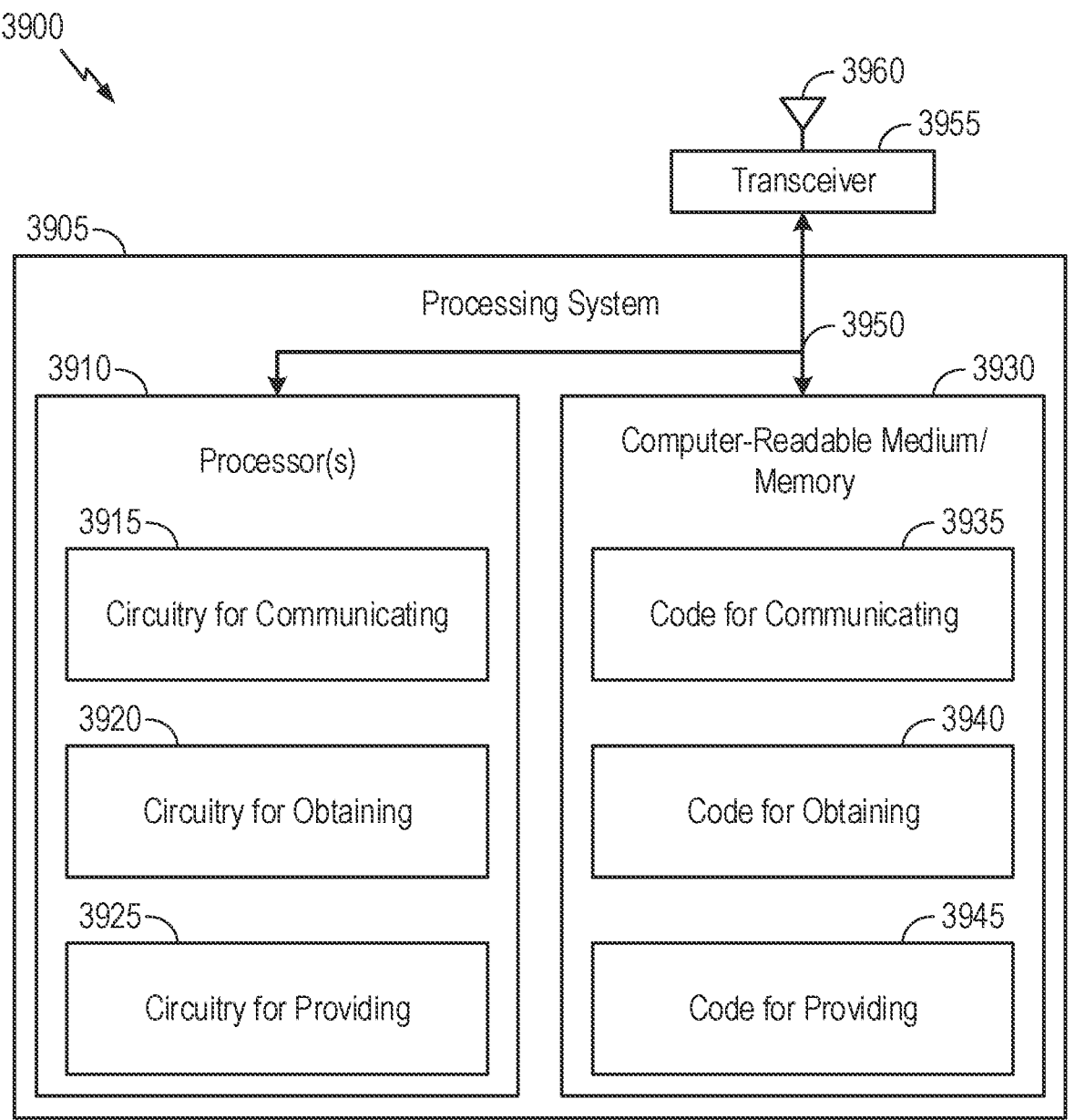
FIG. 39 depicts aspects of an example communications device.

In certain aspects, method 3600, or any aspect related to it, may be performed by an apparatus, such as communications device 3900 of FIG. 39, which includes various components operable, configured, or adapted to perform the method 3600. Communications device 3900 is described below in further detail.

Note that FIG. 36 is just one example of a method, and other methods including fewer, additional, or alternative operations are possible consistent with this disclosure.
Example Communications Devices FIG. 37 depicts aspects of an example communications device 3700. In some aspects, communications device 3700 is a network entity, such as an E2 node of FIGS. 2, 5A, and 5B, or any other suitable disaggregated network entity, such as one or more CUs, one or more DUs, and/or one or more RUs.

The communications device 3700 includes a processing system 3705 coupled to a transceiver 3785 (e.g., a transmitter and/or a receiver) and/or a network interface 3795. The transceiver 3785 is configured to transmit and receive signals for the communications device 3700 via an antenna 3790, such as the various signals as described herein. The network interface 3795 is configured to obtain and send signals for the communications device 3700 via communications link(s), such as a backhaul link, midhaul link, and/or fronthaul link as described herein, such as with respect to FIG. 2. The processing system 3705 may be configured to perform processing functions for the communications device 3700, including processing signals received and/or to be transmitted by the communications device 3700.

The processing system 3705 includes one or more processors 3710. In various aspects, one or more processors 3710 may be representative of one or more of receive processor 338, transmit processor 320, TX MIMO processor 330, and/or controller/processor 340, as described with respect to FIG. 3. The one or more processors 3710 are coupled to a computer-readable medium/memory 3745 via a bus 3780. In certain aspects, the computer-readable medium/memory 3745 is configured to store instructions (e.g., computer-executable code) that when executed by the one or more processors 3710, enable and cause the one or more processors 3710 to perform the method 1900 described with respect to FIG. 19, or any aspect related to it, including any additional operations described in relation to FIG. 19; the method 2000 described with respect to FIG. 20, or any aspect related to it, including any additional operations described in relation to FIG. 20; the method 2200 described with respect to FIG. 22, or any aspect related to it, including any additional operations described in relation to FIG. 22;

the method 2400 described with respect to FIG. 24, or any aspect related to it, including any additional operations described in relation to FIG. 24; the method 2600 described with respect to FIG. 26, or any aspect related to it, including any additional operations described in relation to FIG. 26; the method 2700 described with respect to FIG. 27, or any aspect related to it, including any additional operations described in relation to FIG. 27; the method 2900 described with respect to FIG. 29, or any aspect related to it, including any additional operations described in relation to FIG. 29; the method 3000 described with respect to FIG. 30, or any aspect related to it, including any additional operations described in relation to FIG. 30; the method 3200 described with respect to FIG. 32, or any aspect related to it, including any additional operations described in relation to FIG. 32; and the method 3400 described with respect to FIG. 34, or any aspect related to it, including any additional operations described in relation to FIG. 34. Note that reference to a processor of communications device 3700 performing a function may include one or more processors of communications device 3700 performing that function, such as in a distributed fashion.

In the depicted example, the computer-readable medium/memory 3745 stores code for obtaining 3750, code for providing 3755, code for relaying 3760, code for selecting 3765, code for communicating 3770, and code for resuming 3775. Processing of the code 3750-3775 may enable and cause the communications device 3700 to perform the method 1900 described with respect to FIG. 19, or any aspect related to it; the method 2000 described with respect to FIG. 20, or any aspect related to it; the method 2200 described with respect to FIG. 22, or any aspect related to it; the method 2400 described with respect to FIG. 24, or any aspect related to it; the method 2600 described with respect to FIG. 26, or any aspect related to it; the method 2700 described with respect to FIG. 27, or any aspect related to it; the method 2900 described with respect to FIG. 29, or any aspect related to it; the method 3000 described with respect to FIG. 30, or any aspect related to it; the method 3200 described with respect to FIG. 32, or any aspect related to it; and the method 3400 described with respect to FIG. 34, or any aspect related to it.

The one or more processors 3710 include circuitry configured to implement (e.g., execute) the code stored in the computer-readable medium/memory 3745, including circuitry for obtaining 3715, circuitry for providing 3720, circuitry for relaying 3725, circuitry for selecting 3730, circuitry for communicating 3735, and circuitry for resuming 3740. Processing with circuitry 3715-3740 may enable and cause the communications device 3700 to perform the method 1900 described with respect to FIG. 19, or any aspect related to it; the method 2000 described with respect to FIG. 20, or any aspect related to it; the method 2200 described with respect to FIG. 22, or any aspect related to it; the method 2400 described with respect to FIG. 24, or any aspect related to it; the method 2600 described with respect to FIG. 26, or any aspect related to it; the method 2700 described with respect to FIG. 27, or any aspect related to it; the method 2900 described with respect to FIG. 29, or any aspect related to it; the method 3000 described with respect to FIG. 30, or any aspect related to it; the method 3200 described with respect to FIG. 32, or any aspect related to it; and the method 3400 described with respect to FIG. 34, or any aspect related to it.

More generally, means for communicating, transmitting, relaying, providing, sending or outputting for transmission may include the transceivers 332, antenna(s) 334, transmit processor 320, TX MIMO processor 330, and/or controller/processor 340 of the BS 102 illustrated in FIG. 3, transceiver 3785 and/or antenna 3790 of the communications device 3700 in FIG. 37, network interface 3795 of the communications device in FIG. 37, and/or one or more processors 3710 of the communications device 3700 in FIG. 37. Means for communicating, relaying, receiving or obtaining may include the transceivers 332, antenna(s) 334, receive processor 338, and/or controller/processor 340 of the BS 102 illustrated in FIG. 3, transceiver 3785 and/or antenna 3790 of the communications device 3700 in FIG. 37, network interface 3795 of the communications device in FIG. 37, and/or one or more processors 3710 of the communications device 3700 in FIG. 37. Means for selecting may include controller/processor 340 of the BS 102 illustrated in FIG. 3 and/or one or more processors 3710 of the communications device 3700 in FIG. 37.

FIG. 38 depicts aspects of an example communications device 3800. In some aspects, communications device 3800 is a network entity, such as a Near-RT RIC of FIGS. 2, 5A, and 5B, or any other suitable RAN controller in a cloud-based RAN.

The communications device 3800 includes a processing system 3805 coupled to a transceiver 3855 (e.g., a transmitter and/or a receiver) and/or a network interface 3865. The transceiver 3855 is configured to transmit and receive signals for the communications device 3800 via an antenna 3860, such as the various signals as described herein. The network interface 3865 is configured to obtain and send signals for the communications device 3800 via communications link(s), such as a backhaul link, midhaul link, and/or fronthaul link as described herein, such as with respect to FIG. 2. The processing system 3805 may be configured to perform processing functions for the communications device 3800, including processing signals received and/or to be transmitted by the communications device 3800.

The processing system 3805 includes one or more processors 3810. In various aspects, one or more processors 3810 may be representative of one or more of receive processor 338, transmit processor 320, TX MIMO processor 330, and/or controller/processor 340, as described with respect to FIG. 3. The one or more processors 3810 are coupled to a computer-readable medium/memory 3830 via a bus 3850. In certain aspects, the computer-readable medium/memory 3830 is configured to store instructions (e.g., computer-executable code) that when executed by the one or more processors 3810, enable and cause the one or more processors 3810 to perform the method 2100 described with respect to FIG. 21, or any aspect related to it, including any additional operations described in relation to FIG. 21; the method 2300 described with respect to FIG. 23, or any aspect related to it, including any additional operations described in relation to FIG. 23; the method 2500 described with respect to FIG. 25, or any aspect related to it, including any additional operations described in relation to FIG. 25; the method 2800 described with respect to FIG. 28, or any aspect related to it, including any additional operations described in relation to FIG. 28; the method 3100 described with respect to FIG. 31, or any aspect related to it, including any additional operations described in relation to FIG. 31; the method 3300 described with respect to FIG. 33, or any aspect related to it, including any additional operations described in relation to FIG. 33; and the method 3500 described with respect to FIG. 35, or any aspect related to it, including any additional operations described in relation to FIG. 35. Note that reference to a processor of communications device 3800 performing a function may include one or more processors of communications device 3800 performing that function, such as in a distributed fashion.

In the depicted example, the computer-readable medium/memory 3830 stores code for providing 3835, code for obtaining 3840, and code for determining 3845. Processing of the code 3835-3845 may enable and cause the communications device 3800 to perform the method 2100 described with respect to FIG. 21, or any aspect related to it; the method 2300 described with respect to FIG. 23, or any aspect related to it; the method 2500 described with respect to FIG. 25, or any aspect related to it; the method 2800 described with respect to FIG. 28, or any aspect related to it; the method 3100 described with respect to FIG. 31, or any aspect related to it; the method 3300 described with respect to FIG. 33, or any aspect related to it; and the method 3500 described with respect to FIG. 35, or any aspect related to it.

The one or more processors 3810 include circuitry configured to implement (e.g., execute) the code stored in the computer-readable medium/memory 3830, including circuitry for providing 3815, circuitry for obtaining 3820, and circuitry for determining 3825. Processing with circuitry 3815-3825 may enable and cause the communications device 3800 to perform the method 2100 described with respect to FIG. 21, or any aspect related to it; the method 2300 described with respect to FIG. 23, or any aspect related to it; the method 2500 described with respect to FIG. 25, or any aspect related to it; the method 2800 described with respect to FIG. 28, or any aspect related to it; the method 3100 described with respect to FIG. 31, or any aspect related to it; the method 3300 described with respect to FIG. 33, or any aspect related to it; and the method 3500 described with respect to FIG. 35, or any aspect related to it.

More generally, means for communicating, transmitting, providing, sending or outputting for transmission may include the transceivers 332, antenna(s) 334, transmit processor 320, TX MIMO processor 330, and/or controller/processor 340 of the BS 102 illustrated in FIG. 3, transceiver 3855 and/or antenna 3860 of the communications device 3800 in FIG. 38, network interface 3865 of the communications device in FIG. 38, and/or one or more processors 3810 of the communications device 3800 in FIG. 38. Means for communicating, receiving or obtaining may include the transceivers 332, antenna(s) 334, receive processor 338, and/or controller/processor 340 of the BS 102 illustrated in FIG. 3, transceiver 3855 and/or antenna 3860 of the communications device 3800 in FIG. 38, network interface 3865 of the communications device in FIG. 38, and/or one or more processors 3810 of the communications device 3800 in FIG. 38. Means for determining may include controller/processor 340 of the BS 102 illustrated in FIG. 3 and/or one or more processors 3810 of the communications device 3800 in FIG. 38.

FIG. 39 depicts aspects of an example communications device 3900. In some aspects, communications device 3900 is a user equipment, such as UE 104 described above with respect to FIGS. 1 and 3.

The communications device 3900 includes a processing system 3905 coupled to a transceiver 3955 (e.g., a transmitter and/or a receiver). The transceiver 3955 is configured to transmit and receive signals for the communications device 3900 via an antenna 3960, such as the various signals as described herein. The processing system 3905 may be configured to perform processing functions for the communications device 3900, including processing signals received and/or to be transmitted by the communications device 3900.

The processing system 3905 includes one or more processors 3910. In various aspects, the one or more processors 3910 may be representative of one or more of receive processor 358, transmit processor 364, TX MIMO processor 366, and/or controller/processor 380, as described with respect to FIG. 3. The one or more processors 3910 are coupled to a computer-readable medium/memory 3930 via a bus 3950. In certain aspects, the computer-readable medium/memory 3930 is configured to store instructions (e.g., computer-executable code) that when executed by the one or more processors 3910, enable and cause the one or more processors 3910 to perform the method 3600 described with respect to FIG. 36, or any aspect related to it, including any additional operations described in relation to FIG. 36. Note that reference to a processor performing a function of communications device 3900 may include one or more processors performing that function of communications device 3900, such as in a distributed fashion.

In the depicted example, computer-readable medium/memory 3930 stores code for communicating 3935, code for obtaining 3940, and code for providing 3945. Processing of the code 3935-3945 may enable and cause the communications device 3900 to perform the method 3600 described with respect to FIG. 36, or any aspect related to it.

The one or more processors 3910 include circuitry configured to implement (e.g., execute) the code stored in the computer-readable medium/memory 3930, including circuitry for communicating 3915, circuitry for obtaining 3920, and circuitry for providing 3925. Processing with circuitry 3915-3925 may enable and cause the communications device 3900 to perform the method 3600 described with respect to FIG. 36, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 3955 and/or antenna 3960 of the communications device 3900 in FIG. 39, and/or one or more processors 3910 of the communications device 3900 in FIG. 39. Means for communicating, receiving or obtaining may include the transceivers 354, antenna(s) 352, receive processor 358, and/or controller/processor 380 of the UE 104 illustrated in FIG. 3, transceiver 3955 and/or antenna 3960 of the communications device 3900 in FIG. 39, and/or one or more processors 3910 of the communications device 3900 in FIG. 39.

Example Clauses

Implementation examples are described in the following numbered clauses:

Clause 1: A method of wireless communication by a first network entity, comprising: obtaining, from a second network entity, an indication of a handover for a UE; obtaining, from a third network entity, an indication of first cross-node machine learning information associated with a cross-node machine learning session between the UE and the third network entity; providing, to the second network entity, an indication acknowledging the handover; relaying communications between the UE and the third network entity for the cross-node machine learning session.

Clause 2: The method of Clause 1, wherein: obtaining the indication of the handover comprises obtaining, from second network entity, the indication of the handover via a handover request; and providing the indication acknowledging the handover comprises providing, to the second network entity, the indication acknowledging the handover via a handover response.

Clause 3: The method of Clause 2, wherein: the handover request comprises an indication of second cross-node machine learning information associated with the first network entity; and the handover response comprises an indication of the first cross-node machine learning information.

Clause 4: The method of Clause 3, wherein: the first cross-node machine learning information comprises one or more machine learning function names supported at the third network entity, and the second cross-node machine learning information comprises one or more machine learning function names supported at the first network entity.

Clause 5: The method of any one of Clauses 1-4, wherein relaying communications comprises relaying communications between the UE and the third network entity via a user plane communication link.

Clause 6: The method of any one of Clauses 1-5, wherein obtaining the indication of the first cross-node machine learning information comprises obtaining, from the third network entity, the indication of the first cross-node machine learning information via a RIC subscription request message.

Clause 7: The method of any one of Clauses 1-6, further comprising: providing, to the third network entity, a request for the first cross-node machine learning information in response to obtaining the indication of the handover, wherein obtaining the indication of the handover comprises obtaining, from the second network entity, the indication of the handover via a handover request comprising an indication of second cross-node machine learning information associated with the first network entity.

Clause 8: The method of Clause 7, wherein: providing the request comprises providing, to the third network entity, the request via a RIC query message, the request comprising the second cross-node machine learning information; obtaining the indication of the first cross-node machine learning information comprises obtaining, from the third network entity, the indication of the first cross-node machine learning information via a RIC subscription request message in response to the RIC query message.

Clause 9: A method of wireless communication by a first network entity, comprising: providing, to a second network entity, an indication of a handover for a UE; obtaining an indication of first cross-node machine learning information associated with the second network entity; and providing, to the UE, a handover command indicating the first cross-node machine learning information for a cross-node machine learning session between the UE and a third network entity.

Clause 10: The method of Clause 9, wherein: providing the indication of the handover comprises providing, to the second network entity, the indication of the handover via a handover request comprising second cross-node machine learning information associated with the first network entity; and obtaining the indication of the first cross-node machine learning information comprises obtaining, from the second network entity, the indication of the first cross-node machine learning information via a handover response.

Clause 11: The method of Clause 10, wherein: the first cross-node machine learning information comprises one or more machine learning function names supported at the second network entity, and the second cross-node machine learning information comprises one or more machine learning function names supported at the first network entity.

Clause 12: The method of any one of Clauses 9-11, further comprising providing, to the third network entity, an indication of the handover for the UE associated with the cross-node machine learning session via a RIC indication message.

Clause 13: The method of any one of Clauses 9-12, wherein providing the handover command comprises providing, to the UE, the handover command via a RRC reconfiguration message.

Clause 14: The method of any one of Clauses 9-13, wherein obtaining the indication of the first cross-node machine learning information comprises obtaining, from the third network entity, the indication of the first cross-node machine learning information via a RIC control request message.

Clause 15: The method of Clause 14, wherein: the RIC control request comprises an indication of the second network entity being a target network entity for the handover associated with the UE; and providing the indication of the handover comprises providing, to the second network entity, the indication of the handover via a handover request in response to obtaining the indication of the second network entity being the target network entity for the handover.

Clause 16: A method of wireless communication by a first network entity, comprising: providing, to a second network entity, first signaling controlling a cross-node machine learning session between a UE and the first network entity; providing, to a third network entity, an indication of first cross-node machine learning information associated with the cross-node machine learning session; and providing, to the third network entity, second signaling controlling the cross-node machine learning session in response to a handover for the UE from the second network entity to the third network entity.

Clause 17: The method of Clause 16, wherein the second signaling indicates an update to a configuration used at the UE for the cross-node machine learning session.

Clause 18: The method of any one of Clauses 16-17, further comprising: obtaining, from the second network entity, an indication of the handover for the UE associated with the first cross-node machine learning session, wherein providing the indication of the first cross-node machine learning information comprises providing, to the third network entity, the indication of the first cross-node machine learning information via a RIC subscription request message in response to obtaining the indication of the handover.

Clause 19: The method of Clause 18, wherein the indication of the handover comprises: a first identifier associated with the UE, and a second identifier associated with the third network entity being a target network entity for the handover.

Clause 20: The method of any one of Clauses 16-19, wherein the first cross-node machine learning information comprises one or more machine learning function names supported at the first network entity.

Clause 21: The method of any one of Clauses 16-20, further comprising providing, to the second network entity, an indication of the third network entity being a target network entity for the handover associated with the UE.

Clause 22: The method of Clause 21, wherein providing the indication of the third network entity being the target network entity comprises providing, to the second network entity, the indication of the third network entity being the target network entity via a RIC control request.

Clause 23: The method of any one of Clauses 16-22, further comprising: obtaining, from the third network entity, a request for the first cross-node machine learning information, wherein providing the indication of the first cross-node machine learning information comprises providing, to the third network entity, the indication of the first cross-node machine learning information in response to the request.

Clause 24: The method of Clause 23, wherein: obtaining the request comprises obtaining, from the third network entity, the request via a RIC query message, the request comprising an indication of second cross-node machine learning information associated with the second network entity; and wherein providing the indication of the first cross-node machine learning information comprises providing, to the third network entity, the indication of the first cross-node machine learning information via a RIC subscription request in response to the RIC query message.

Clause 25: A method of wireless communication by a first network entity, comprising: providing, to a UE, an indication to deactivate a cross-node machine learning session between the UE and a second network entity; providing, to the second network entity, an indication that the UE is deactivating the cross-node machine learning session; and providing, to the UE, an indication to handover to a third network entity.

Clause 26: The method of Clause 25, wherein providing the indication that the UE is deactivating the cross-node machine learning session comprises providing, to the second network entity, the indication that the UE is deactivating the cross-node machine learning session via a RIC indication message.

Clause 27: The method of any one of Clauses 25-26, further comprising: selecting the third network entity for the handover; providing, to the third network entity, a handover request indicating to handover communications with the UE; and obtaining, from the third network entity, a handover response acknowledging the handover.

Clause 28: The method of any one of Clauses 25-27, wherein providing the indication to handover comprises providing, to the UE, the indication to handover via a RRC reconfiguration message.

Clause 29: A method of wireless communication by a first network entity, comprising: obtaining machine learning input data associated with a cross-node machine learning session between a UE and the first network entity; obtaining, from a second network entity, an indication that the UE is deactivating the cross-node machine learning session; obtaining, from a third network entity, a request to activate the cross-node machine learning session; and providing, to the third network entity, a configuration associated with the cross-node machine learning session for the UE in response to obtaining the request.

Clause 30: The method of Clause 29, wherein obtaining the indication that UE is deactivating the cross-node machine learning session comprises obtaining, from the second network entity, the indication that the UE is deactivating the cross-node machine learning session via a RIC indication message.

Clause 31: A method of wireless communication by a first network entity, comprising: providing, to a second network entity, an indication of a handover for a UE associated with a cross-node machine learning session between the UE and the second network entity; obtaining, from a third network entity, an indication of first cross-node machine learning information associated with the third network entity; and providing, to the UE, an indication to handover to the third network entity and an indication of the first cross-node machine learning information associated with the third network entity.

Clause 32: The method of Clause 31, wherein providing the indication of the handover comprises providing, to the second network entity, the indication of the handover via a RIC indication message.

Clause 33: The method of Clause 32, wherein the indication of the handover comprises: a first identifier associated with the UE, and a second identifier associated with the third network entity being a target network entity for the handover.

Clause 34: The method of any one of Clauses 31-33, further comprising: providing, to the third network entity via a handover request, an indication of second cross-node machine learning information associated with the first network entity, wherein obtaining the indication of the first cross-node machine learning information comprises, obtaining the indication of the first cross-node machine learning information via a handover response.

Clause 35: The method of Clause 34, wherein: the first cross-node machine learning information comprises one or more machine learning function names supported at the third network entity, and the second cross-node machine learning information comprises one or more machine learning function names supported at the first network entity.

Clause 36: The method of any one of Clauses 31-35, wherein providing the indication to handover comprises providing, to the UE, the indication to handover and the indication of the first cross-node machine learning information via a RRC reconfiguration message.

Clause 37: A method of wireless communication by a first network entity, comprising: obtaining, from a second network entity, an indication of a handover for a UE associated with a cross-node machine learning session between the UE and the first network entity; in response to obtaining the indication of the handover, providing, to a third network entity, an indication of cross-node machine learning information associated with the first network entity; and providing, to the third network entity, signaling controlling the cross-node machine learning session.

Clause 38: The method of Clause 37, wherein the signaling indicates an update to a configuration used at the UE for the cross-node machine learning session.

Clause 39: The method of any one of Clauses 37-38, wherein obtaining the indication of the handover comprises obtaining, from the second network entity, the indication of the handover via a RIC indication message.

Clause 40: The method of Clause 39, wherein the indication of the handover comprises: a first identifier associated with the UE, and a second identifier associated with the third network entity being a target network entity for the handover.

Clause 41: The method of any one of Clauses 37-40, wherein providing the indication of cross-node machine learning information comprises providing, to the third network entity, the indication of cross-node machine learning information via a RIC subscription request.

Clause 42: A method of wireless communication by a first network entity, comprising: obtaining, from a second network entity, an indication of first cross-node machine learning information associated with a cross-node machine learning session between a UE and a third network entity; obtaining, from the third network entity, an indication of second cross-node machine learning information associated with the third network entity; providing, to the second network entity, an indication of the second cross-node machine learning information; and communicating with the UE in response to providing the indication of the second cross-node machine learning information.

Clause 43: The method of Clause 42, further comprising: providing, to the third network entity, an indication acknowledging the second cross-node machine learning information, wherein obtaining the indication of the second cross-node machine learning information comprises obtaining, from the third network entity, the indication of the second cross-node machine learning information via a RIC subscription message.

Clause 44: The method of any one of Clauses 42-43, wherein: obtaining the indication of the first cross-node machine learning information comprises obtaining, from the second network entity, the indication of the first cross-node machine learning information via a handover request; and providing the indication of the second cross-node machine learning information comprises providing, the second network entity, indication of the second cross-node machine learning information via a handover response.

Clause 45: The method of Clause 44, wherein: the first cross-node machine learning information comprises one or more machine learning function names supported at the third network entity, and the second cross-node machine learning information comprises one or more machine learning function names supported at the first network entity.

Clause 46: A method of wireless communication by a first network entity, comprising: obtaining, from a second network entity: an indication of a third network entity being a target network entity for a handover associated with a UE, and an indication of cross-node machine learning information associated with the third network entity; and providing, to the UE: an indication to handover to the third network entity, and an indication of the cross-node machine learning information associated with the third network entity.

Clause 47: The method of Clause 46, wherein obtaining the indication of the third network entity and the indication of the cross-node machine learning information comprises obtaining, from the second network entity, the indication of the third network entity and the indication of the cross-node machine learning information via a RIC control request.

Clause 48: The method of any one of Clauses 46-47, further comprising: providing, to the third network entity, an indication of the handover associated with the UE via a handover request; and obtaining, from the third network entity, an indication acknowledging the handover via a handover response.

Clause 49: The method of any one of Clauses 46-48, wherein providing the indication to handover comprises providing, to the UE, the indication to handover and the indication of the cross-node machine learning information via a RRC reconfiguration message.

Clause 50: A method of wireless communication by a first network entity, comprising: providing, to a second network entity, first signaling controlling a cross-node machine learning session between a UE and the first network entity; providing, to a third network entity, an indication of first cross-node machine learning information associated with the cross-node machine learning session; providing, to the second network entity: an indication of the third network entity being a target network entity for a handover associated with the UE, and an indication of second cross-node machine learning information associated with the third network entity; and providing, to the third network entity, second signaling controlling the cross-node machine learning session between the UE and the first network entity.

Clause 51: The method of Clause 50, wherein providing the indication of the first cross-node machine learning information comprises providing the indication of the first cross-node machine learning information via a RIC subscription message.

Clause 52: The method of any one of Clauses 50-51, wherein providing the indication of the third network entity being the target network entity and the indication of the second cross-node machine learning information comprises providing, to the second network entity, the indication of the third network entity being the target network entity and the indication of the second cross-node machine learning information via a RIC control request.

Clause 53: The method of any one of Clauses 50-52, wherein the second signaling indicates an update to a configuration used at the UE for the cross-node machine learning session.

Clause 54: The method of any one of Clauses 50-53, wherein: the first cross-node machine learning information comprises one or more machine learning function names supported at the second network entity, and the second cross-node machine learning information comprises one or more machine learning function names supported at the third network entity.

Clause 55: A method of wireless communication by a first network entity, comprising: obtaining, from a second network entity, an indication of cross-node machine learning information associated with a cross-node machine learning session between a UE and the second network entity; obtaining, from a third network entity, an indication of a handover associated with the UE; providing, to the third network entity, an indication acknowledging the handover; and communicating with the UE in response to providing the indication acknowledging the handover.

Clause 56: The method of Clause 55, wherein obtaining the indication of cross-node machine learning information comprises obtaining, from the second network entity, the indication of cross-node machine learning information via a RIC subscription request.

Clause 57: The method of any one of Clauses 55-56, further comprising: obtaining, from the third network entity, the indication of the handover via a handover request; and providing, to the third network entity, the indication acknowledging the handover via a handover response.

Clause 58: A method of wireless communication by a first network entity, comprising: providing, to a second network entity, an indication of a handover to a third network entity for a UE associated with a cross-node machine learning session between the UE and the second network entity; obtaining, from the second network entity, an indication to deactivate the cross-node machine learning session with the second network entity; and providing, to the UE, an indication to handover to the third network entity and the indication to deactivate the cross-node machine learning session between the UE and the second network entity.

Clause 59: The method of Clause 58, wherein providing the indication of the handover comprises providing, to the second network entity, the indication of the handover via a RIC indication message.

Clause 60: The method of any one of Clauses 58-59, wherein the indication of the handover comprises an identifier associated the third network entity being a target network entity for the handover.

Clause 61: The method of any one of Clauses 58-60, wherein obtaining the indication to deactivate the cross-node machine learning session comprises obtaining, from the second network entity, the indication to deactivate the cross-node machine learning session via a RIC control request.

Clause 62: The method of any one of Clauses 58-61, further comprising: providing, to the third network entity, an indication of the handover for the UE via a handover request; and obtaining, from the third network entity, an indication acknowledging the handover via a handover response.

Clause 63: The method of any one of Clauses 58-62, wherein providing the indication to handover and the indication to deactivate the cross-node machine learning session comprises providing, to the UE, the indication to handover and the indication to deactivate the cross-node machine learning session via a RRC reconfiguration message.

Clause 64: A method of wireless communication by a first network entity, comprising: providing, to a second network entity, signaling controlling a cross-node machine learning session between a UE and the first network entity; obtaining, from a second network entity, an indication of a handover to a third network entity for a UE associated with the cross-node machine learning session; and providing, to the second network entity, an indication to deactivate the cross-node machine learning session with the second network entity in response to obtaining the indication of the handover.

Clause 65: The method of Clause 64, wherein obtaining the indication of the handover comprises obtaining, from the second network entity, the indication of the handover via a RIC indication message.

Clause 66: The method of any one of Clauses 64-65, wherein the indication of the handover comprises an identifier associated with the third network entity being a target network entity for the handover.

Clause 67: The method of any one of Clauses 64-66, wherein providing the indication to deactivate the cross-node machine learning session comprises providing, to the second network entity, the indication to deactivate the cross-node machine learning session via a RIC control request.

Clause 68: The method of any one of Clauses 64-67, wherein the signaling indicates an update to a configuration used at the UE for the cross-node machine learning session.

Clause 69: The method of any one of Clauses 64-68, further comprising: determining that the third network entity is managed by a fourth network entity, wherein providing the indication to deactivate the cross-node machine learning session comprises providing, to the second network entity, the indication to deactivate the cross-node machine learning session further in response to determining that the third network entity is managed by a fourth network entity.

Clause 70: A method of wireless communication by a first network entity, comprising: obtaining, from a second network entity: an indication of the first network entity being a target network entity for a handover associated with a UE, and an indication of first cross-node machine learning information associated with the second network entity in communication with a first RAN controller; providing, to a second RAN controller in communication with the first network entity, an indication of the first cross-node machine learning information associated with the second network entity; obtaining, from the second RAN controller, an indication of second cross-node machine learning information associated with the first network entity; providing, to the second network entity: an indication acknowledging the handover, and the indication of the second cross-node machine learning information associated with the first network entity; and in response to providing the indication acknowledging the handover, communicating with the UE.

Clause 71: The method of Clause 70, wherein: obtaining the indication of the first network entity comprises obtaining, from the second network entity, the indication of the first network entity via a handover request, and providing the indication acknowledging the handover and the indication of the second cross-node machine learning information comprises providing, to the second network entity, the indication acknowledging the handover and the indication of the second cross-node machine learning information via a handover response.

Clause 72: The method of any one of Clauses 70-71, wherein providing the indication of the second cross-node machine learning information comprises providing, to the second RAN controller in communication with the first network entity, the indication of the second cross-node machine learning information via a RIC query message.

Clause 73: The method of any one of Clauses 70-72, wherein obtaining the indication of the second cross-node machine learning information comprises obtaining, from the second RAN controller, the indication of the second cross-node machine learning information via a RIC subscription request message.

Clause 74: A method of wireless communication by a first network entity, comprising: obtaining, from a second network entity, a request for first cross-node machine learning information; providing, to the second network entity, an indication of the first cross-node machine learning information; and providing, to the second network entity, signaling controlling a cross-node machine learning session between a UE and the first network entity.

Clause 75: The method of Clause 74, wherein obtaining the request comprises obtaining, from the second network entity, the request via a RIC query message.

Clause 76: The method of any one of Clauses 74-75, wherein obtaining the request indicates second cross-node machine learning information associated with a cross-node machine learning session between the UE and a third network entity.

Clause 77: The method of Clause 76, wherein: the first cross-node machine learning information comprises one or more machine learning function names supported at the first network entity, and the second cross-node machine learning information comprises one or more machine learning function names supported at the third network entity.

Clause 78: The method of any one of Clauses 74-77, wherein providing the indication of the first cross-node machine learning information comprises providing, to the second network entity, the indication of the first cross-node machine learning information via a RIC subscription request message.

Clause 79: A method of wireless communication by a first network entity, comprising: relaying communications between a UE and a second network entity engaged in a cross-node machine learning session between the UE and the second network entity; providing, to the UE, an indication to transition from a first RRC state to a second RRC state; and providing, to the second network entity, an indication of the UE being in the second RRC state.

Clause 80: The method of Clause 79, wherein: providing the indication to transition from the first RRC state to the second RRC state comprises providing, to the UE, the indication via a RRC release message; and providing the indication of the UE being in the second RRC state comprises providing, to the second network entity, the indication of the UE being in the second RRC state via a RIC indication message.

Clause 81: The method of any one of Clauses 79-80, further comprising: providing, to the UE, an indication to transition from the second RRC state to the first RRC state via a RRC resume message; providing, to the second network entity, an indication of the UE being in the first RRC state via a RIC indication message; and resuming relaying communications between the UE and the second network entity engaged in the cross-node machine learning session between the UE and the second network entity.

Clause 82: The method of any one of Clauses 79-81, wherein: the first RRC state comprises a RRC connected state; and the second RRC state comprises a RRC inactive state.

Clause 83: The method of any one of Clauses 79-82, wherein: the first RRC state comprises a RRC connected state; and the second RRC state comprises a RRC idle state.

Clause 84: The method of any one of Clauses 79-83, further comprising: in response to the providing the indication of the UE being in the second RRC state, obtaining, from the second network entity, an indication to deactivate the cross-node machine learning session between the UE and the second network entity; and providing, to the UE, the indication to the cross-node machine learning session.

Clause 85: A method of wireless communication by a first network entity, comprising: obtaining, from a second network entity, an indication of a UE being in a RRC state; and providing, to the second network entity, signaling controlling a cross-node machine learning session between the UE and the first network entity in response to obtaining the indication of the UE being in the RRC state.

Clause 86: The method of Clause 85, wherein: obtaining the indication of the UE being in the RRC state comprises obtaining, from the second network entity, the indication of the UE being in the RRC state via a RIC indication message.

Clause 87: The method of any one of Clauses 85-86, wherein the RRC state comprises an RRC connected state, an RRC idle state, or an RRC inactive state.

Clause 88: The method of any one of Clauses 85-87, wherein the signaling indicates to deactivate the cross-node machine learning session between the UE and the first network entity.

Clause 89: The method of any one of Clauses 85-88, wherein the signaling indicates to update the cross-node machine learning session between the UE and the first network entity.

Clause 90: A method of wireless communication by an apparatus, comprising: communicating with a first network entity in accordance with a cross-node machine learning session between the apparatus and the first network entity; obtaining, from a second network entity, an indication to perform a handover to a third network entity and a configuration for the cross-node machine learning session; and communicating in accordance with the configuration for the cross-node machine learning session via at least a wireless communication link between the apparatus and the third network entity.

Clause 91: The method of Clause 90, wherein communicating with the first network entity comprises communicating with the first network entity via a user-plane communication link associated with the cross-node machine learning session.

Clause 92: The method of any one of Clauses 90-91, wherein the configuration includes an indication of one or more parameters supported by the third network entity in association with the cross-node machine learning session.

Clause 93: The method of any one of Clauses 90-92, wherein communicating in accordance with the configuration for the cross-node machine learning session comprises communicating with the first network entity via a user-plane communication link associated with the cross-node machine learning session.

Clause 94: The method of any one of Clauses 90-93, wherein the configuration includes an indication to handover the cross-node machine learning session to a fourth network entity; and communicating in accordance with the configuration for the cross-node machine learning session comprises communicating with the fourth network entity via a user-plane communication link associated with the cross-node machine learning session.

Clause 95: The method of any one of Clauses 90-94, further comprising: providing, to the first network entity, machine learning information via at least the wireless communication link; and obtaining, from the third network entity, signaling controlling the wireless communication link in response to the machine learning information.

Clause 96: The method of any one of Clauses 90-95, wherein the first network entity comprises a RIC; the second network entity comprises a first CU in communication with the first network entity via an E2 interface; and the third network entity comprises a second CU in communication with the first network entity via the E2 interface.

Clause 97: One or more apparatuses, comprising: one or more memories comprising executable instructions; and one or more processors configured to execute the executable instructions and cause the one or more apparatuses to perform a method in accordance with any one of clauses 1-96.

Clause 98: One or more apparatuses, comprising means for performing a method in accordance with any one of clauses 1-96.

Clause 99: One or more non-transitory computer-readable media comprising executable instructions that, when executed by one or more processors of one or more apparatuses, cause the one or more apparatuses to perform a method in accordance with any one of clauses 1-96.

Clause 100: One or more computer program products embodied on one or more computer-readable storage media comprising code for performing a method in accordance with any one of clauses 1-96.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communication, comprising one or more processors coupled to one or more memories, and configured to cause the apparatus to:

provide, to a first network entity, an indication of a handover for a user equipment (UE);

obtain an indication of first cross-node machine learning information associated with the first network entity; and provide, to the UE, a handover command indicating the first cross-node machine learning information for a cross-node machine learning session between the UE and a second network entity.

2. The apparatus of claim 1, wherein:

to provide the indication of the handover, the one or more processors are configured to cause the apparatus to provide, to the first network entity, the indication of the handover via a handover request comprising second cross-node machine learning information associated with the apparatus; and to obtain the indication of the first cross-node machine learning information, the one or more processors are configured to cause the apparatus to obtain, from the first network entity, the indication of the first cross-node machine learning information via a handover response.

3. The apparatus of claim 2, wherein:

the first cross-node machine learning information comprises one or more machine learning function names supported at the first network entity, and the second cross-node machine learning information comprises one or more machine learning function names supported at the apparatus.

4. The apparatus of claim 1, wherein the one or more processors are configured to cause the apparatus to provide, to the second network entity, an indication of the handover for the UE associated with the cross-node machine learning session via a radio access network (RAN) intelligent controller (RIC) indication message.

5. The apparatus of claim 1, wherein to obtain the indication of the first cross-node machine learning information, the one or more processors are configured to cause the apparatus to obtain, from the second network entity, the indication of the first cross-node machine learning information via a radio access network (RAN) intelligent controller (RIC) control request message.

6. The apparatus of claim 5, wherein:

the RIC control request message comprises an indication of the first network entity being a target network entity for the handover associated with the UE; and to provide the indication of the handover, the one or more processors are configured to cause the apparatus to provide, to the first network entity, the indication of the handover via a handover request in response to obtaining the indication of the first network entity being the target network entity for the handover.

7. An apparatus configured for wireless communication, comprising one or more processors coupled to one or more memories, and configured to cause the apparatus to:

provide, to a first network entity, first signaling that controls a cross-node machine learning session between a user equipment (UE) and the apparatus;

provide, to a second network entity, an indication of first cross-node machine learning information associated with the cross-node machine learning session; and provide, to the second network entity, second signaling that controls the cross-node machine learning session in response to a handover for the UE from the first network entity to the second network entity.

8. The apparatus of claim 7, wherein the second signaling indicates an update to a configuration used at the UE for the cross-node machine learning session.

9. The apparatus of claim 7, wherein:

the one or more processors are configured to cause the apparatus to obtain, from the first network entity, an indication of the handover for the UE associated with the cross-node machine learning session; and to provide the indication of the first cross-node machine learning information, the one or more processors are configured to cause the apparatus to provide, to the second network entity, the indication of the first cross-node machine learning information via a radio access network (RAN) intelligent controller (RIC) subscription request message in response to obtaining the indication of the handover.

10. The apparatus of claim 9, wherein the indication of the handover comprises:

a first identifier associated with the UE, and a second identifier associated with the second network entity being a target network entity for the handover.

11. The apparatus of claim 7, wherein the first cross-node machine learning information comprises one or more machine learning function names supported at the apparatus.

12. The apparatus of claim 7, wherein the one or more processors are configured to cause the apparatus to provide, to the first network entity, an indication of the second network entity being a target network entity for the handover associated with the UE.

13. The apparatus of claim 12, wherein to provide the indication of the second network entity being the target network entity, the one or more processors are configured to cause the apparatus to provide, to the first network entity, the indication of the second network entity being the target network entity via a radio access network (RAN) intelligent controller (RIC) control request.

14. The apparatus of claim 7, wherein:

the one or more processors are configured to cause the apparatus to obtain, from the second network entity, a request for the first cross-node machine learning information; and to provide the indication of the first cross-node machine learning information, the one or more processors are configured to cause the apparatus to provide, to the second network entity, the indication of the first cross-node machine learning information in response to the request.

15. The apparatus of claim 14, wherein:

to obtain the request, the one or more processors are configured to cause the apparatus to obtain, from the second network entity, the request via a radio access network (RAN) intelligent controller (RIC) query message, the request comprising an indication of second cross-node machine learning information associated with the first network entity; and to provide the indication of the first cross-node machine learning information, the one or more processors are configured to cause the apparatus to provide, to the second network entity, the indication of the first cross-node machine learning information via a RIC subscription request in response to the RIC query message.

16. A method of wireless communication, comprising:

providing, to a first network entity, an indication of a handover for a user equipment (UE);

obtaining an indication of first cross-node machine learning information associated with the first network entity; and providing, to the UE, a handover command indicating the first cross-node machine learning information for a cross-node machine learning session between the UE and a second network entity.

17. The method of claim 16, wherein:

providing the indication of the handover comprises providing, to the first network entity, the indication of the handover via a handover request comprising second cross-node machine learning information associated with the apparatus; and obtaining the indication of the first cross-node machine learning information comprises obtaining, from the first network entity, the indication of the first cross-node machine learning information via a handover response.

18. The method of claim 17, wherein:

the first cross-node machine learning information comprises one or more machine learning function names supported at the first network entity, and the second cross-node machine learning information comprises one or more machine learning function names supported at the apparatus.

19. The method of claim 16, wherein the method comprises providing, to the second network entity, an indication of the handover for the UE associated with the cross-node machine learning session via a radio access network (RAN) intelligent controller (RIC) indication message.

20. The method of claim 16, wherein obtaining the indication of the first cross-node machine learning information comprises obtaining, from the second network entity, the indication of the first cross-node machine learning information via a radio access network (RAN) intelligent controller (RIC) control request message.

21. The method of claim 20, wherein:

the RIC control request message comprises an indication of the first network entity being a target network entity for the handover associated with the UE; and providing the indication of the handover comprises providing, to the first network entity, the indication of the handover via a handover request in response to obtaining the indication of the first network entity being the target network entity for the handover.

22. A method of wireless communication, comprising:

providing, to a first network entity, first signaling that controls a cross-node machine learning session between a user equipment (UE) and the apparatus;

providing, to a second network entity, an indication of first cross-node machine learning information associated with the cross-node machine learning session; and providing, to the second network entity, second signaling that controls the cross-node machine learning session in response to a handover for the UE from the first network entity to the second network entity.

23. The method of claim 22, wherein the second signaling indicates an update to a configuration used at the UE for the cross-node machine learning session.

24. The method of claim 22, wherein:

the method comprises obtaining, from the first network entity, an indication of the handover for the UE associated with the cross-node machine learning session; and providing the indication of the first cross-node machine learning information comprises providing, to the second network entity, the indication of the first cross-node machine learning information via a radio access network (RAN) intelligent controller (RIC) subscription request message in response to obtaining the indication of the handover.

25. The method of claim 24, wherein the indication of the handover comprises:

a first identifier associated with the UE, and a second identifier associated with the second network entity being a target network entity for the handover.

26. The method of claim 22, wherein the first cross-node machine learning information comprises one or more machine learning function names supported at the apparatus.

27. The method of claim 22, wherein the method comprises providing, to the first network entity, an indication of the second network entity being a target network entity for the handover associated with the UE.

28. The method of claim 27, wherein providing the indication of the second network entity being the target network entity comprises providing, to the first network entity, the indication of the second network entity being the target network entity via a radio access network (RAN) intelligent controller (RIC) control request.

29. The method of claim 28, wherein:

the method comprises obtaining, from the second network entity, a request for the first cross-node machine learning information; and providing the indication of the first cross-node machine learning information comprises providing, to the second network entity, the indication of the first cross-node machine learning information in response to the request.

30. The method of claim 29, wherein:

obtaining the request comprises obtaining, from the second network entity, the request via a radio access network (RAN) intelligent controller (RIC) query message, the request comprising an indication of second cross-node machine learning information associated with the first network entity; and providing the indication of the first cross-node machine learning information comprises providing, to the second network entity, the indication of the first cross-node machine learning information via a RIC subscription request in response to the RIC query message.

* * * * *